United States Patent

Schlank et al.

[11] Patent Number: 6,134,017
[45] Date of Patent: *Oct. 17, 2000

[54] FACSIMILE MANAGER

[75] Inventors: Avraham Ron Schlank; Chet Allen Erez, both of Sunnyvale; Stanley H. Wong, Cupertino; Yu-Chen Tuan, Santa Clara; Calvin C. Yee, Mountain View; Peter A. Knott, San Jose, all of Calif.

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/340,360

[22] Filed: Nov. 14, 1994

[51] Int. Cl.[7] .................................................. G06F 15/00
[52] U.S. Cl. .................... 358/1.15; 358/1.17; 358/400; 358/402; 358/404; 358/442; 358/444; 379/100.08
[58] Field of Search .................................... 395/115, 116, 395/118, 155, 156, 157, 164, 114; 358/400, 442, 444, 471, 402, 404, 468, 443, 448; 379/100.08, 100.09

[56] References Cited

U.S. PATENT DOCUMENTS

| | | | |
|---|---|---|---|
| 5,218,458 | 6/1993 | Kochis et al. | 358/448 |
| 5,239,389 | 8/1993 | Kochis et al. | 358/451 |
| 5,321,802 | 6/1994 | Furuya et al. | 395/146 |
| 5,384,830 | 1/1995 | Ide | 358/440 |
| 5,452,289 | 9/1995 | Sharma et al. | 379/100.08 |
| 5,493,415 | 2/1996 | Mita et al. | 358/444 |
| 5,532,939 | 7/1996 | Psinakis et al. | 364/514 C |
| 5,539,530 | 7/1996 | Reifman et al. | 358/400 |
| 5,548,745 | 8/1996 | Egan et al. | 395/500 |
| 5,555,104 | 9/1996 | Todaka | 358/468 |
| 5,579,472 | 11/1996 | Keyworth, II et al. | 395/326 |
| 5,596,697 | 1/1997 | Foster et al. | 395/340 |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

A system for managing printing and scanning and faxing functionality of a facsimile machine via a bi-directional parallel interface with which the facsimile machine is equipped. More particularly, a facsimile manager is provided for managing image files connected with printing, scanning and faxing. In addition, printing and scanning drivers are provided by which any Windows application program can access such printing, scanning and faxing functionality.

141 Claims, 30 Drawing Sheets

FACSIMILE MANAGER

BACKGROUND OF THE INVENTION

1. Field of the Invention

The present invention relates to a system for managing printing and scanning and faxing functionality of a facsimile machine via a bi-directional parallel interface with which the facsimile machine is equipped. More particularly, the invention provides a facsimile manager for managing image files connected with printing, scanning and faxing, and in addition provides printing and scanning drivers by which any Windows application program can access such printing, scanning and faxing functionality.

2. Description of The Related Art

It has recently been considered to provide a facsimile machine with a bi-directional parallel interface, such as the bi-directional parallel interface defined by IEEE Standard 1284 (Feb. 2, 1993, the contents of which are incorporated herein by reference). Such a bi-directional parallel interface allows two-way communication with a facsimile machine so-equipped. Thus, not only does it become possible for the facsimile machine to print out documents sent to it from a personal computer, but is also becomes possible for the facsimile machine to provide scanned-in documents (or received-fax documents) back to the personal computer.

With the advent of facsimile machines equipped with such bi-directional parallel interfaces, there exists a need for managing the printing, scanning and faxing functionality of the facsimile machine from a separate personal computer. There further exists a need to provide such printing, scanning and faxing functionality to other applications, particularly Windows applications, executing on the personal computer.

SUMMARY OF THE INVENTION

These needs are met by the present invention which relates to a system for managing image files connected with printing and scanning and faxing functionality of a facsimile machine via a bi-directional parallel interface, and which in addition provides printing and scanning drivers by which any Windows application program can access such printing, scanning and faxing functionality.

In one aspect of the invention, a facsimile manager for operating printing and scanning functionality of a facsimile machine equipped with a bi-directional parallel interface includes an interface with a communication module, an in-box for storing image provided by the communication module, such images including the received-fax image and images from other Windows application programs, an out-box for storing send-fax images that are provided by the communication module, a scanning module, a fax module and a print module. The communication module polls the facsimile machine via the bi-directional parallel interface to determine whether a scanned-in image or a received-fax image is present in facsimile memory, obtains the scanned-in image or the received fax image via the bi-directional interface, and accepts images and send-fax images from other Windows applications programs. The scanning module causes the communication module to initiate a scanning operation, receives scanned-in image from the communication module, and stores the scanned-in image in the in-box. The fax module gives send-fax data from the out-box to the communication module and which causes the communication module to transmit the send-fax images via the bi-directional interface to the facsimile machine for subsequent facsimile transmission by the facsimile machine. The print module gives images from the in-box or the out-box to the communication module and which causes the communication module to transmit the image via the bi-directional interface to the facsimile machine for subsequent print out by the facsimile machine.

In another aspect of the present invention, a configurable print driver accepts document data from a Windows-based application program and delivers corresponding image data to a communication module adapted to communicate with a facsimile machine via a bi-directional parallel-interface. The configurable print driver includes a configuration selector for selecting one of a printing, faxing or storing configuration for the print driver, a file format converter which converts the document from the Windows application into an image-based file format, and a delivery mechanism for delivering the converted document to the communication module together with the selected configuration.

In another aspect of the present invention, a TWAIN scan driver which is responsive to acquire commands issued by a TWAIN-compatible Windows application program delivers image data from a fax machine equipped with a hi-directional parallel interface to the Windows application program. The TWAIN scan driver includes a TWAIN negotiator for negotiating a suitable image format with the Windows application program, a scan initiator for issuing a command for initiating scan by the facsimile machine, an interface with a communication modules which sends a command via the bi-directional parallel interface to the fax machine for initiating scanning, which polls fax memory to determine whether a scanned-in document file is present in fax memory, and which in response to the presence of a scanned-in document in fax memory retrieves the scanned-in document via the bi-directional parallel interface, an image buffer for temporarily storing and for displaying the scanned-in document retrieved by the communication module, and an accept interface response to an image-accept command, for providing the scanned-in image to the Windows application program in the TWAIN-negotiated image format.

In yet another aspect of the present invention, a communication module resident in a host computer communicates with a processor in a facsimile machine equipped with a bi-directional interface. The communication module includes a polling mechanism, responsive to timer messages issued from a Windows operating system, for polling the facsimile machine via the bi-directional interface to determine whether an image file is present in facsimile memory, an image buffer into which the communication module stores image files retrieved from facsimile memory via the bi-directional interface, a file identifier for determining whether the retrieved image file is a scanned-in image file or a received-fax image file, and a delivery mechanism for delivering the retrieved image file to an in-box of a facsimile manager in a case where the file identifier determines that the retrieved image file is a received-fax image file, and for delivering the retrieved image file to an active scan driver in a case where the file identifier determines that the retrieved image file is a scanned-in image file.

In yet another aspect of the invention, an out-box display includes a list area divided into a top portion and a bottom portion, wherein the top portion includes a list of queued out-box items and wherein the bottom portion includes a list of completed out-box items. An active list, separate from and positioned on top of the list area, includes exactly one item which is currently an active out-box item, and also includes a stop button. In response to selection of the stop button, transmission of the active item in the active list is terminated.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 11 through 15 are views for explaining address book processing.

DETAILED DESCRIPTION OF THE PREFERRED EMBODIMENT

[1. Structure]

Figure 1:
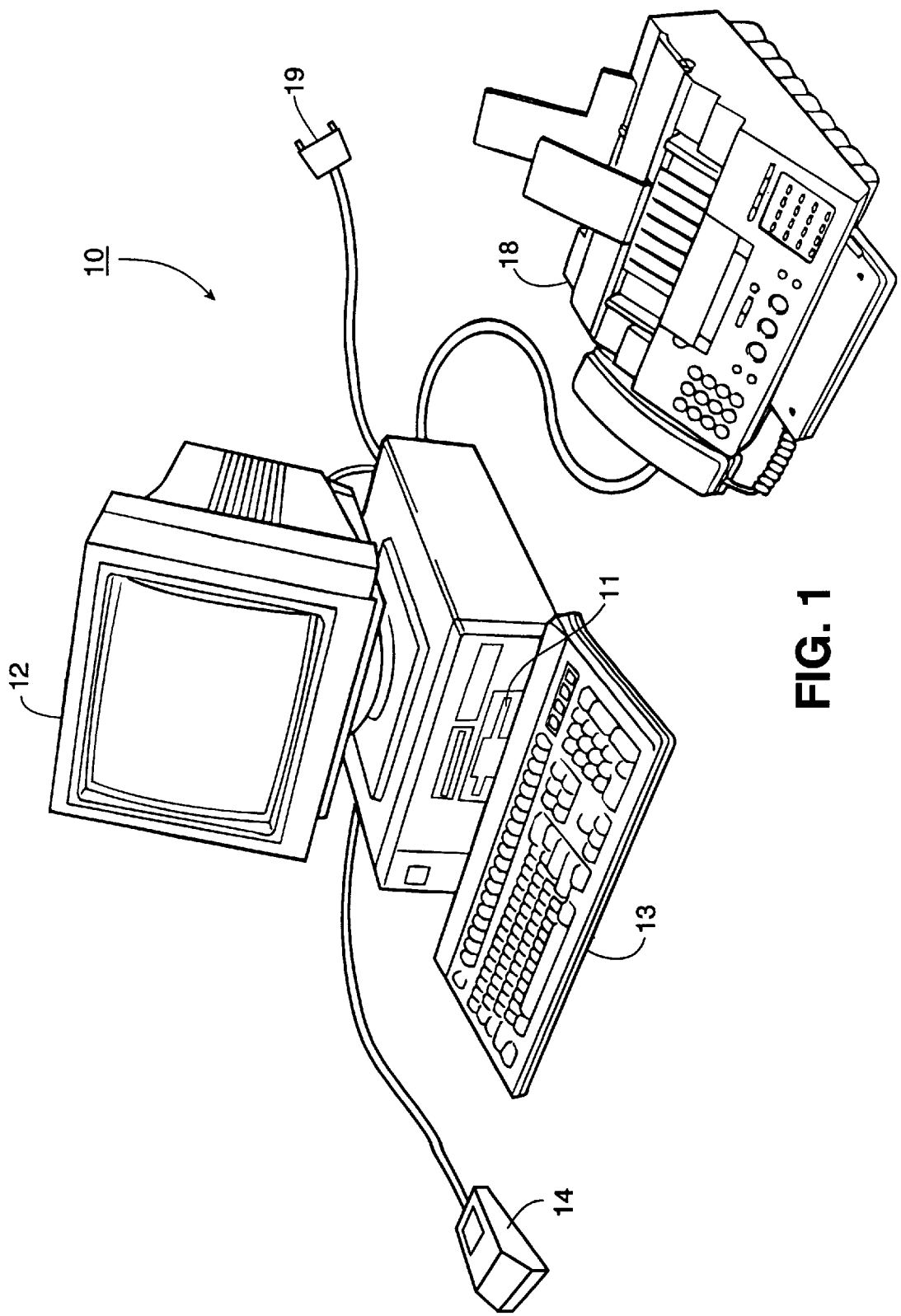
FIG. 1 is a perspective view of the outward appearance of an apparatus according to the invention.

FIG. 1 is a view showing the outward appearance of a representative embodiment of the invention. Shown in FIG. 1 is computing equipment 10, such as a MacIntosh or an IBM PC or PC compatible computer having a windowing environment such as Microsoft Windows. Provided with computing equipment 10 is display screen 12, such as a color monitor, keyboard 13 for entering user commands, and pointing devices 14, such as a mouse for pointing to and for manipulating objects displayed on screen 12.

Computing equipment 10 includes a mass storage device such as computer disk 11 for storing data files which include document image files, in either compressed or uncompressed format, and for storing application program files which include windows operating System, Facsimile Manager application program, ACTif module application, printer driver application, TWAIN scanner driver application, standard driver applications such as Canon printer, Canon scanner and phone drivers, image files, Windows printing applications, Windows scanning applications, other word processing applications, and other data files.

As shown in FIG. 1, facsimile machine 18 is connected to computing equipment 10. Facsimile machine 18 has the ability to operate as a conventional facsimile machine or can operate as a scanner to input document image data by scanning documents, a printer to output documents, a telephone or as a facsimile machine to output received facsimile documents. As a scanner and a facsimile machine, facsimile machine 18 provides bitmap images of documents to computing equipment 10. As a printer, facsimile machine 18 outputs processed document images and as a telephone, the telephone line of facsimile machine 18 can be accessed for outgoing calls by computing equipment 10.

Figure 2A:
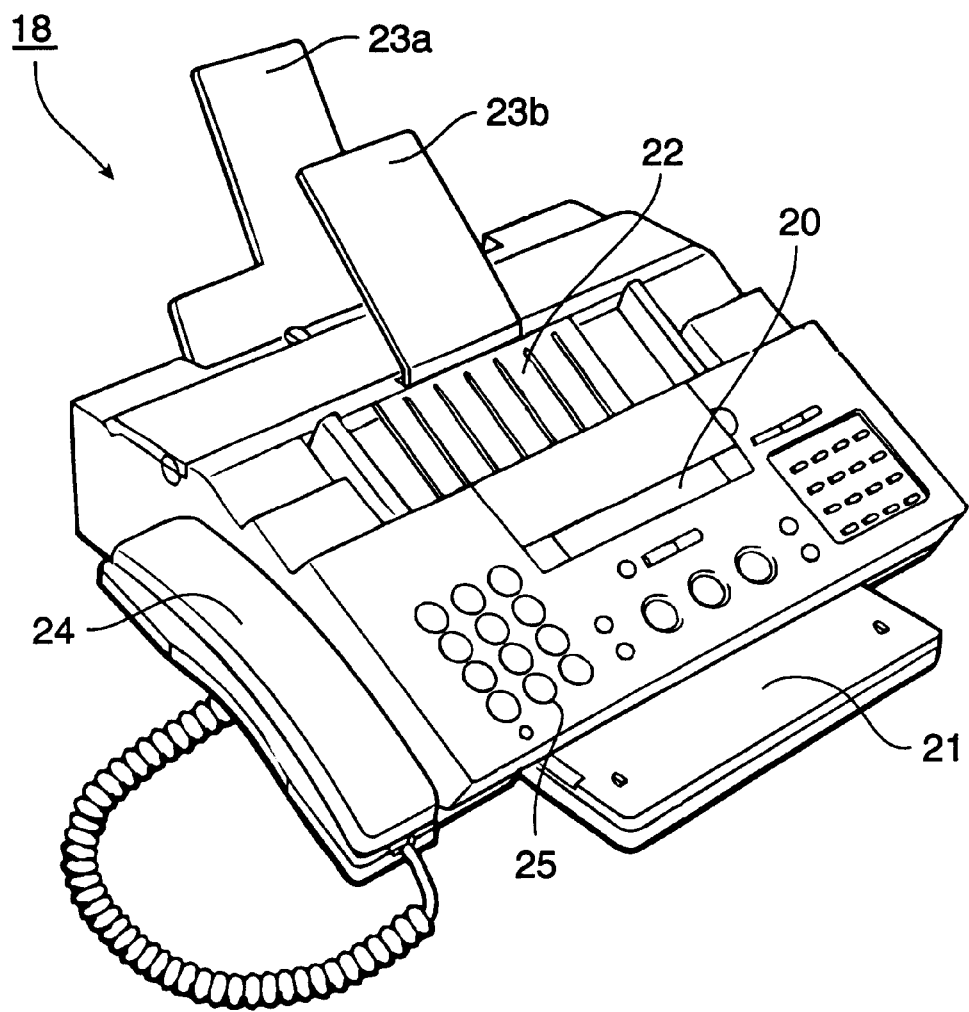
FIGS. 2A, 2B and 2C are, respectively, perspective views and left and right plan views of the facsimile machine shown in FIG. 1.
Figure 2B:
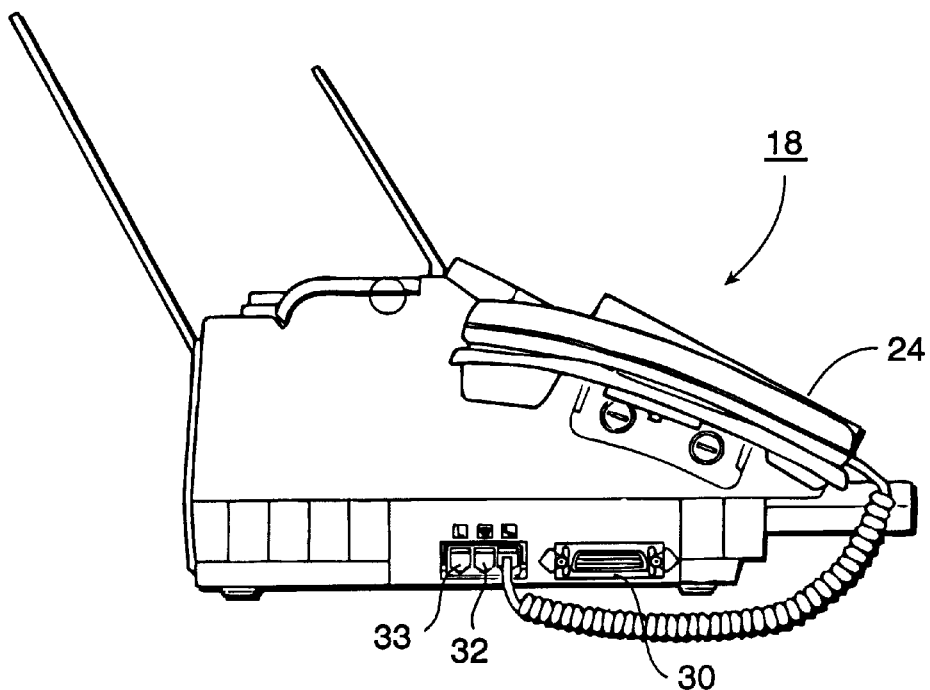
Figure 2C:
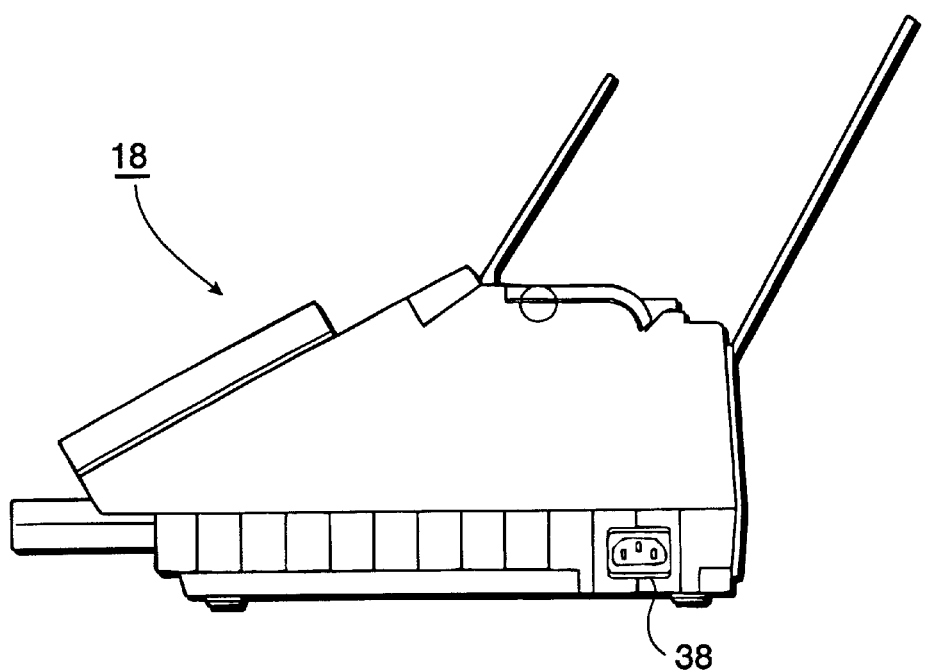

FIGS. 2A–2C are various views which illustrate features of facsimile machine 18. As shown in FIG. 2A, facsimile machine 18 includes, among other things, a display 20 for displaying messages to the user, such as phone number, status information, service information, etc., paper cassette 21, document tray 22, document supports 23A and 23B, handset 24, and keyboard 25.

As shown in FIG. 2B, facsimile machine 18 includes an 8-bit, parallel interface port 30. Interface port 30 is an IEEE 1284 bi-directional parallel interface which permits communication between facsimile machine 18 and computing equipment 10. Facsimile machine 18 is connected to computing equipment 10 by a bi-directional parallel interface cable, such as a Centronics compatible interface cable which is connected into the parallel interface port 30. Facsimile machine 18 also includes an answering machine/extension telephone jack 32, and telephone line jack 33 which connects facsimile machine 18 to an outside telephone line. As shown in FIG. 2C, the opposite side of facsimile machine 18 includes receptacle 38 which receives a power cord connector.

To use facsimile machine 18 as a conventional facsimile machine, a document to be faxed is inserted into document tray 22 and the fax number to which the document is to be sent is entered by alphanumerical keys on keyboard 25. To receive facsimile transmissions, the fax machine receives an input facsimile transmission through telephone line jack 33 and the document is printed on paper contained in paper cassette 21 and is output on receive document support 23A.

In the present invention, facsimile machine 18 can be used not only as a conventional facsimile machine, but also can be used under the control and management of computing equipment 10. Depending on the desired operation, computing equipment 10 configures facsimile machine 18 to be a printer, scanner, telephone, or a facsimile machine. Data to be transmitted to or received by computing equipment 10 is transmitted via parallel interface port 30. The operation and control of facsimile machine 18 will be discussed in greater detail below.

The combination of facsimile machine 18 and computing equipment 10 provides the capability of sending a facsimile from computing equipment 10, printing a previously received facsimile transmission, scanning images into computing equipment 10, receiving a facsimile and saving it on computing equipment 10, and dialing out over the phone line of facsimile machine 18.

The user can also send a facsimile transmission directly from a Windows application program such as Word or Wordperfect. By selecting the "print option" from those Windows application programs, a rasterized image of a document is written to disk 11 where it is automatically entered into a queue for transmission as a facsimile transmission. Used as a scanner, facsimile machine 18 scans in images with a resolution of approximately 200 dpi, and those images can be imported directly from a Windows application program that supports "scan" commands. Used as a facsimile machine, received faxes are accumulated in the memory of facsimile machine 18 and it is the job of computing equipment 10 to retrieve the received images from facsimile machine 18 to be stored on disk.

Figure 3:
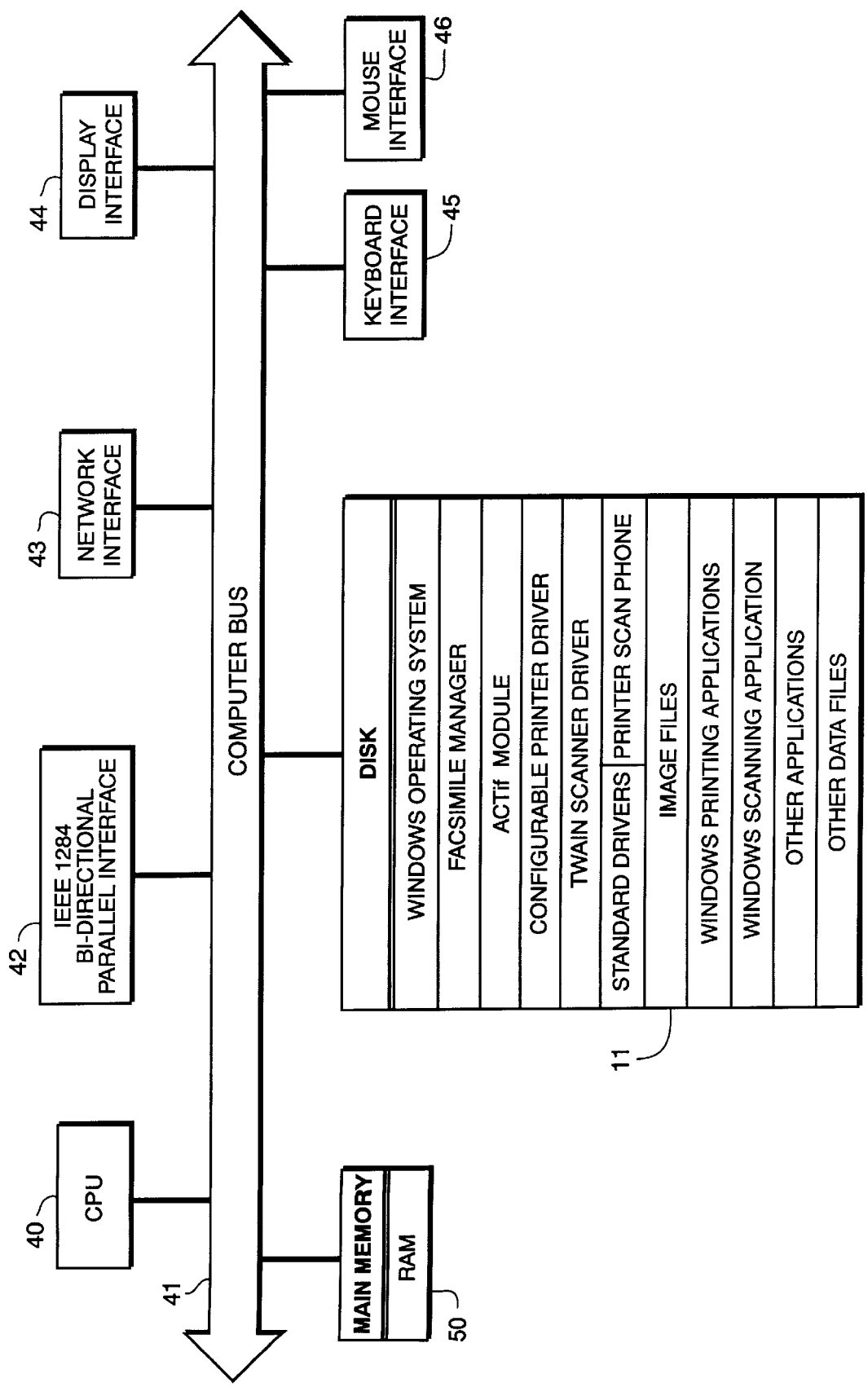
FIG. 3 is a block diagram of computing equipment shown in FIG. 1.

FIG. 3 is a detailed block diagram showing the internal construction of computing equipment 10. As shown in FIG. 3, computing equipment 10 includes central processing unit 40 interfaced with computer bus 41. Also interfaced with computer bus 41 is IEEE 1284 bi-directional parallel interface 42, network interface 43, display interface 44, keyboard interface 45, mouse interface 46, main memory 50, and disk 11.

Main memory 50 interfaces with computer bus 41 so as to provide random access memory storage for use by CPU 40 while executing stored program instructions from, for example, the facsimile manager program, standard driver applications, or any of the executable files in disk 11. More specifically, CPU 40 loads those programs from disk 11 into main memory 50 and executes those stored programs out of main memory 50.

In accordance with a user's instructions, stored application programs provide for image processing and manipulating of data. For example, a desktop processing program, such as Wordperfect® for Windows, may be activated by an operator to create, manipulate and view documents before printing (or faxing by using the configurable driver discussed below), or saving the created document. Similarly, various device drivers may be executed in order to scan-in image data, or operate the telephone handset of facsimile machine 18.

In addition to a Windows environment, two principle pieces of software are provided so as to permit communication between computing equipment 10 and facsimile machine 18. The first software application is a parallel port driver which provides an interface to hardware in computing equipment 10. The parallel port driver supports a bi-directional parallel port operating in accordance with the IEEE 1284. interface specification. The parallel port driver provides the capability of configuring the port for bi-directional operation, detecting the presence or absence of a peripheral, negotiating the style of bi-directional operation with the peripheral, sanding a block of data to the peripheral, receiving a block of data from the peripheral, and detecting changes in the electrical interface, such as power down, disconnect, or reset.

The second software application is an ACTif communication module. The ACTif communication module is a component which resides in a higher layer of the software hierarchy and communicates with facsimile machine 18 using the facilities and services of the parallel port driver.

[2. Operational Architecture]

In general, the ACTif communication module performs the operations of (1) receiving verification from a device driver that a driver's status has changed, (2) receiving a periodic timer message from the windows operating system which enables the ACTif communication module to become "active" and to perform regular duties (to be discussed below), (3) polling facsimile machine 18 in order to discover any newly scanned image files or newly received facsimile files, and, (4) when necessary, transferring files between computing equipment 10 and facsimile machine is.

[2.1 ACTif Communication Module]

Figure 4:
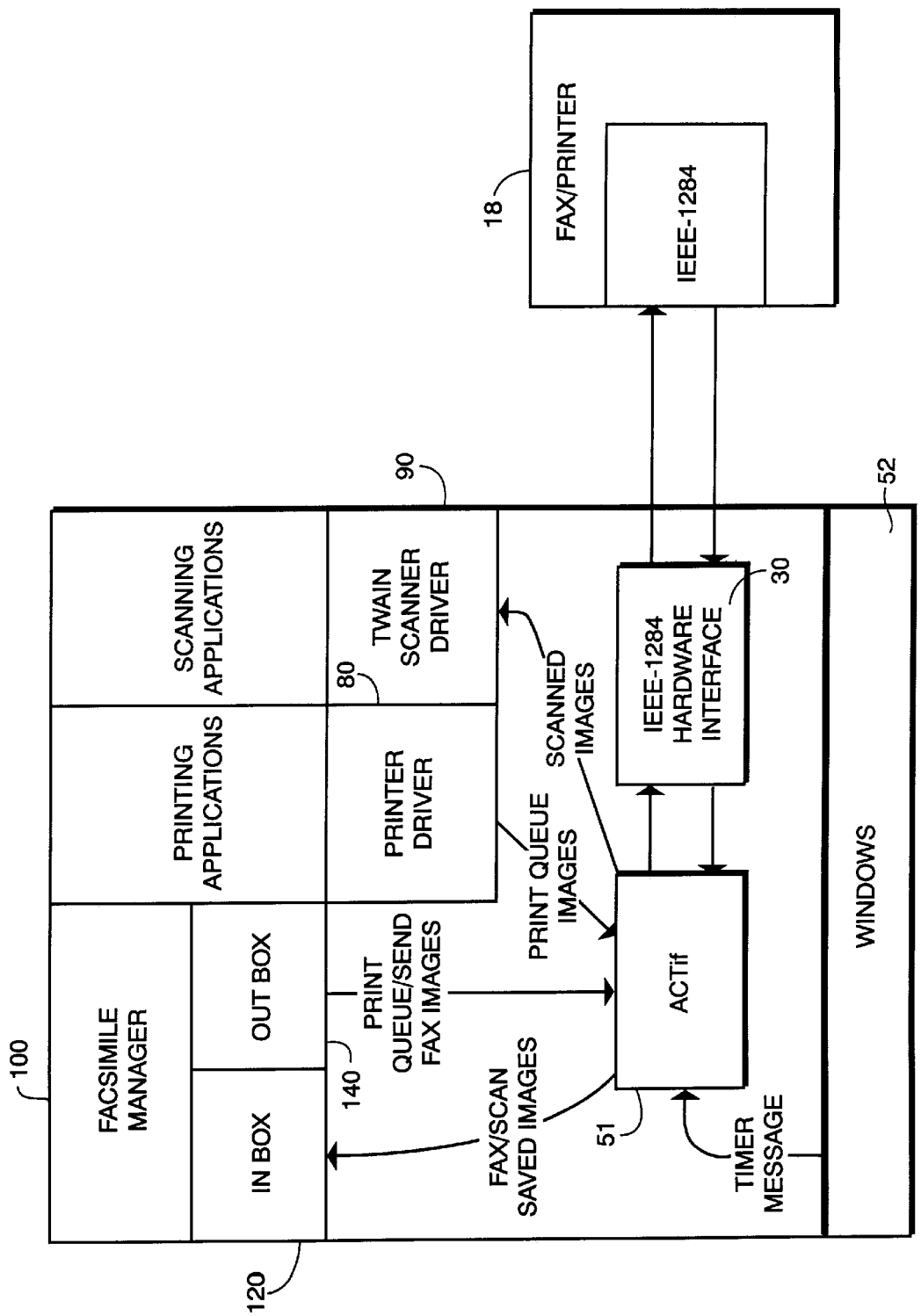
FIG. 4 is a block diagram showing software architecture including the ACTif communication module..

FIG. 4 illustrates the operational architecture between the ACTif communication module, computing equipment 10, and facsimile machine 18.

Transfer of control information between computing equipment 10 and facsimile machine 18 is accomplished using commands of ACTif communication module 51. Access to ACTif communication module 51 is provided through facsimile manager 100 and the configurable printer driver (discussed below in connection with FIG. 19) and the TWAIN scanner drive (discussed below in connection with FIG. 20). Regardless of whether control is being performed by facsimile manager 100 or one of the drivers, ACTif communication module 51 supervises the transfer of files, such as faxes to be sent, images to be scanned, importing received fax transmissions, and transferring images which are to be printed.

In operation, scanning images and receiving fax transmissions results in the creation of files in the memory of facsimile machine 18. The creation of a received fax file in the memory of facsimile machine 18 as a result of an incoming phone call or the initiation of a scanning operation creates an image data file in the facsimile machine's memory. In either case, ACTif communication module 51 retrieves scanned image files and received fax files as soon as they are discovered in the memory of facsimile machine 18. To send facsimile transmissions, a user initiated application program creates a fax data file. The data files are created using library services provided by ACTif communication module 51. When the files are complete, ACTif communication module 51 takes control and downloads the files to facsimile machine 18 via the bi-directional parallel port interface 30. In some instances, fax files are marked with delayed transmission or transmission at or after some specific time. In such cases, ACTif communication module 51 simply queues the various delayed send-requests and when the appropriate time arrives, ACTif communication module 51 downloads the queued file to facsimile machine 18 for transmission. Alternatively, it is possible to download the delayed send-request immediately, but with a flag which is used by facsimile machine 18 to delay transmission in accordance with its pre-programmed delayed-transmission capabilities.

When a user operates the scanner through a Windows application program, image files are stored in the memory of facsimile machine 18. ACTif communication module 51 regularly polls the memory of facsimile machine 18 in accordance with pre-scheduled timer messages transmitted by Windows operating system. When ACTif communication module 51 discovers the presence of a file in memory of facsimile machine 18, ACTif communication module 51 interrogates the file to determine whether the file type is equal to 0x01 (scan file) or a 0x03 (fax file).

In the case that the file type is equal to 0x01, scan file, the file is automatically retrieved and saved to whatever scanning application is active, such as a scanning initiated by facsimile manager 100 (see FIG. 6, below), in which case the scanned-in image is deposited in in-box 120 (see FIG. 7A, discussed below) or a scanning initiated by another Windows application program.

In order to provide scanning capabilities, ACTif communication module 51 processes a scanned-in image in three phases. The first phase is polling facsimile machine 18 for scanned-in image files. At times when no other commands are being passed between computing equipment 10 and facsimile machine 18, Windows operating system 52 regularly sends a timer message to ACTif communication module 51. The timer message operates to activate ACTif communication module 51 to poll the memory of facsimile machine 18. The poll consists of an ACTif command of GetFileID. Generally, the response returned will be a "null"

response, meaning that there are no scanned images available. The interval between successive GetFileID commands can be set.

The second phase of processing a scanned-in image is retrieving a scanned-in image from memory of facsimile machine 18 to disk 11 of computing equipment 10. When facsimile machine 18 response to a GetFileID command yields a file ID, ACTif communication module 51 retrieves the file and delivers the file to an active scanner driver, which is either a TWAIN driver or the scanner driver of facsimile manager 100. A scanned-in image file contains at least one page of image data, however, because facsimile machine 18 has an automatic document feeder, it is possible for a scanned file to contain multiple pages image data. A file is terminated when the document feeder detects that there are no more pages to feed. For example, in the case ACTif communication module 51 is retrieving a scanned-in image, then ACTif communication module 51 outputs a series of commands which include GetFileInformation, UploadFile (repeated as necessary for each document), and DeleteFile which deletes the file from the memory of facsimile machine 18. GetFileInformation command queues facsimile machine 18 as to the returns a number of pages in the file. For each page in the document, a sequence of commands is issued. The sequence of commands consists of GetPageInformation, SpecifyUploadingPageAttributes, and RequestImageData, which is repeated as necessary.

The third and last phase of processing a scanned-in image is for the case that a TWAIN scanner driver is the active scanner driver and not the standard scanner driver of facsimile manager 100. That is, for some Windows graphics application programs, the user can initiate a scanner operation which allows the user to import a recently scanned file directly into the application. Once the application has consumed the scanned in image from memory of facsimile machine 18, the entire image file is deleted automatically from memory.

A description of how ACTif communication module 51 retrieves and sends a facsimile transmission will now be provided. Facsimile machine 18 automatically answers an incoming telephone transmission in order to receive incoming facsimile transmissions. Each incoming facsimile transmission is stored in memory of facsimile machine 18 and is designated as a fax file. As with scanned image files, ACTif communication module 51 regularly polls facsimile machine 18 in order to discover any recently received faxes. Accordingly, if a received fax file is discovered in memory of facsimile machine 18, ACTif communication module 51 retrieves the fax file from the memory of facsimile machine 18 and stores the received fax file in in-box 120 of facsimile manager 100. Once the received fax has been retrieved and stored in in-box 120, it becomes available to the user. After the fax file has been discovered and loaded in in-box 120, the user can activate facsimile manager 100 to view the recorded fax file and to dispose of the fax file either by printing it, moving it, or simply deleting it.

The manner by which ACTif communication module 51 polls facsimile machine 18 for received fax files will now be discussed. At times when no other commands are being passed from computing equipment 10 to facsimile machine 18, ACTif communication module 51 regularly receives a timer message from the Windows operating system consisting of GetFileID command. This particular command is similar to the GetFileID command used to discover scanned images, but differs in the file type field. Generally, the response to the command will be a "null" response, which indicates that there are no received faxes in the memory of facsimile machine 18.

In the case that a fax file is present in the memory of facsimile machine 18, the fax file is retrieved from memory of facsimile machine 18 and stored in in-box 120 using a series of commands similar to the commands to retrieve a scanned-in image. However, the received faxes are stored in files with a file type equal to 0×03 (received file).

As with scanned-in images, the GetFileInformation command returns the number of pages in the file. For each page in the file, ACTif communication module 51 interrogates the facsimile machine 18 as to page information, attributes of the page, and requests for image data for each page, which is repeated as necessary. The received fax files are then stored in in-box 120 (see FIG. 7A, discussed below).

To send a fax transmission, computing equipment 10 sends a file from any windows application program and ACTif communication module 51 delivers the fax transmission file to facsimile machine 18. Specifically, in sending a fax file, the user prints a document from any windows application program that supports a printer output. As part of this print operation, the user initiates a "print setup" dialog which allows the user to select the facsimile as the output device. In the present invention, the print driver stores an image formatted file output of the print operation in the outbox 140 (see FIG. 7B) of facsimile manager 100. Outbox 140 contains the outgoing fax queue. In addition to fax image files, a companion file is created that specifies all the data necessary to send a fax, such as telephone number, time of day for transmission, and fax protocols. Once the fax file is stored in outbox 140, ACTif communication module 51 downloads the fax file through the bi-directional parallel port interface 30 to facsimile machine 18. In the case of a time delay transmission, ACTif communication module 51 stores the fax file in a fax queue and then transmits the fax file when the designated time arrives for the particular fax to be transmitted.

Facsimile manager 100, which is described in detail in section 2.2, provides the user with a means to view, manipulate and print received image files, such as a fax file. In order to print a image file, the print file must be downloaded from the in-box 120 to memory of facsimile machine 18 and then the file will be printed from memory of facsimile machine 18.

The task of down loading a fax file to the memory of facsimile machine 18, requires a series of commands generated by ACTif communication module 51. DownloadFile command and a DownloadEachPage command (repeated as necessary) are transmitted from ACTif communication module 51 to facsimile machine 18. Facsimile machine 18 in return transmits a DesignatePageAttribute command and TransferImageData commands. Once a file has been downloaded to facsimile machine 18, ACTif communication module 51 executes the transmission of the file by sending a GetFileID, PrintFile command, and GetPrintInformation command, which is repeated as necessary until each page in the document file is printed. When the file is downloaded, the characteristics of each page, resolution, data format, etc., are provided to facsimile machine 18 by the DesignatePageAttribute command which ACTif communication module 51 subsequently issues after each PrintFile command. For example, when a downloaded fax file is printed, PageAttribute command can designate a horizontal resolution with a 200 dpi and a vertical resolution of 100 dpi, and a data format of MR in order to control printing of the document.

Figure 5:
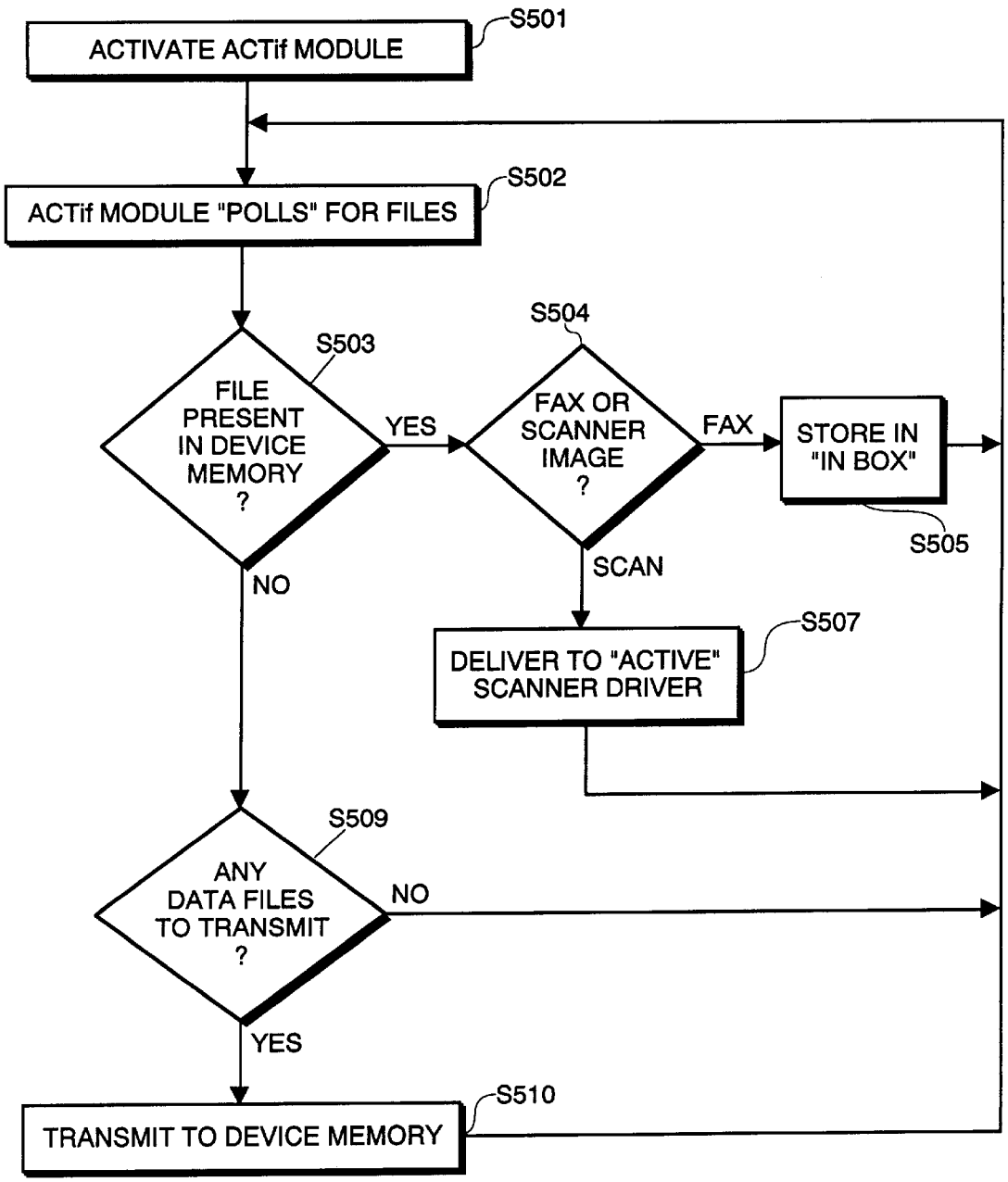
FIG. 5 is a flow diagram showing operation of the ACTif communication module.

FIG. 5 is a detailed flow diagram which describes the manner by which ACTif communication module 51 communicates with facsimile machine 18. Briefly, ACTif communication module 51, which resides in computing equipment 10, communicates with the microprocessor of facsimile machine 18 via the bi-directional hardware interface 30. ACTif communication module 51 includes a polling mechanism which is responsive to a timer message issued from Windows operating system 52. ACTif communication module 51 polls facsimile machine to determine whether an image file such as a scanned-in image or a received facsimile machine transmission is present in the memory of facsimile machine 18. In the case that image file exists in the memory of facsimile machine 18, ACTif communication module 51 stores the image file in either in-box 120 of facsimile manager 100, in the case the image file is a fax file, or in an active scanner driver such as the TWAIN scanner driver, in the case that the image file is a scanned image document. That is, ACTif communication module inspects a file identifier for determining whether the retrieved image file is a scanned in image file (identifier=0×01) or a received facsimile image file (identifier 0×03) and has a delivery mechanism for delivering the retrieved image file to an in-box of the facsimile manager 54 in the case when the file identified determines that the retrieved image file is a received fax image file and for delivering the retrieved image file to an active scanner driver in the case where it is determined to be a scanned in image file. ACTif communication module 51 also includes a download module for downloading a fax file to facsimile machine 18 via bi-directional parallel interface 30 for fax transmission by facsimile machine 18 and for downloading a print file to facsimile machine 18 via the bi-directional parallel interface for printout by facsimile machine 18.

Thus, in step S501, ACTif communication module 51 is loaded as part of the Windows start-up program. The ACTif communication module 51 includes a DLL (dynamic link library) which encapsulates the functionality of the ACTif module, and also includes a "shadow" program which runs in the background of the windowing environment. The "shadow" program ordinarily resides in a "startup" group of Windows and its execution is automatically initiated when Windows is launched. The "shadow" program remains in the background until such time that a predesignated event occurs, such as a facsimile is received in memory, an error message is generated during a self-test operation, or an error message is retrieved during diagnostic of facsimile machine 18.

In step S502, ACTif communication module 51 polls facsimile machine 18 for received files as a result of receiving timer messages from the Windows operating system 52. As discussed above, the frequency of the timer messages sent by the Windows operating system 52 can be set by the user. In step S503, ACTif communication module 51 determines if a file is present in the memory of facsimile machine 18. In the case that a file is present, flow proceeds to step S504.

In step S504, ACTif communication module 51 retrieves the file from memory of facsimile 18 and determines, based on the file identifier, whether the file is a fax file or scanned-in image file. If it is a fax file, the file is stored in in-box 120 of facsimile manager 100. However, in step S504, if it in a scanned-in image file, the file is delivered to an "active" scanner driver in step S507. In either case, after steps S505 or S507, flow returns to step S502 and ACTif communication module 51 continues polling facsimile machine 18.

However, if in step S503 no files exist in memory of facsimile machine 18, flow proceeds to step S509, where ACTif communication module 51 determines if any data files are to be transmitted to facsimile machine 18. If no files are to be transmitted, flow returns to step S502 and ACTif communication module 51 continues polling, However, in a case that there is a data file to transmit to facsimile machine 18, in step S510, the file is transmitted to facsimile machine 18. For example, ACTif communication module 51 will transmit a "write" file to be printed or a fax file to be transmitted by a facsimile transmission by facsimile machine 18.

[2.2 Facsimile Manager]

The facsimile manager is a Windows-based application program residing on disk 11 (FIG. 3) of computing equipment 10. When activated (or launched) by the user, the facsimile manager operates in conjunction with the ACTif communication module so as to make scanning, faxing and printing functionality of facsimile machine 18 available via bi-directional parallel interface 42. In addition, the facsimile manager allows the user to manage image files, including received-facsimile files which have been received by facsimile machine 18, send-facsimile files which have been created from another Windows application, scanned image files, and image files created from another Windows application. Documents managed within the facsimile manager can also be saved as regular files into the Windows operating system. From the facsimile manager, the user can also invoke telephone calling functions such as dialing numbers entered directly or selected from an address book.

More generally, the facsimile manager, in cooperation with the ACTif communication module, allows a user to scan in images using scanner functionality of facsimile machine 18, and store the scanned-in images in an in-box, to obtain a received-facsimile image file from facsimile machine 18 and store it in the in-box, to transmit a send-facsimile image file, such as an image file from the in-box or an out-box, to facsimile machine 18 for subsequent facsimile transmission thereby, to transmit an image file for printing to facsimile machine 18 for subsequent printing thereby, or to dial telephone handset to place a telephone call for subsequent ordinary voice communication on telephone handset 24.

Figure 6:
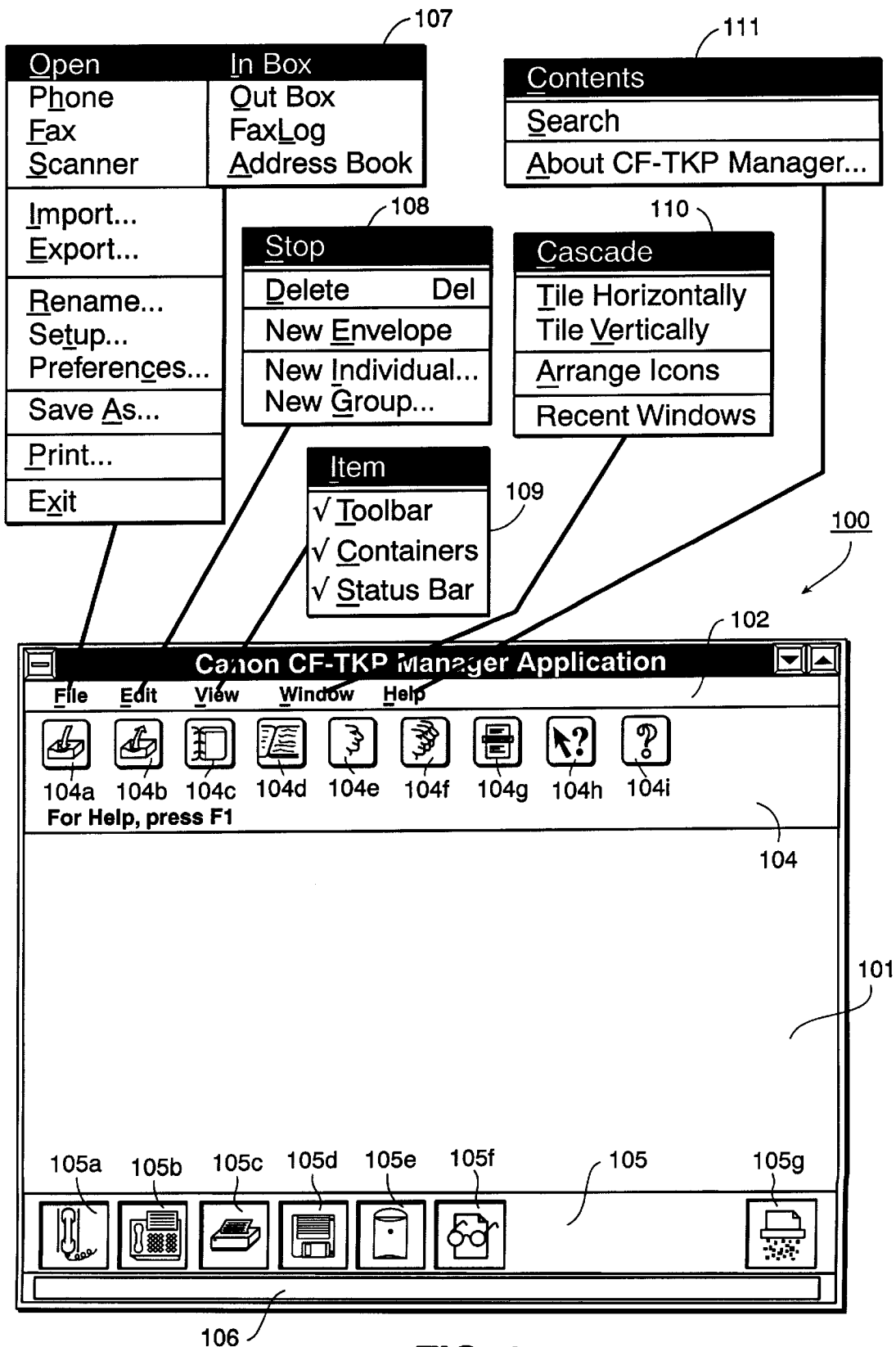
FIG. 6 is a view showing a display for the user interface of a facsimile manager according to the invention.

FIG. 6 shows the initial view presented to the user when the user launches facsimile manager 100. As shown in FIG. 6, the facsimile manager is a multiple-document-interface window which contains all of the various windows which it manages (such as windows showing contents of an in-box and an out-box, and windows showing contents of facsimile logs and address book entries) in client area 101. Facsimile manager 100 includes a menu bar 102, a speed bar 104, a container bar 105 and a message bar 106. Each of these bars allows the user to issue commands to the facsimile manager, and each will be described in turn.

More specifically, menu bar 102 includes a "File" menu item, a "Edit" menu item, a "View" menu item, a "Window" menu item, and a "Help" menu item. When one of these menu items is selected by the user, a pull-down menu, as shown in the insets of FIG. 6, is provided to the user. Thus, by selecting the "File" menu item, a pull-down menu 107 is displayed to the user. Pull-down menu 107 allows the user to issue one of the following commands: (1) an open command which opens a sub-menu with (a) an in-box item which causes an in-box to be displayed for summarizing a queue of in-coming items such as files from facsimile machine 18 to the facsimile manager (received faxes, scanned images, and the like), (b) an out-box item which causes an out-box to be displayed for summarizing outgoing items Such as files going from the facsimile manager to facsimile equipment 18 (send-facsimiles, printed documents, and the like), (c) a fax log item which causes a log of facsimiles to be displayed, and (d) an address book item which causes an address book which is a collection of names, telephone and facsimile numbers, to be displayed to the user; (2) a phone item which issues a command for the facsimile manager to operate as a telephone dialer; (3) a fax command which enables facsimile manager 100 to send a file in its in or out-box to facsimile machine 18 for subsequent facsimile transmission thereby; (4) a scanner item which allows facsimile manager 100 to capture a document scanned in by facsimile machine 18 as a .TIF (for "tagged image file format) image file in its in-box; (5) an import command which causes address book entries from another source to be imported in comma-delimited or tab-delimited ASCII text file format into the address book of the facsimile manager; (6) an export command which causes the contents of the facsimile manager's address book to be saved to a file for use by another application in standard comma-delimited or tab-delimited ASCII text file format; (7) a rename command which causes facsimile manger to rename a document in its in or out-box; (8) a set up command by which facsimile manager 100 stores configuration information for use in sending facsimiles and placing telephone calls; (9) a preferences command by which a user is permitted to enter customization of particular features; (10) a save as . . . command by which a user saves a file in facsimile manager's in or out-box to the Windows operating system; (11) a print . . . command by which a file or address book entry is printed; (12) a print fax log command by which the entire fax log is printed; (13) a print address book command by which all address book entries are printed; and. (14) an exit command by which the user may terminate execution of the facsimile manager.

Selecting the "Edit" menu item causes a pull-down menu as shown at 108 to be displayed to the user so as to permit the user to issue various commands related to child windows which appear in client area 101. Edit pull-down menu 108 includes the following commands: (1) a stop command which causes print or facsimile transmission of a document currently active in the out-box to be discontinued; (2) a delete command which causes an entry in the in or out-box, the activity log or the address book to be deleted; (3) a new-envelope command which creates a new envelope (which is discussed below in connection with FIG. 9) to be created; (4) a new-individual command which allows a user to add a new entry in the address book; and (5) a new-group command which allows a user to define a new group for simultaneous facsimile transmission.

Selecting the "View" menu item causes pull-down menu 109 to be displayed to the user. The view pull-down menu 109 allows the user to issue the following commands: (1) an item command by which the user causes the currently-selected item in the in or out-box to be displayed in the viewer window (as discussed below in connection with FIG. 17) or, if the currently selected item is in the fax log window, to show a dialog summarizing the selected log entry, or if the currently-selected item is in the address book, opens the address book entry for editing; (2) a tool bar check box by which the user can select or de-select display of speed bar 104; (3) a container check box by which a user can select or de-select display of container bar 105; and (4) a status bar check box by which a user can select or de-select display of message bar 106.

Selecting the "Window" menu item causes the pull-down menu illustrated at 110 to be displayed for selection by the user. Window pull-down menu 110 includes the following entries, all related to standard windows commands for arranging windows on the screen, and including a list of currently open but minimized (or, "iconized") child windows: (1) a cascade command which causes currently opened windows in client area 101 to be cascaded; (2) a tile horizontally command; (3) a tile vertically command which respectively cause windows to be tiled horizontally or vertically; (4) an arrange icons command which causes icons for minimized windows to be rearranged; (5) a recent Windows command which displays a list of recently displayed windows so as to permit recall of those windows; and (6) check boxes which permit a user to jump immediately to the checked window.

Selecting the "Help" menu item causes help pull-down menu 111 to be displayed. Help pull-down menu 111 provides standard Windows help functionality.

Speed bar 104 includes icons by which the user can issue commands for selected ones of the foregoing commands without the need for selecting a menu item and subsequently selecting a command from the resulting pull-down menu. In the currently preferred embodiment, speed bar 104 includes icons which permit a user to issue commands to display the in-box (104a), the out-box (104b), the address book (104c), the fax log (104d), new individuals (104e), new groups (104f), scan (104g), context-sensitive help (104h) and help (104i).

Container bar 105 contains active container icons which can be used by the user for various drag-and-drop options. That is, by dragging a selected item from the in-box or the out-box or the address book into one of the container items, the user can cause facsimile manager 100 to initiate a series of pre-defined actions. Like speed bar 102, icons on container bar 105 represent selected ones of the commands available to the user from menu bar 102 but provide access to those commands without the need for the user to select one of those menu items and subsequently select a command from the pull-down menu. Thus, by dragging an address book entry to phone icon 105c, facsimile manager 100 causes a phone number to be dialed by facsimile machine 18; the dialer is discussed below in connection with FIG. 18. Dragging an image file to facsimile icon 105b causes facsimile manager 100 to initiate facsimile transmission of the dropped document in cooperation with the ACTif communication module. Dropping a document to printer icon 105c causes facsimile manager 100 to initiate print our of the dropped document in cooperation with the ACTif communication module. Dropping a document on save icon 105d causes a standard Windows "Save As . . . " dialog to be opened so as to permit the user to save the dropped document in the Windows operating system. Dropping a document on envelope icon 105e opens a new envelope dialog containing the dropped document; envelopes are discussed below in connection with FIG. 9. Dropping a document on view icon 105f opens a viewer window with the dropped document as its contents; the viewer module is discussed below in connection with FIG. 17. Finally, dropping a document on delete icon 105g removes the dropped document from the facsimile manager.

The functionality discussed above is, while presently preferred, only illustrative of various possibilities. For example, it is possible to provide additional tools within facsimile manager 100 such as an OCR translator. In such an instance, it is also possible to provide an OCR icon in container bar 105 to permit easy drag-and-drop use.

Figure 7A:
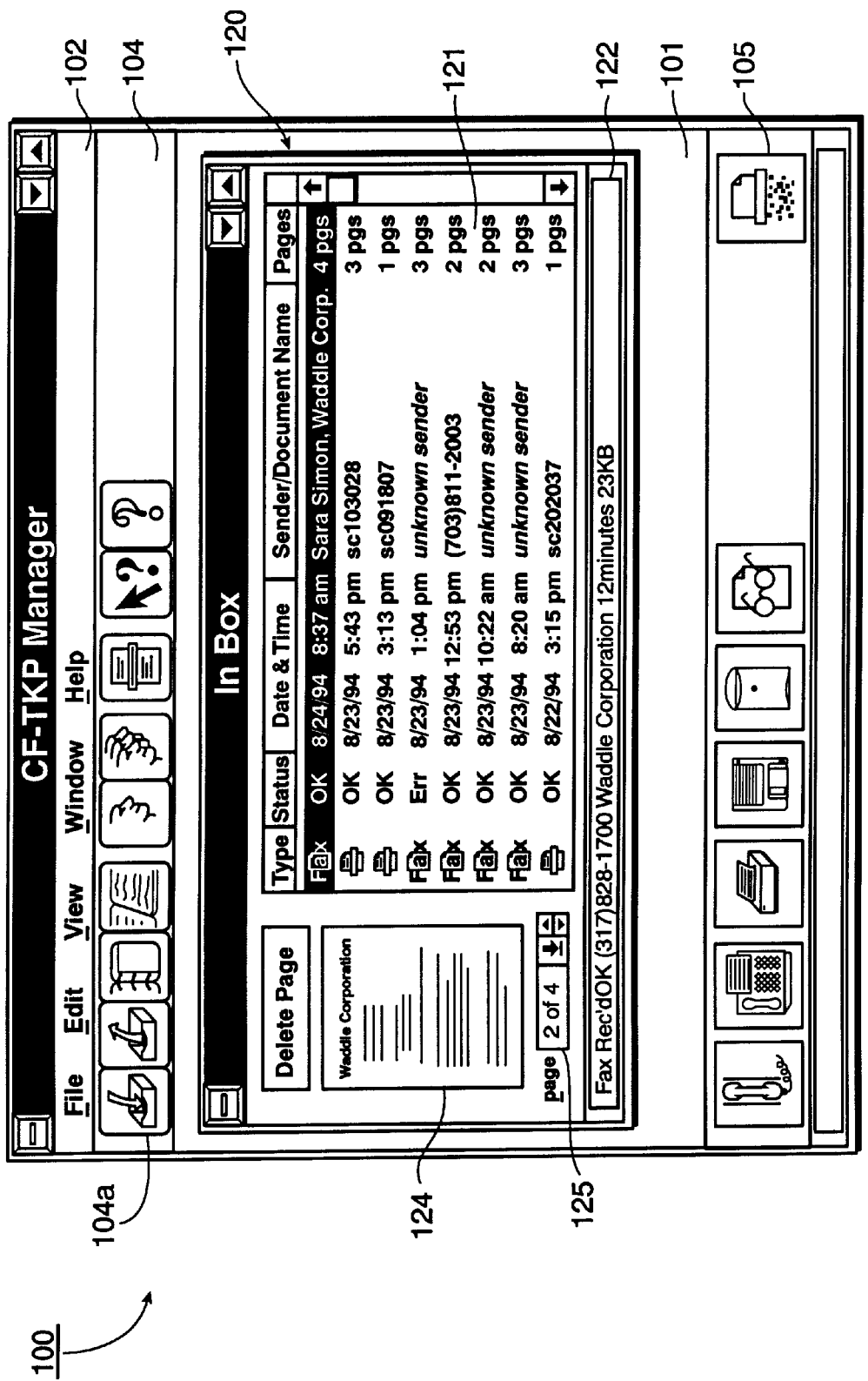
FIG. 7A is a view for explaining an in-box display.
Figure 7B:
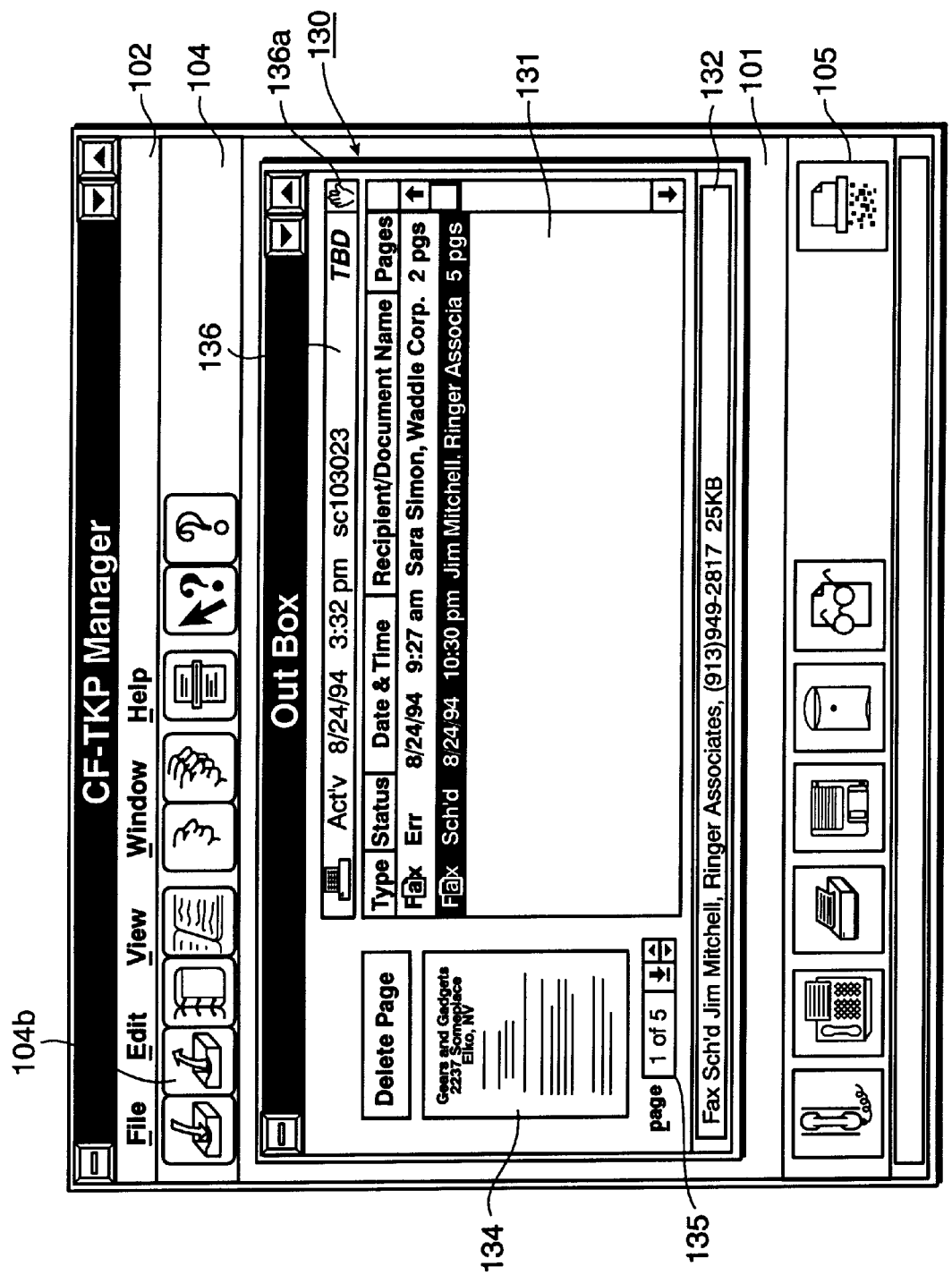
FIG. 7B is a view for explaining an out-box display.

FIGS. 7A and 7B, respectively, show displays of the in-box and the out-box for facsimile manager 100. In cooperation with the ACTif communication module, which as described above polls facsimile machine 18 via the bi-directional parallel interface to determine whether a scanned-in image or a received-facsimile image is present in facsimile memory and which obtains the scanned-in image or the received-facsimile image via the bi-directional interface and which also accepts images and send-fax image from other Windows application programs, the in-box stores receive-facsimile image and images from the ACTif communication module, and the out-box stores send-facsimile image and scanned-images.

More specifically, FIG. 7A shows in-box 120 displayed in client area 101 in response to activation of button 104a of speed bar 104, or in response to issuance of the "In-Box" command from the pull down menu from the file menu item on menu bar 102. As seen in FIG. 7A, in-box 120 includes a list 121 of all files coming into the facsimile manager such as scanned-in document images and received facsimile images, as well as image document created by other Windows applications. By default, the list is ordered chronologically from the most recently received document back to the oldest document. The user may select an item from the list and, as discussed above, may also drag-and-drop an item into any one of the container icons in container bar 105.

For each document in list 121, in-box 120 indicates iconically the kind of document (for example, whether the document is a posted image document, a saved image document, a received-facsimile document, or an envelope document), the status of the document, the date and time that the document was created, the sender/document name and the number of pages in the document. Column headers in list 121 are buttons which the user can press to sort the list by type, status, date and time, sender/name or number of pages. Pressing the buttons serially allows the user to sub-sort by different fields. Thus, by first pressing "status" and then "date and time". list 121 is sorted by status within date and time.

In-box 120 further includes an information box 322 which displays more information about the items selected in list 121.

In-box 120 further includes a thumbnail view area 124 which displays a thumbnail rendering of a document selected from list 121. The thumbnail rendering is a small version of the first page of the document, and by manipulation of page area 125 the user can browse through multi-page documents. Thus, thumbnail view area 124 provides a user with visual clues as to the identity of particular documents that are selected from list 121. Moreover, by selecting thumbnail view area 124, such as by double-clicking on that area, the selected document is automatically provided to viewer 105f so that the document may be viewed in larger-than-thumbnail size. Viewing is described below in more detail in connection with FIG. 17.

Unless a document is selected in in-box window 120, the facsimile, print and save as icons (105b, 105c and 105d, respectively) are disabled. Selecting a document reactivates those icons. An item dragged and dropped on the save icon will bring up a standard Windows "Save As . . . " dialog asking for a name for the file and where it should be saved. Dragging-and-dropping a document on the print icon 105c will cause the selected document to be printed. Finally, dragging-and-dropping an item on fax icon 105d will bring up the send fax dialog and allow a user to forward a received fax or transmit a scanned document easily. Printing and faxing are carried out in cooperation with the ACTif communication module, as described elsewhere.

Viewing a selected in-box item can be performed by double clicking on thumbnail viewer 124, as described above, and also by dragging-and-dropping the document on view icon 105f.

FIG. 7B shows out-box 130 displayed in client area 101 in response to activation of out-box icon 104b from speed bar 104 (or in response to issuance of the "Out-Box" command from the file pull-down menu on menu bar 102). Like in-box 120, out-box 130 includes a list 131 of all files currently being transferred or already transferred to facsimile machine 18, a message area 132, a thumbnail viewer 134, and a page browser 135.

Documents to be printed or faxed (or scheduled to be printed or faxed) are arranged in list 131. By default, the list is arranged in three sections: the currently active item is set apart from list 131 at its top in area 136, followed by queued items in lower area 131, followed by completed or failed items. The currently active item includes a stop button 136a which, in response to user activation thereof, causes the currently active item to cease transmission, thereby stopping on-going faxes or prints. The list iconically indicates the type of file (for example, a send-fax item or a printable item), the status of the document, the date and time of the document, the recipient/document name and the number of pages. Column headers are buttons which can be pressed to sort the list by type, status, date and time, recipient/document name or number of pages. Pressing the buttons serially allows the user to sub-sort by different fields. Thus, by first pressing "Recipient/Document Name" and then pressing "Date and Time", list 131 is sorted by recipient within date and time.

When an item in the list is selected, more information about the selected item is displayed in message area 132, and a thumbnail image of the document is shown in thumbnail viewer 134. Operation of the thumbnail viewer is identical to that of the thumbnail viewer in in-box 120.

Unless a document in list 131 is selected, the fax icon, print icon, and save icon (105b, 105c and 105d) are all disabled. Selecting an item reactivates those items. Dragging-and-dropping a document on save icon 105d will bring up a standard Windows "Save As . . . " dialog asking for a name of the file where the document should be saved. Dragging-and-dropping a document on print icon 105c will cause the document to be printed by facsimile machine 18. Dragging-and-dropping a document on fax icon 105d will cause that document to be faxed by facsimile machine 18. In addition, a send-fax dialog will be brought up allowing the user to address the fax appropriately. Printing and faxing on facsimile machine 18 are carried out in cooperation with the ACTif communication module, as described elsewhere.

Viewing a selected out-box item can be done by selecting the item and activating the view command, or by dragging-and-dropping the item to viewer icon 105f, or by double clicking thumbnail area 134.

Figure 8:
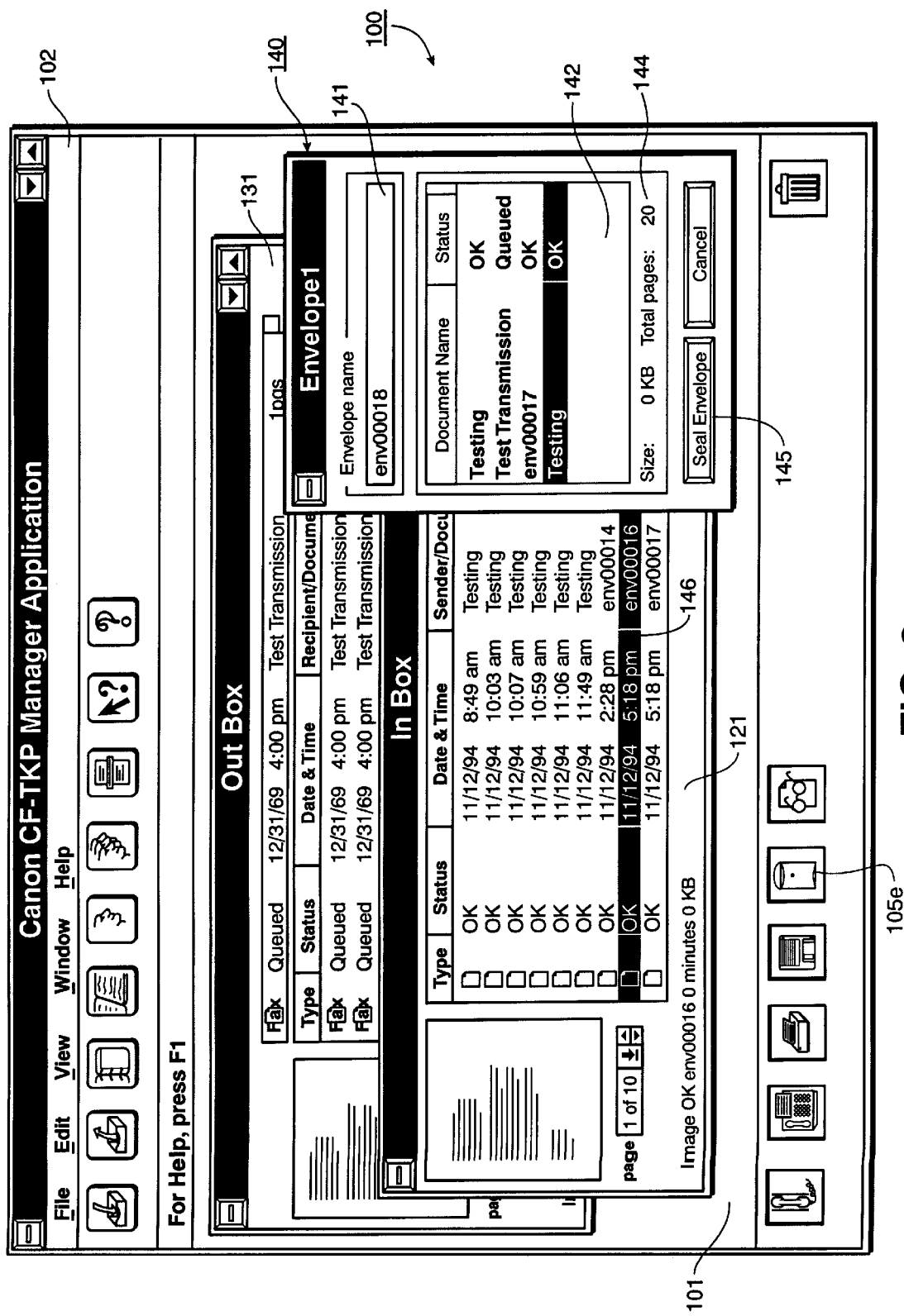
FIG. 8 is a view for explaining an envelope display.

FIG. 8 is a view for explaining envelope processing, and comprises the display presented to the user when the user selects envelope processing by dropping a document into icon 105e or by selecting envelope processing from the "Edit" menu item. Shown in FIG. 8 is facsimile manager 100 having displayed in its client area 101 a representative in-box 121 and a representative out-box 131. Also displayed in client area 101 is envelope 140. An envelope is a special entity within the facsimile manager which, like a real envelope, is a container for image files. Envelope 140 is created when the user selects the new envelope command from the "Edit" menu item on menu bar 102, or when the user clicks on envelope icon 105e, or when the user drags-and-drops a document file from either the in or the out-box to envelope icon 105e. Any one of these events causes envelope 140 to be displayed and, in addition, if a document was dragged-and-dropped into icon 105e, that document is automatically added to the envelope. Other documents can be added to the envelope by dragging items either to envelope 140 or to envelope icon 105e.

Envelope 140 includes envelope name 141 (the user may select any name for the envelope but in the absence of a selection a default name is assigned) and a list 142 of documents in the envelope. It is noted that envelopes themselves can be dropped into an envelope. The list 142 shows the document name and the number of pages associated with each document. Also shown at message area 144 are the total number of pages in the envelope as well as the size of the envelope.

Envelope 140 also includes a seal envelope button 145. Once the seal envelope button is pushed, the envelope dialog is torn down and the newly-created envelope is inserted in the in-box such as is shown at 146. Once the envelope is created and inserted in the in-box, it is treated as any other document file in the in-box and may, for example, be printed, faxed, saved or viewed.

Figure 9:
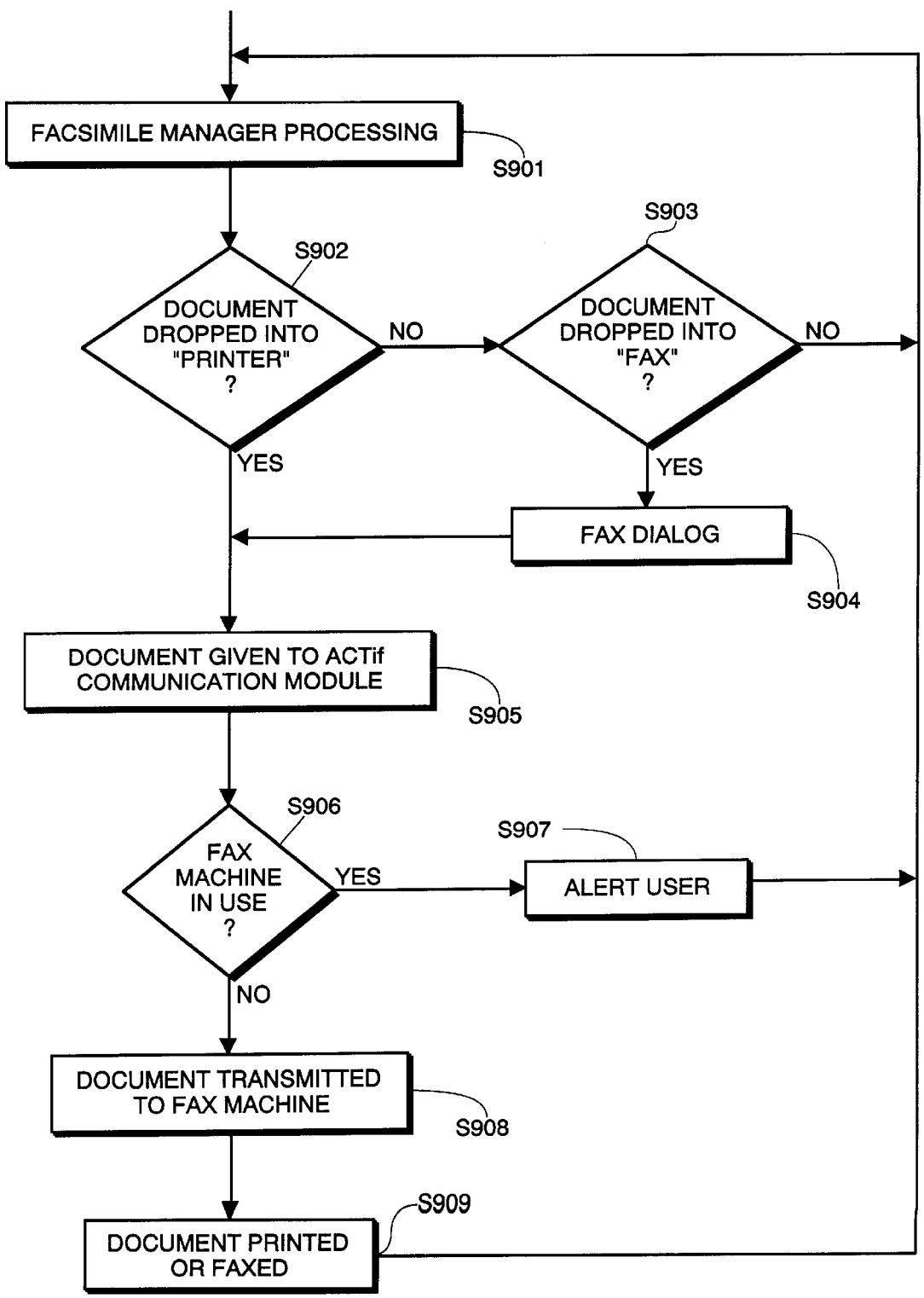
FIG. 9 is a flow diagram showing printing and faxing processing.

FIG. 9 is a flow diagram for explaining processing when a document (or envelope) is printed or faxed, such as by dragging-and-dropping the document (or envelope) to print icon 105c or fax icon 105b. Specifically, the process steps shown in FIG. 9 illustrate coordination between facsimile manager 100 and the ACTif communication module, whereby the ACTif communication module accepts image data from the facsimile manager and transmits it via the bi-directional parallel port to facsimile machine 18 for faxing or printing thereby.

Thus, in the course of ordinary facsimile manager processing (step S901), step S902 determines whether a document (or envelope) has been dropped into printer icon 105c, or if printing has been commanded from the "File" menu item on menu bar 102. If printing services have been requested, then flow advances to step S905. On the other hand, if a document has not been designated for printing, then flow advances to step S903 in which facsimile manager 100 determines whether a document (or envelope) has been dropped into facsimile icon 105b or if facsimile processing has been commanded from the "File" menu item in menu bar 102. If facsimile services have not been requested, then flow returns to step S901 to continue ordinary facsimile manager processing.

On the other hand, if facsimile processing has been requested, then flow advances to step S904 in which the user is given a facsimile dialog by which the user can appropriately address the facsimile and, if desired, create a fax cover sheet.

Flow then advances to step S905 in which facsimile manager 100 gives the document, whether a to-be-printed or to-be-faxed document, to the ACTif communication module. The ACTif communication module determines whether facsimile machine 18 is already in use, such as by receiving a facsimile or by printing or transmitting a facsimile. If facsimile machine 18 is already in use, then flow advances to step S907 in which the user is alerted that facsimile machine 18 is not available and that the requested printing or facsimile services should be tried again later. On the other hand, if facsimile machine 18 is not in use, then flow advances to step S908 in which ACTif communication module transmits the document to facsimile machine 18 via bi-directional parallel port. The document is transmitted as a single file regardless of the number of pages; that is, even if a multi-page document is transmitted to facsimile machine 18, the multi-page document is contained in a single file. The ACTif communication module confirms that the file containing the document has bean received by facsimile machine 18, after which flow advances to step S909 in which facsimile machine 18 prints or faxes the document, as requested.

Figure 10:
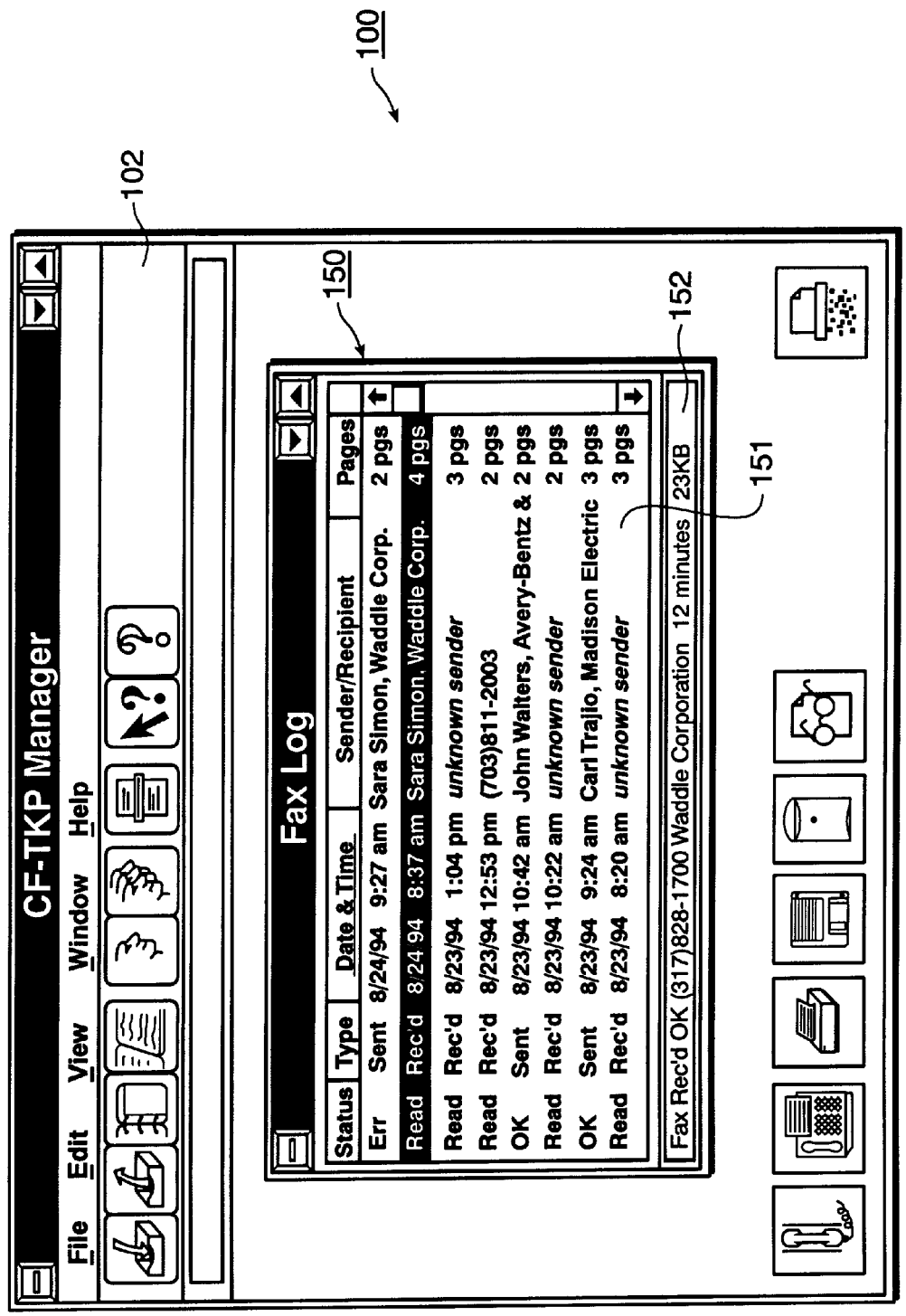
FIG. 10 is a view for explaining a fax log.

FIG. 10 is a view for explaining facsimile log services in facsimile manager 100. Shown in FIG. 10 is a fax log 150 which is displayed in client area 101 in response to activation of fax log speed bar icon 104c or in response to activation of fax log processing from the "File" menu item in menu bar 102.

Fax log 150 is a further child window of facsimile manager 100 and contains a list 151 of all sent and received facsimiles. By default, the list is ordered chronologically from the most recent back to the oldest. Fax log 150 maintains 12 months of log files, and the user may select to look at different months of log information.

List 151 includes status, type, date and time, sender/recipient, and number of pages for each item. Column headers for list 151 are buttons which can be pressed by the user to sort the list differently than presented. As before, the buttons can be pressed serially to obtain sub-sorting.

When an item in the list 151 is selected, more information about the item is displayed in message area 152 at the bottom of fax log 150. The information displayed is specific to the type of document. If a comment has been associated with an outgoing fax, such as during user creation of a fax cover sheet, then this comment will be visible in message area 152.

Since fax log 150 is simply a list of fax items, and not a list of documents like in the in and out boxes, fax icon 105b and printer icon 105c are both disabled while fax log 150 is the active window. The user can print the fax log or save it to a file from the "File" menu item in menu bar 102, or, when the fax log is minimized to an icon, the fax log icon can be dragged-and-dropped on the print tool 105c or save tool 105d. The fax log 150 can also be printed by selecting the print fax log command from the "File" menu item.

FIGS. 11 through 15 are views for explaining address book processing provided by facsimile manager 100. The address book provides a central repository for all user contacts. It contains names, organizational affiliations, phone numbers and fax numbers. The address book contains both individual entries (i.e., entries for a single person), as well as group entries (i.e., collections of individual entries which is treated as a single entry when addressing a facsimile such that each of the individuals in the group receive a copy of the fax). Individual entries and fax group entries are distinguished within the address book by icons and, by convention, by the name of the entry.

The address book is accessible from the send-fax dialog box (described below in connection with FIGS. 19a through 19e), as well as from within the facsimile manager by selection of address book icon 104d or from the address book command in the "File" menu item in menu bar 102. While within the facsimile manager, the user can add, delete or edit address book entries, or initiate a telephone call, or address an envelope by dragging-and-dropping an entry or entries on the appropriate container object. While within the send fax dialog, the user is limited to selection of an entry or entries.

Figure 11:
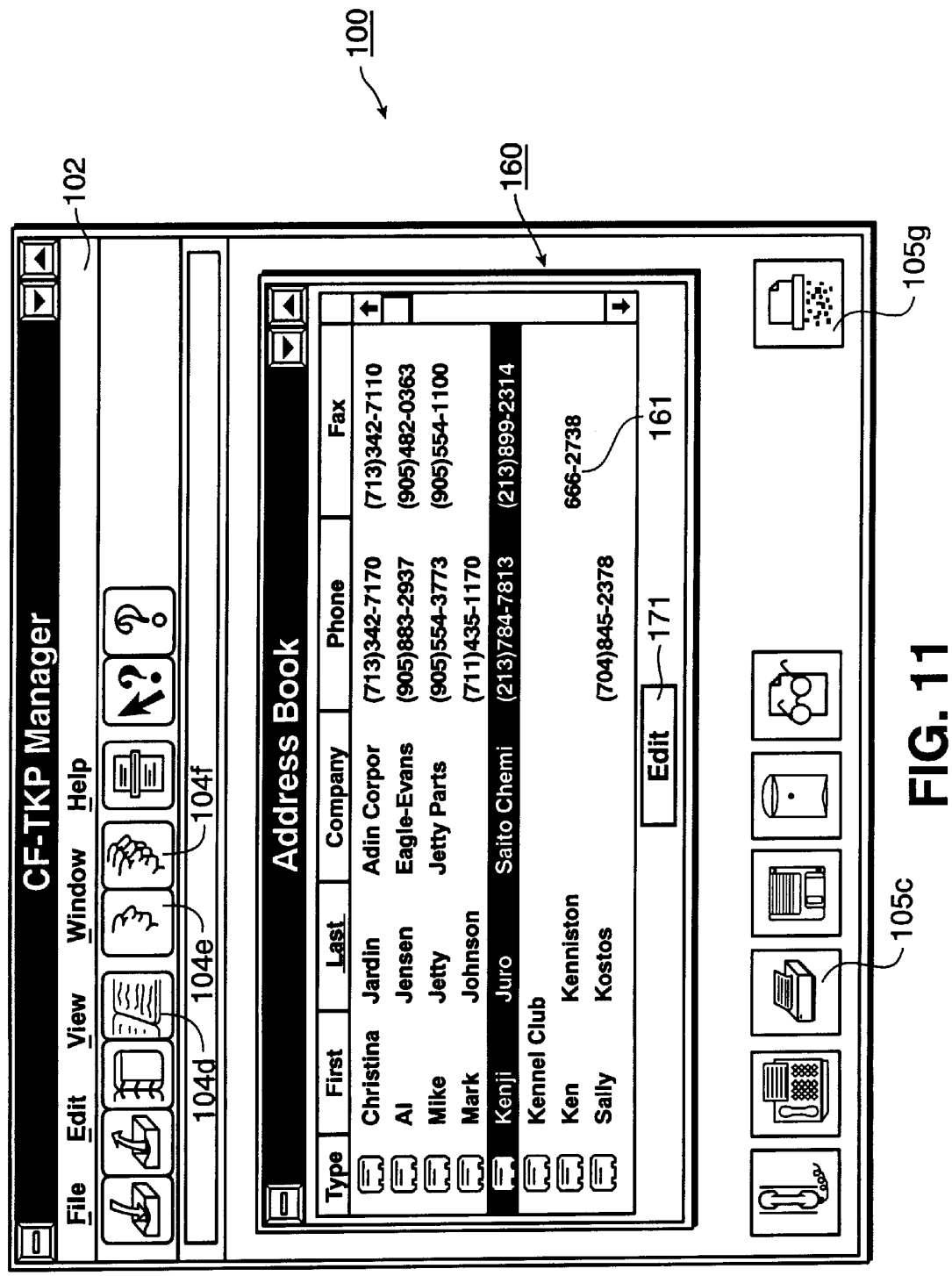

FIG. 11 shows an address book dialog box 160 which contains a scrolling list 161 of entries ordered alphabetically by name. The list includes a type (i.e., either individual or group) entry, a first and last name entries, a company entry, a voice telephone number and a facsimile number. Column headers of list 161 are buttons which the user can click to reorder the list, and can serially click the buttons to sub-sort the list.

When an item in address book 160 is selected, the user can use a delete command from the "Edit" menu item in menu bar 102, or the user can drag-and-drop the selected item onto the delete icon 105g.

When address book 160 is the active window within facsimile manager 100, if an item or items from the address book are selected, the selected items may be printed by selecting the selected item from the "File" menu item, or by dragging-and-dropping the selected items on print icon 105c. The user can print the entire address book by selecting the print address book command from the "File" menu item, or by dragging-and-dropping a minimized window icon for address book 160 on print tool 105c.

Figure 12:
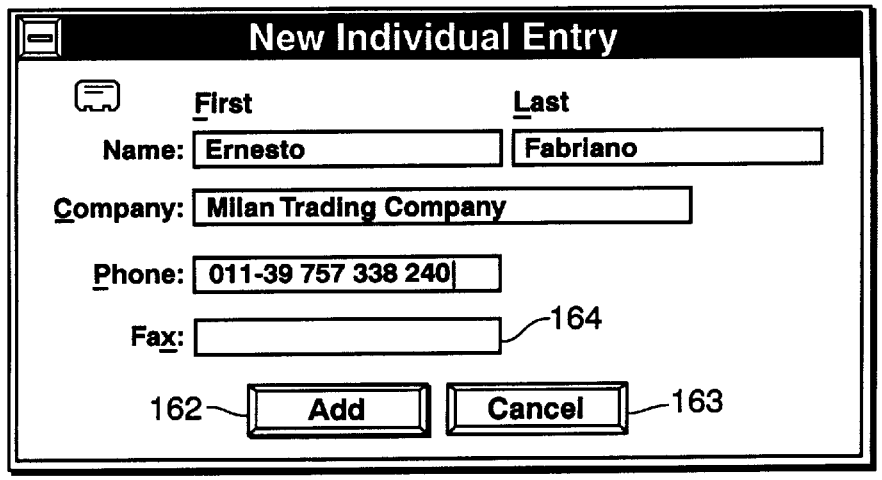

FIG. 12 shows a dialog box displayed to the user when new individual icon 104e is selected from speed bar 104 or when the new individual command is issued from the "Edit" pull-down menu. The dialog box illustrated in FIG. 12 allows a user to enter all data needed to create a new entry for an individual in address book 160. Add button 162 is disabled until the last name and at least one telephone number (i.e., either voice or facsimile) has been entered. If the user clicks on cancel button 163, the dialog is torn down and the user returns to address book 160.

When a new fax is received, if the telephone number of the sender is known the facsimile manager but there is no corresponding entry in the address book with that number, the telephone number can be added to the address book automatically. Specifically, by selecting new individual icon 104e while the received fax is selected in the in-box, or while reading the fax, the new individual dialog box shown in FIG. 12 will appear with the number pre-entered in fax field 164. Likewise, if the user sends a fax or calls a telephone number which is not already in the address book, the user can quickly make a new entry by selecting new individual entry 104e and completing the dialog box shown in FIG. 12.

Figure 13:
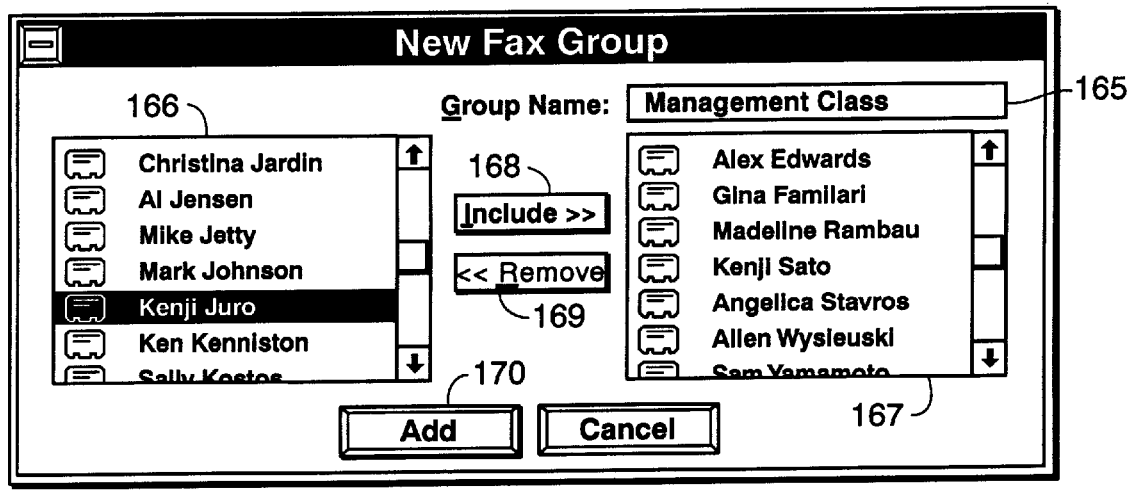

When the new group icon 104f is selected, or when the new group command is issued from the "Edit" menu item in menu bar 102, the dialog box shown in FIG. 13 is displayed so as to allow the user to define a group of address book entries which can be treated as a single group entry for sending a document to several individuals at one time. The name of the group may be entered by the user in field 165. The dialog also includes two scrolling lists: a left list 166 which includes all address book entries which have a facsimile number, including group entries, and a right list 167 which is a container for group members. When an item in left list 166 is selected, include button 168 is enabled. If the user clicks include button 168, the item in list 166 is removed and added to group list 167. Conversely, when an item in group list 167 is selected, remove button 169 is enabled. If the user clicks remove button 169, the selected item is removed from group list 167 and returned to list 166 of addressees. The name of the group is defined by the user in text entry field 165 at the top right of the dialog box. Add button 170 is disabled until a name has been entered in field 165 and the group has at least one entry in list 167. It should be noted that a group can contain other groups as well as individuals.

Figures 14, 15:
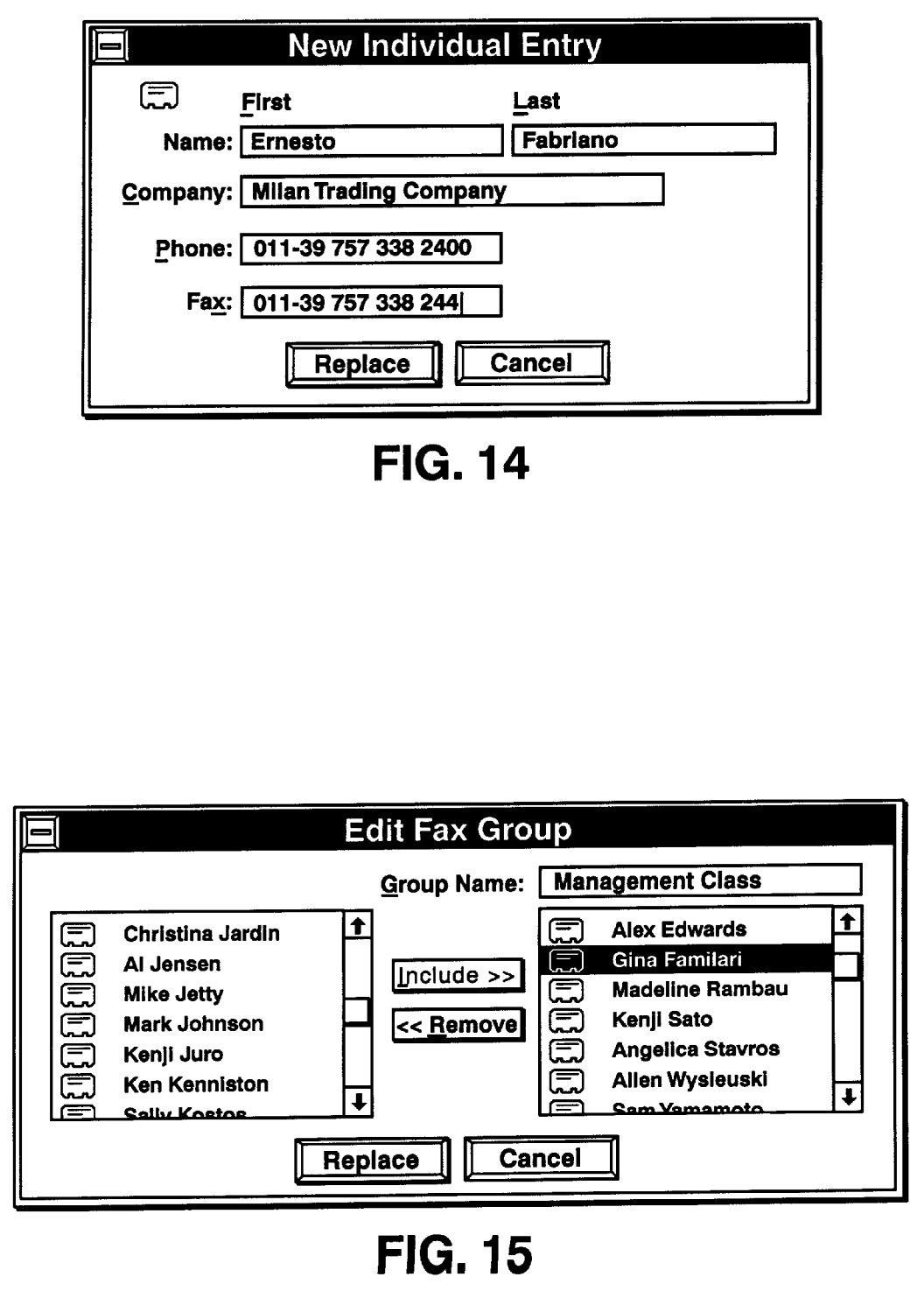

Reverting for a moment to FIG. 11, address book 160 includes edit button 171. When an item in address book 160 is selected, then depressing edit button 171 causes an edit entry box to be displayed so as to permit the user to edit the selected address book entry. Specifically, if an individual item in address book 160 is selected, then depressing edit button 171 causes the edit individual dialog box shown in FIG. 14 to be displayed so as to allow a user to edit information corresponding to an individual. On the other hand, if the selected item in address book 160 is a group, then depressing edit button 171 causes the dialog box shown in FIG. 15 to be displayed so as to permit the user to edit information concerning the selected group. Operation of the dialog boxes shown in FIGS. 14 and 15 is similar to operation of the dialog boxes shown in FIGS. 12 and 13, respectively.

Address book entries can be imported from or exported to other applications using the import and export commands of the "File menu item in menu bar 102. Two file formats are supported: comma-delimited text and tab-delimited text.

Figure 16A:
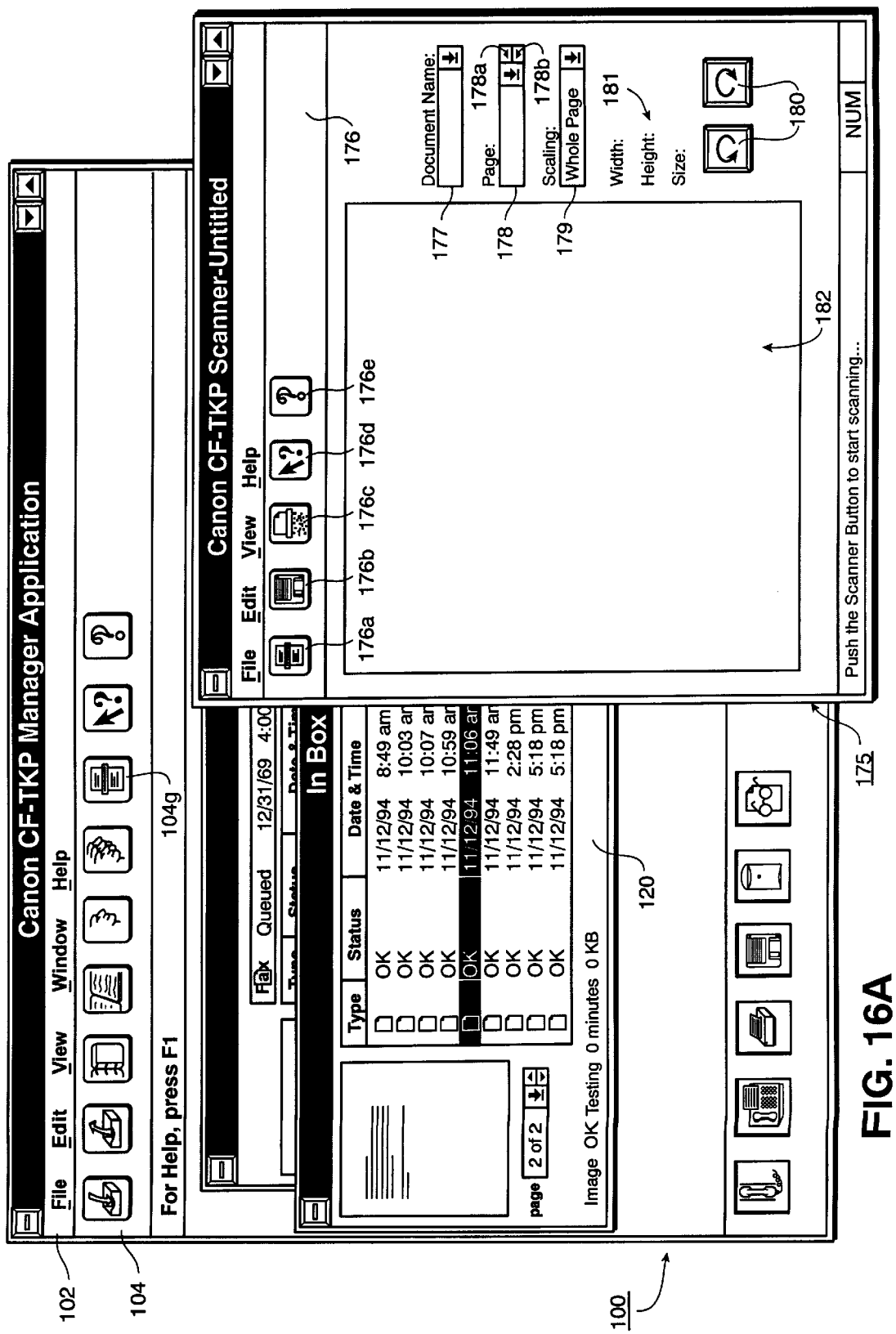
FIG. 16A is a view showing scanner processing.
Figure 16B:
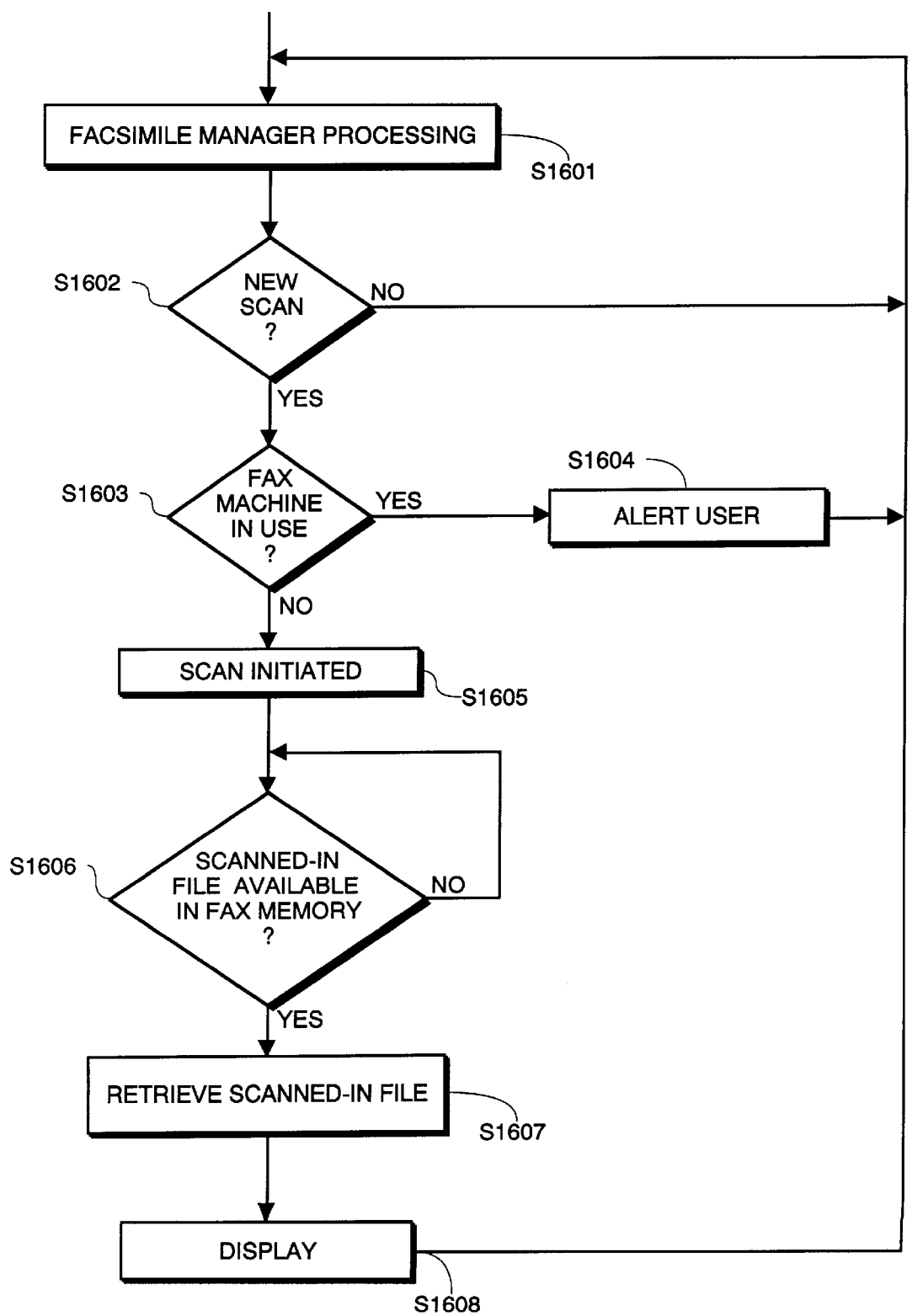
FIG. 16B is a flow diagram used in explaining scanner processing.

FIG. 16A is a view for explaining how facsimile manager 100 operates in coordination with the ACTif communication module so as to utilize scanner functionality of facsimile machine 18. The scanning services depicted in FIG. 16A are designed specifically for use in connection with facsimile machine 100, and there is therefore no need for "TWAIN" negotiation of image file format and protocol, such as is described below in connection with FIG. 20.

More particularly, from within facsimile manager 100, the user can invoke scan functionality of facsimile machine 18 so as to deposit scanned-in images into in-box 120. Thus, scanner 175 is displayed to the user upon user selection of scanner icon 104g from speed bar 104 or by selection of the scanner command from the "File" menu item in menu bar 102. Scanner 175 is an independent window which includes a menu bar having "File", "Edit", "View", and "Help" items, and an upper speed bar 176 with five buttons: scan button 176a, save button 176b, delete button 176c, contact-sensitive help button 176d, and help button 176e. Document name text field 177, page number dropped on field 178, and scaling field 179 are all available to the user, along with next page and previous page buttons 178a and 178b, respectively, and rotation buttons 180. Statistical information about the size and height and width of the image are provided at area 181.

By pressing scan button 176a or selecting a scan command from the "File" menu item, scanner 175 initiates a new scan. Each scan is temporarily stored for display in area 182, and subsequently is saved to a file, given a default name and managed by facsimile manager 100, so that when the user does a new scan a new entry is created in in-box 120.

Figure 17A:
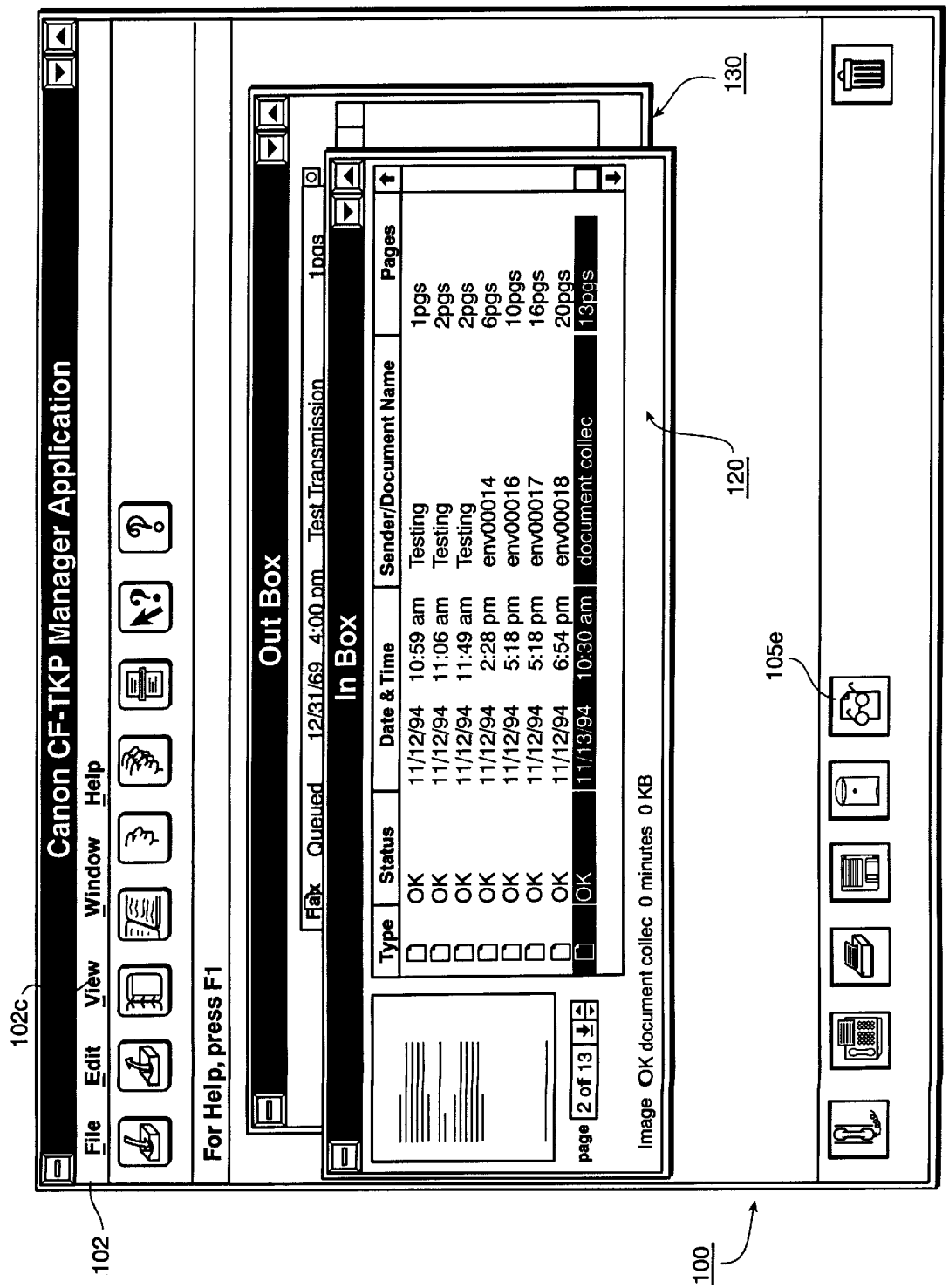
FIG. 17A and 17B are views for explaining processing of a viewer module.
Figure 17B:
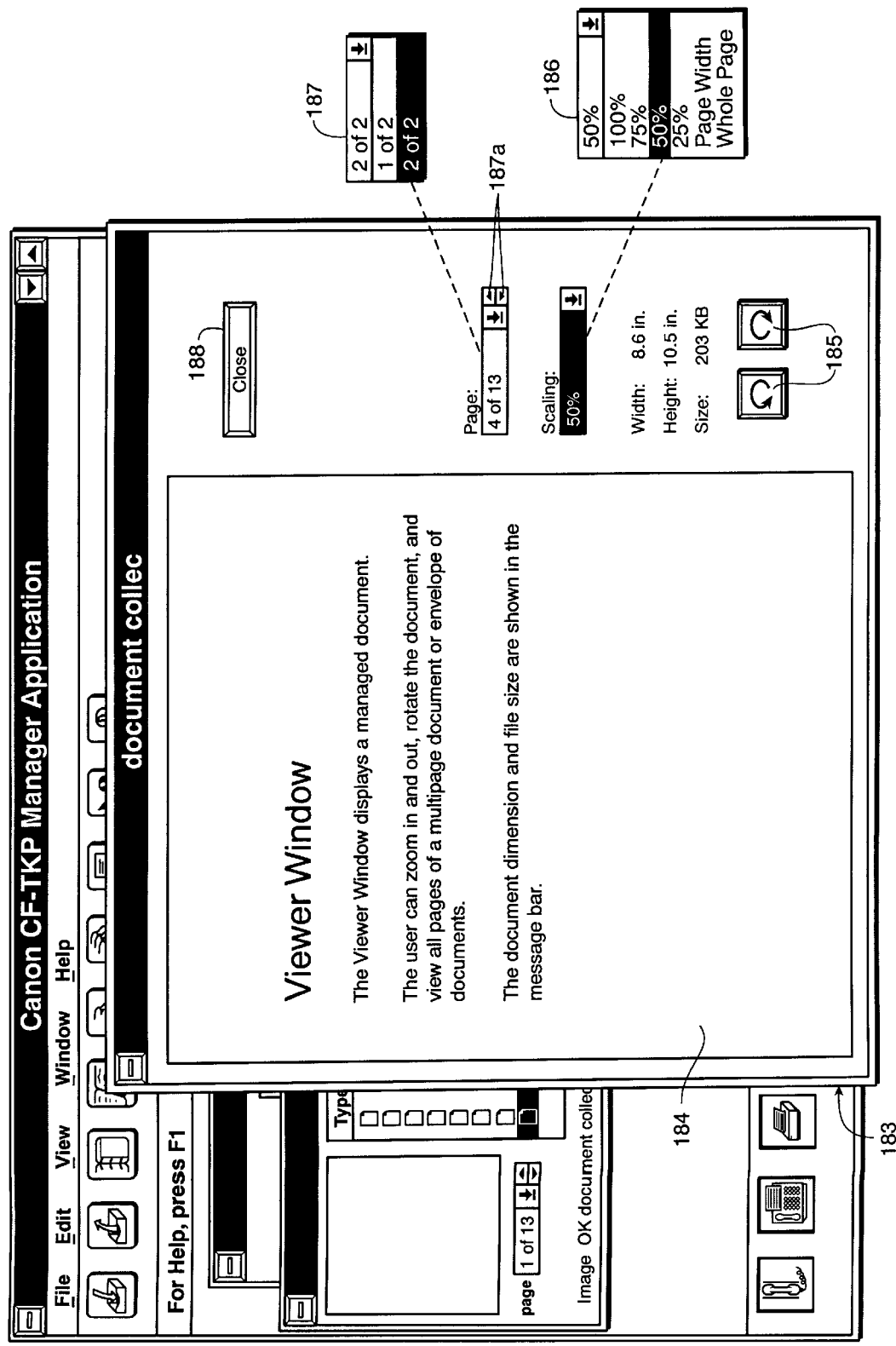

FIG. 17B is a flow diagram illustrating coordination between facsimile manager 100 and the ACTif communication module by which, in response to initiation of a scan sequence from scanner 175, the ACTif communication module issues a command to facsimile machine 18 over the bi-directional parallel interface to begin scanning, waits until a scanned-in file is available in fax memory, and retrieve the scanned-in file over the bi-directional parallel interface. The retrieved scanned-in file is provided to scanner 175 for display to the user, and scanner 175 also stores the scanned-in file in in-box 120.

More specifically, during the course of normal facsimile manager processing (step S1601), step S1602 determines whether a new scan command has been issued from scanner 175. Until a scan command is issued, such as by pressing scan button 176a, ordinary facsimile manager processing continues. However, as soon as a new scan command is issued, flow advances to step S1603 in which the ACTif communication module determines whether facsimile machine 18 is in use. If the facsimile machine is in use, such a by being involved in on-going facsimile or printing or scanning processes, then flow branches to step S1604 in which the user is alerted that facsimile machine 18 is in use and is advised to request a scan at a later time. On the other hand, if the ACTif communication module determines that facsimile machine 18 is not in use, then flow advances to step S1605 in which the ACTif communication module initiates a scan of documents loaded in document tray 22. Scan is initiated by the ACTif communication module by issuance of a scan command over the bi-directional parallel interface. Flow then advances to step S1606 in which the ACTif communication module polls facsimile machine 18, as described above in connection with FIG. 5, to determine whether a scanned-in file is available in fax memory. Until a scanned-in file is available in fax memory, the ACTif communication module continues to poll. Meanwhile, scanner 175 displays a progress indicator, such as a so-called "gas gauge", indicating to the user an on-going scanning process. As soon as the ACTif communication module determines that a scanned-in file is available in fax memory, flow advances to step S1607 in which ACTif communication module retries the canned-in file from facsimile machine 18 via the bi-directional parallel interface. The ACTif communication module provides the retrieved scanned-in file to scanner 175 where, in step S1608, scanner 175 displays the file in display area 182 (FIG. 16A).

FIGS. 17A and 17B are views for explaining how viewer container lose displays a document managed by facsimile manager 100. More particularly, as described above, a user can select any document in in-box 120 or out-box 130 and view the selected document by dragging-and-dropping a document icon into viewer container 105e or by double clicking thumbnail rendering for the selected item. The viewer may also be activated by issuing a view command from the "View" menu item on menu bar 102.

When viewer 183 is selected, the user is presented with a view of the document shown in FIG. 17B. More particularly, viewer 183 displays, in view area 184 a view of the document (or envelope) and allows manipulation of the document by use of image rotate buttons 185. In addition, the user can select scaling for the document at 186 and can page through a multi-page document through use of pull-down menu 187 or by scrolling with page up and page down buttons 187a and 187b, respectively. When a user is finished viewing a document depressing close button 188 will close down viewer 183.

FIGS. 18A through 18D are views of dialog boxes by which facsimile manager 100 controls dialing of ordinary voice telephone calls from facsimile machine 18 in response to designation of a voice telephone number from address book 160. Prior to placing telephone calls, however, facsimile manager 100 requests the user to enter set-up information in a set-up dialog box depicted in FIG. 18A and which is displayed to the user in response to the user issuing a set up command from the "File" menu item in menu bar 102.

Figure 18A:
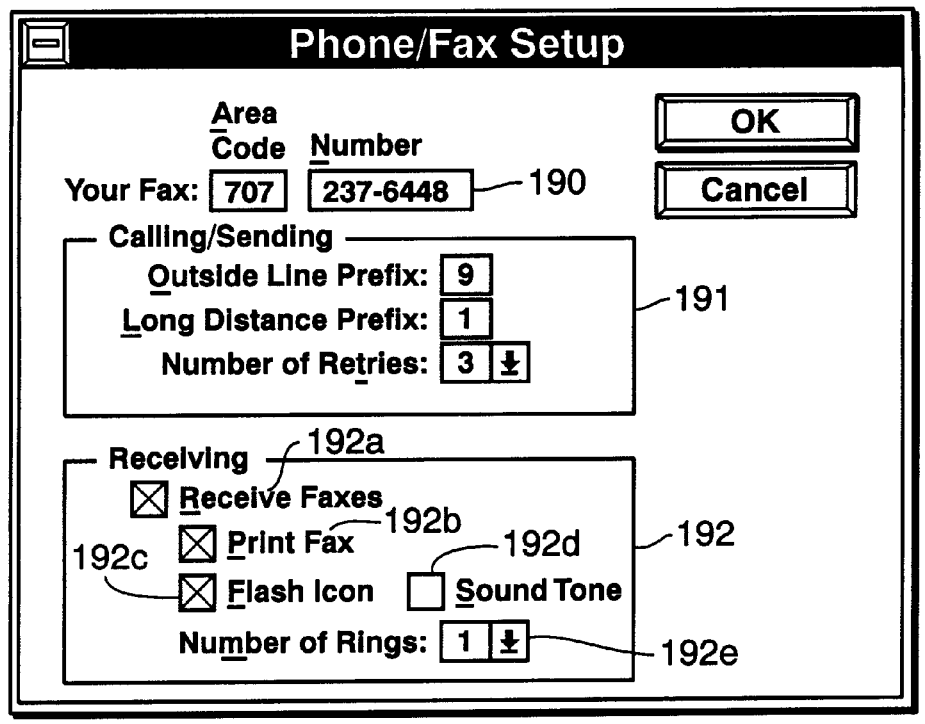
FIGS. 18A through 18D are views for explaining voice telephone dialing.

More particularly, as seen in FIG. 18A, the user specifies information about facsimile machine 18 which helps automate facsimile and telephone functions. The user supplies the local area code and telephone number of facsimile machine 18 in field 190, and supplies prefix information for placing out-going calls in area 191. More specifically, in area 191, the user supplies a private branch exchange outside line prefix (if needed), a long distance prefix for accessing long distance carriers, and the number of retries before facsimile machine 18 determines that a telephone call has failed. In area 192, the user specifies receive information. For example, by checking box 192a, the user configures facsimile manager 100 so that it automatically retrieves incoming facsimiles from the fax memory in facsimile machine 18 (as opposed to letting facsimile machine 18 simply print and discard incoming facsimiles). At 192b, the user can check off whether printing of facsimiles is desired. At 192c and 192d, the user can specify whether notifications are desired of important facsimile events. For example, by checking 192c, the user can request the facsimile manager to flash its icon (when it is minimized) so as to signify that a facsimile has been received. Similarly, by checking 192d, the user can specify that a tone should be sounded when an incoming facsimile is received. Finally, at 192e, the user specifies the number of rings before facsimile machine 18 picks up an incoming telephone call.

After set-up information has been entered in the dialog box shown in FIG. 18A, the user can access the telephone application and have facsimile machine 18 automatically dial out voice telephones by dragging-and-dropping an address book entry into phone container 105a. When an address book entry is dropped on the phone container 105a, the telephone dialog box shown in FIG. 15(B) is displayed with the name of the address book entry and the telephone number. The user can also scroll through the address book so as to select a different number for dialing.

Figure 18B:
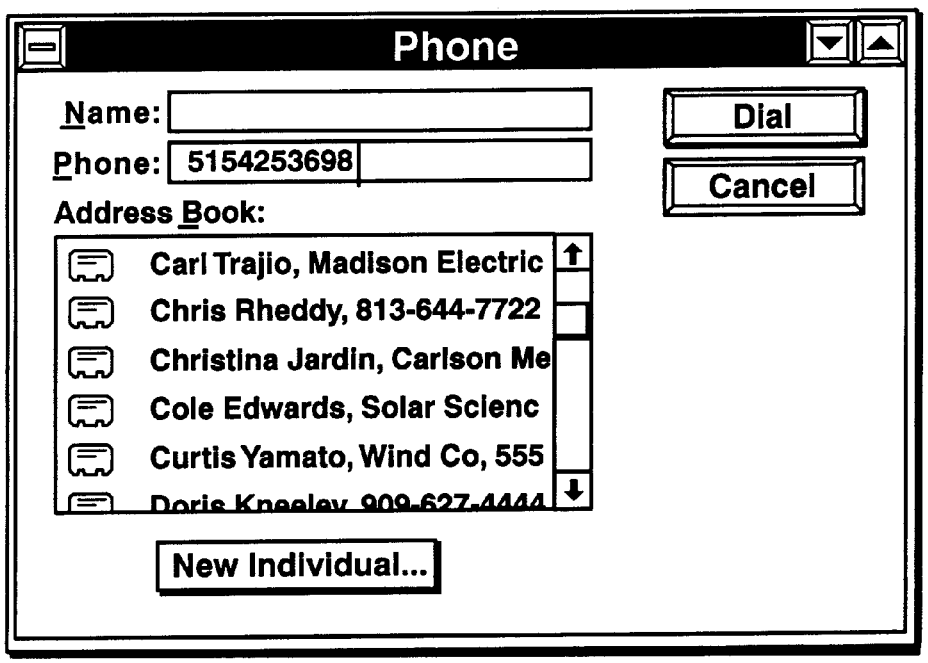

The phone container can also be selected from the "File" menu item in menu bar 102, or by double clicking phone icon 105a. In that case, when the dialog box depicted in FIG. 18B is displayed, the "name" and "phone" fields are empty. The user then can either select an address book entry from the address book list, or type in information into either the name or phone fields whereafter the phone application will search through the address book for a corresponding entry.

Figure 18C:
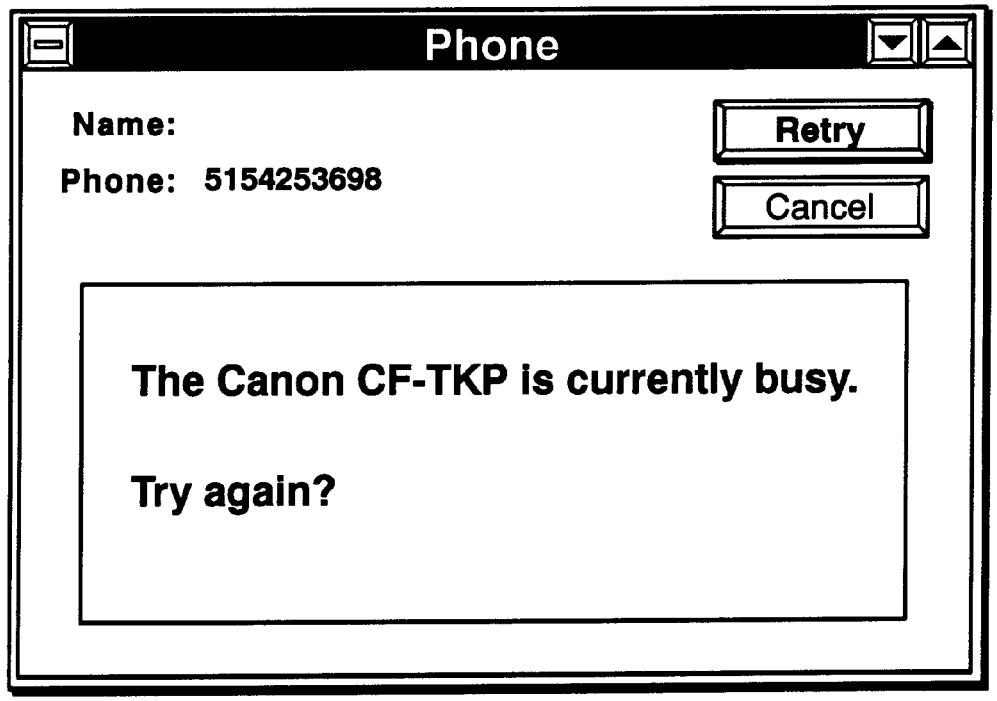
Figure 18D:
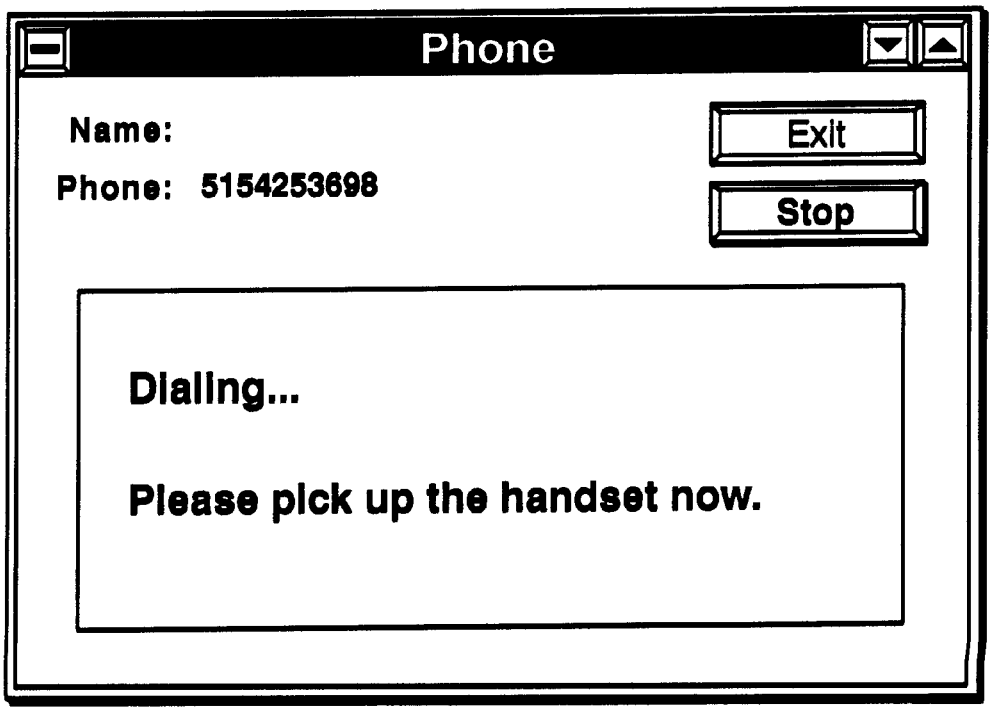

As soon as the desired name and telephone number are shown in the name and phone fields, the user depresses the dial button to bring up the dialog box shown either in FIG. 18C or 18D. More particularly, the dialog box shown in FIG. 18C is displayed if facsimile machine 18 is busy, in which case the "dial" button changes to a "retry" button. On the other hand, if the facsimile machine 18 is not busy, then the dialog box depicted in FIG. 18D is displayed to the user, reporting that dialing is underway and that the user should lift handset 24 so as to commence ordinary voice communication.

[2.3 Configurable Printer Driver]

A description will now be provided for configurable printer driver 80 which accepts document data from any Windows-based application program, without the intermediary of facsimile manager 100, and which delivers corresponding image data to ACTif module 51, which in turn transmits the image data to facsimile machine 18 via bi-directional parallel interface 30.

Configurable printer driver 80 includes a configuration selection for selecting one of a printing, faxing or storing configuration for configuring printer driver 80 and includes a file format converter which converts the document from the Windows application program into an image-based file format. The converted document is delivered from configurable printer driver 80 to ACTif module 51 together with the selected configuration for transmission to facsimile machine 18.

In greater detail, FIGS. 19A–19E illustrate how a document can be printed, faxed or converted to an image document, such as a TIFF ("tagged image file format") document, and stored. The configurable printer driver provides windows application programs with access to functions of facsimile machine 18.

Figure 19A:
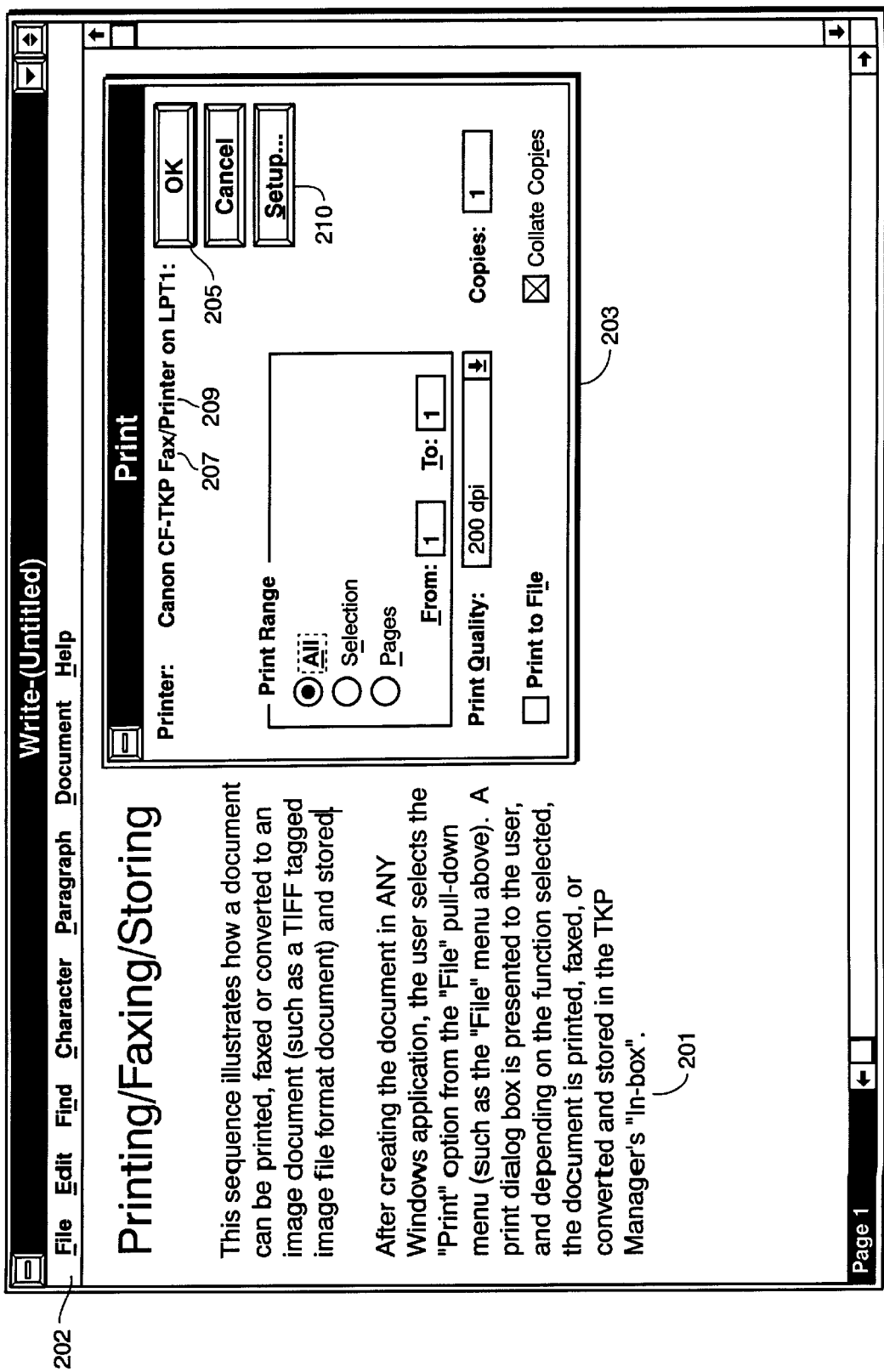
FIGS. 19A through 19F are views for explaining configuration of a configurable print driver.

According to the present invention, an application document can be printed, faxed or converted to an image document by utilizing a windows application such as Microsoft Word or Wordperfect to create a document and to select the print command therefrom. As shown in FIG. 19A, window 200 contains document 201 which has been created in Write, a Windows word processing application. By selecting file menu 202, the user can select a print function in the pull-down menu. After selecting a print feature, dialog box 203 is presented to the user. If the configuration of configurable printer driver 80 has been previously set to a desired configuration, such as the printer configuration or the fax configuration, then the user simply clicks OK button 205 to fax, print or save the document. The user can readily identify the setting of facsimile machine 18 since either FAX 207 or PRINTER 209 is highlighted in printer field 206. For example, in the case that PRINTER 209 is highlighted then facsimile machine 18 is configured as a printer. In this case, the user can print out the document by clicking on OK button 205 and the document will be printed. Similarly, in the case that the user wishes to fax created document 201 and FAX 207 is highlighted, then the user simply clicks on OK button 205 and the user is presented with a send fax window, shown in FIG. 19B (discussed below).

On the other hand, if facsimile machine 18 is not configured as desired by the user, then the user clicks on SETUP button 210 in order to set up and configure configurable printer driver 80.

Figure 19B:
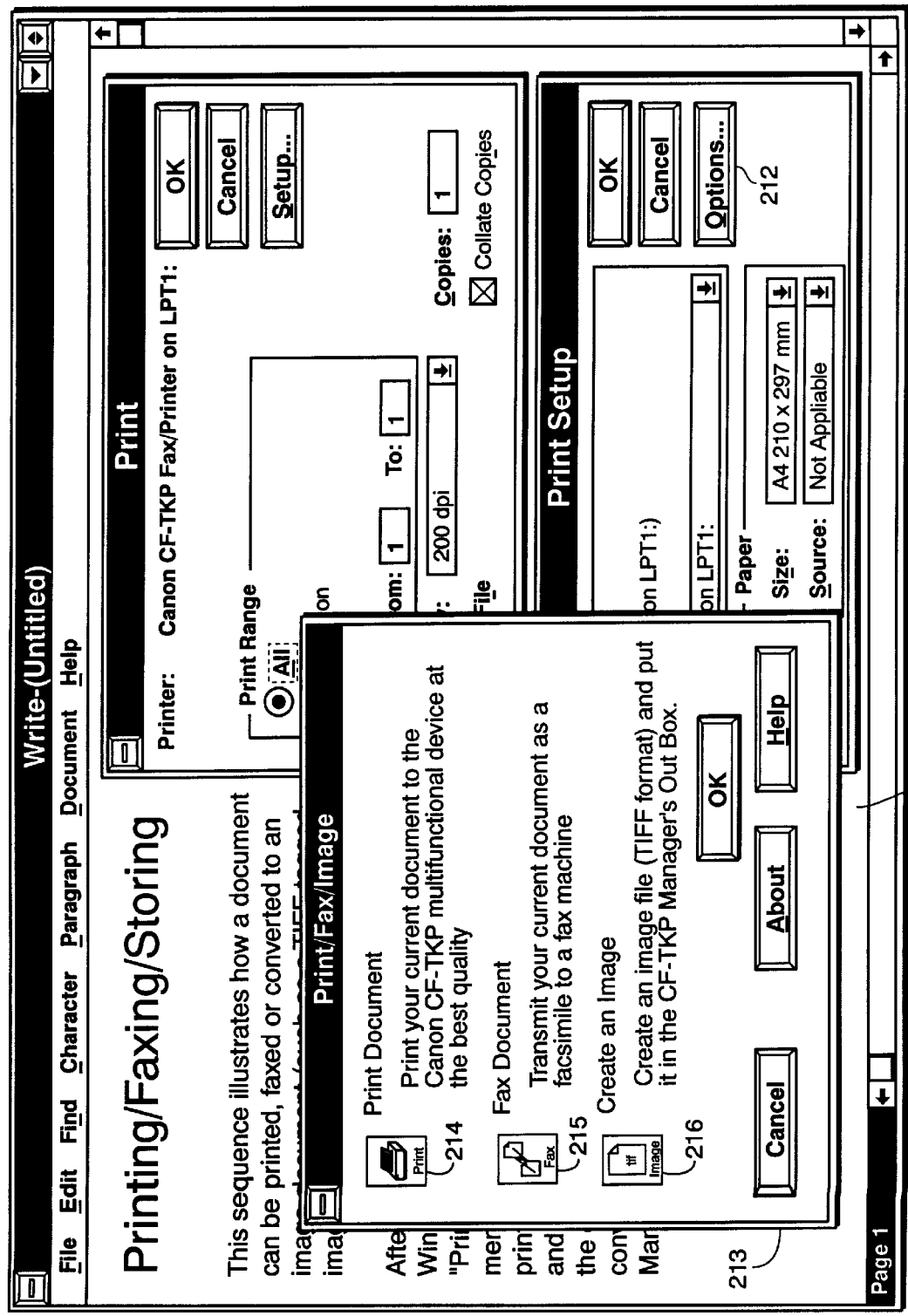
Figure 19C:
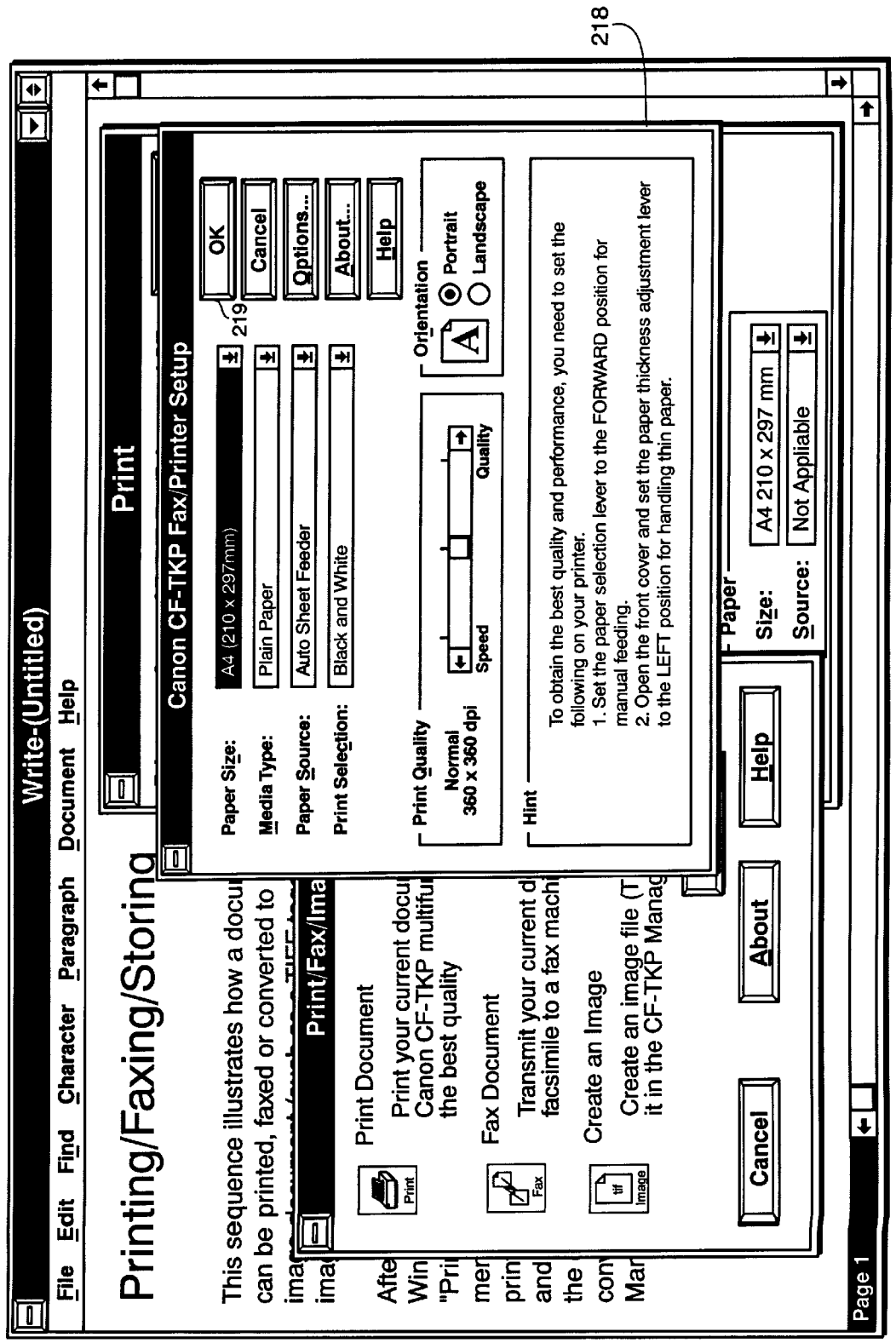
Figure 19D:
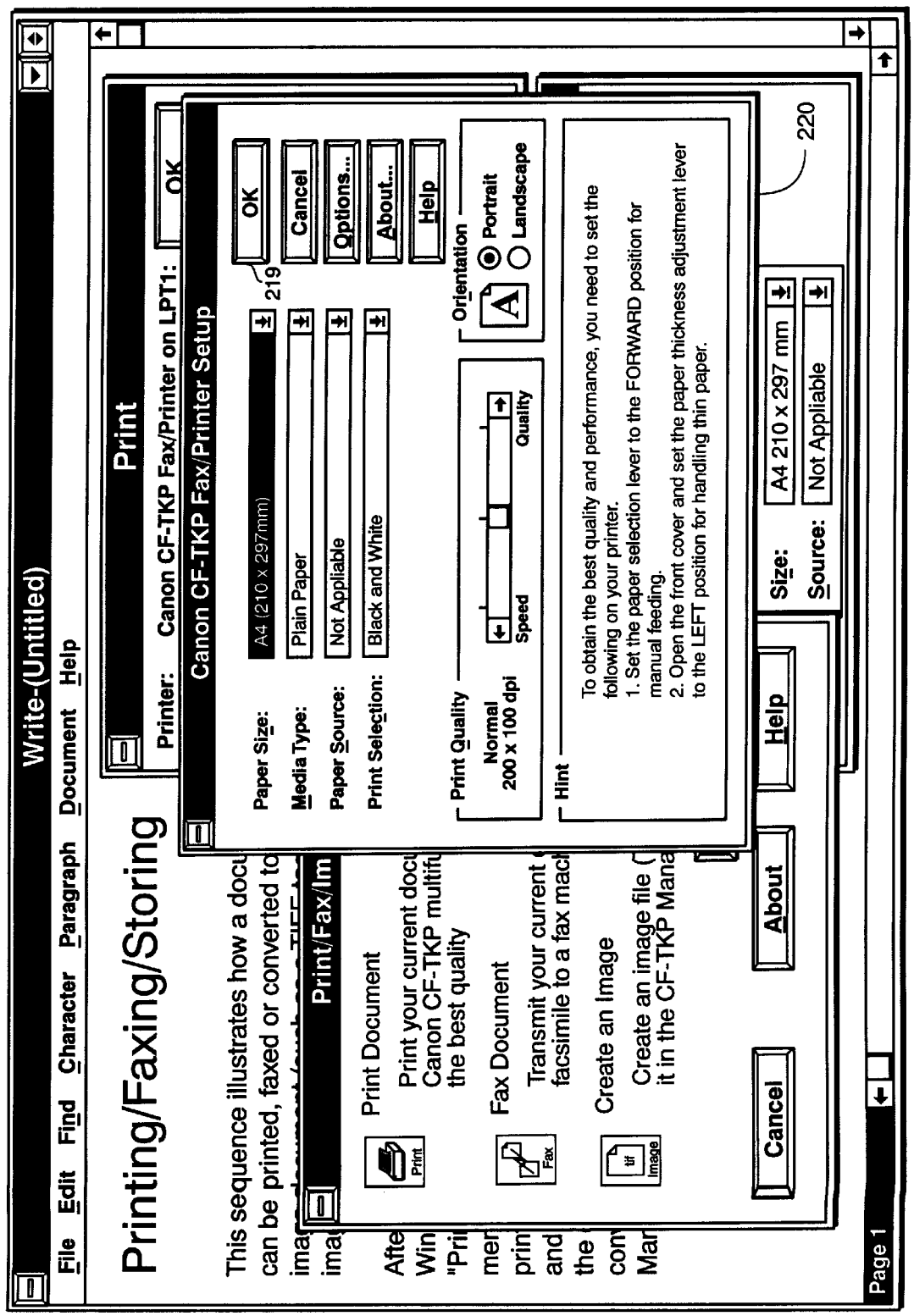

Upon clicking on SETUP button 210, print setup window 211 is presented to the user as shown in FIG. 19B. From print setup window 211 the setup of configurable printer driver 80 can be changed by calling up configuration options. In this regard, the user clicks on options button 212 which will bring up configurable printer driver window options 213.

As shown in FIG. 19B, configurable printer window 213 presents three configuration options for controlling the operation mode of facsimile machine 18. By selecting print button 214, the configurable printer driver will configure facsimile machine 18 to print the current document. By selecting fax button 215, the configurable printer driver will configure facsimile machine 18 to fax a document, and, if CreateImage button 216 is selected, document 201 will be formatted as an image file and deposited in out-box 140 of facsimile manager 100.

If print configuration button 214 is selected, print dialog box 218 appears. Print dialog box 218 allows the user to select paper size, media type paper source, print selection, print quality, and image orientation on the paper. Once all of the functions are set to the desired features, the OK button 219 is depressed and the document will be printed by facsimile machine 18 in accordance with the set features.

Figure 19E:
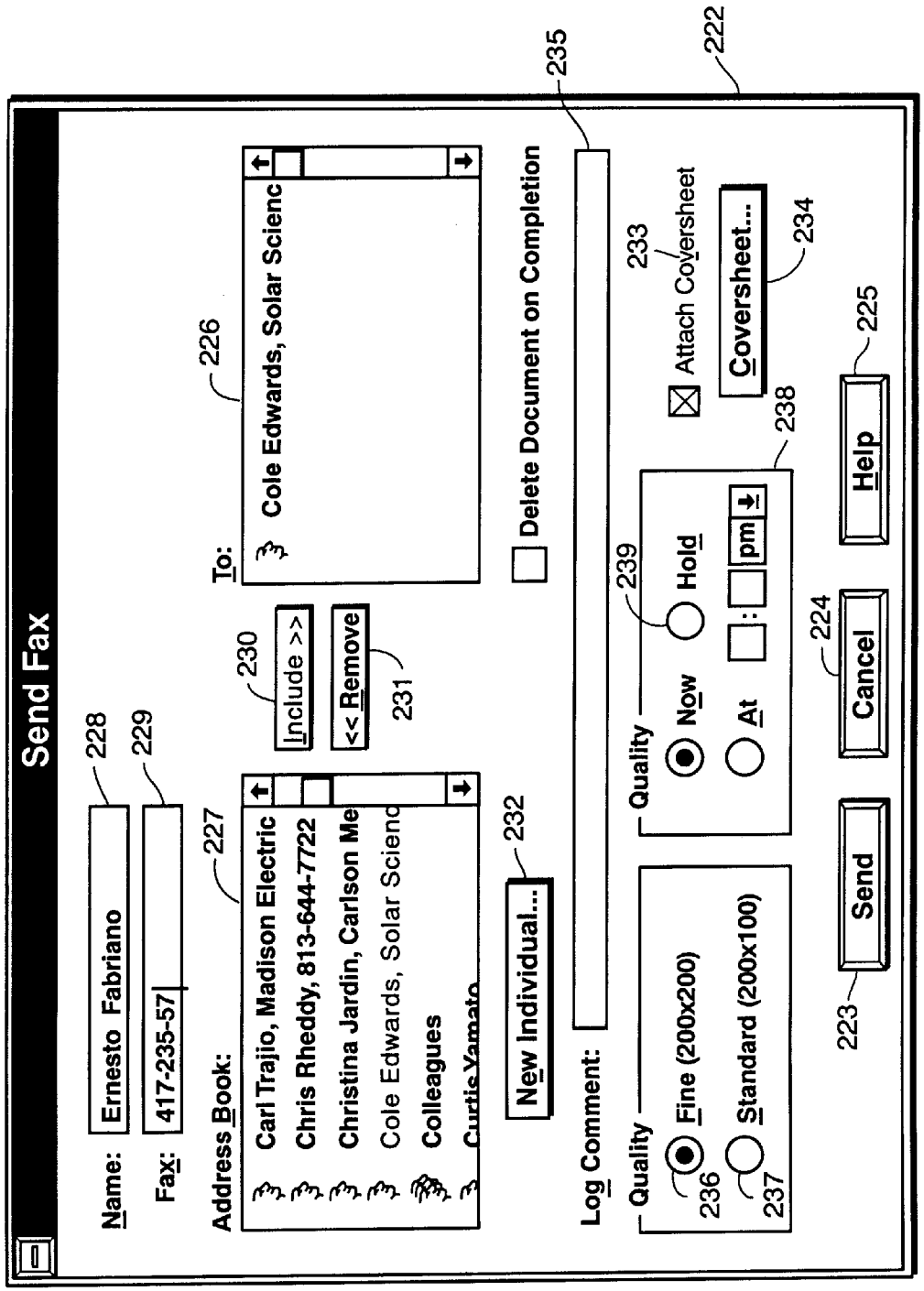

If fax configuration button 215 is selected, configurable printer driver 80 configures the facsimile machine 18 to transmit document 201. In this case, fax dialog box 220 appears instead of print dialog box 218. While fax dialog box 220 appears to be almost identical to print dialog box 218, the paper-source function will not be available for selection. After all the functions have been set to a desired feature in fax dialog box 220, clicking on OK button 219 retrieves a send fax dialog box 222 as shown in FIG. 19E. The purpose of send-fax dialog box 222 is to input information necessary to transmit document 201 to a person or persons as a fax document. The basic command buttons available are SEND, CANCEL, COVER SHEET, and HELP. Selecting CANCEL will return the user to configurable printer dialog box 213. SEND button 223 is disabled until the user has entered a name and fax number in the TO box 226 giving the document a recipient and a fax number.

TO box 226 lists entries which can be selected from address book 227 or which can be entered in NAME box 228 and FAX NUMBER box 229 and added to the list by pressing INCLUDE button 230. If the list of names exceeds the visible list, the list will scroll vertically within TO box 224. Entries will be ordered as entered, with the first name and number at the top, the second name beneath it, and so on.

Address book 227 includes entries with fax numbers. When an entry is included in the TO box 226, it is dimmed in address book 227. If it is removed from TO box 226 by selecting and pressing REMOVE button 231, the entry in address book 227 will again be enabled for selection. In the present invention, double clicking on a list item in address book 227 or in TO box 226 has the same effect as selecting the INCLUDE button 230 or REMOVE button 231.

In the case that a user adds a new entry to address book 227, the user can enter the name and fax number by selecting new individual button 232 and a new individual dialog box will appear. Another feature of send-fax dialog box 222 permits the user to send a coversheet with the document. To send a coversheet, the user clicks on the attach-coversheet toggle button 233. If a coversheet function is selected, selection of the feature is indicated by an X in button 223.

Figure 19F:
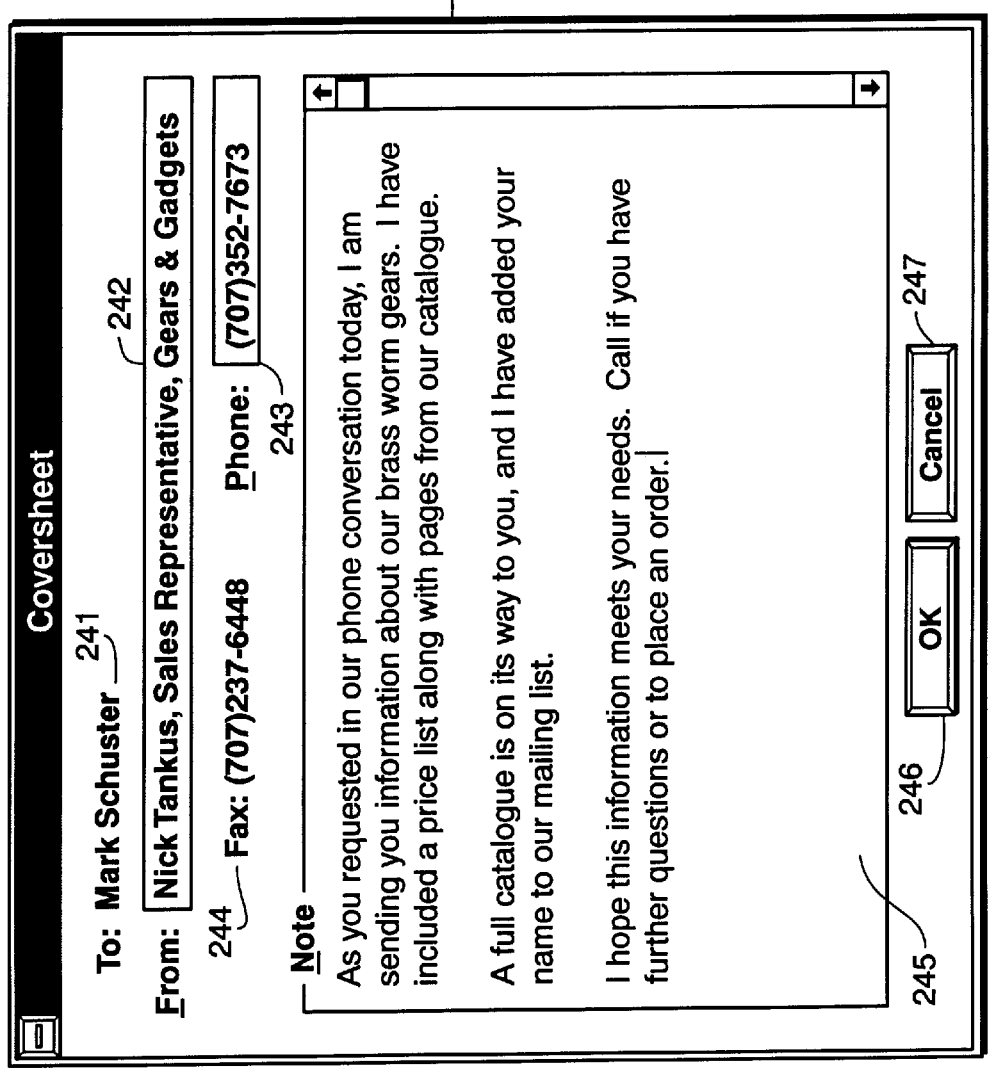

If attach-coversheet button 233 is selected, coversheet dialog box 40 appears as shown in FIG. 19F. As shown in FIG. 19F, all information required for a coversheet is input using coversheet dialog box 240. Upon completing input of the information, the document will be sent (this feature will be discussed below). Since most users send a coversheet, attach-coversheet function is actuated as a default state.

Send fax dialog box 222 also includes a log comment field 235 which allows a user to enter a brief text record as part of the fax entry into the fax log. The field is a simple text field which allows a user to associate information seen only by the user, such as billing statements or accounting information. The resolution of the fax transmission can be set using radio buttons 236 and 237. For example, if radio button 236 is selected, the fax transmission will be sent at 200×200 dpi or if the standard radio button 237 is selected, the fax transmission will be sent at 200×100 dpi.

The user can also schedule when the facsimile transmission is to be sent. That is, by designating the time to send the facsimile transmission in SEND box 238, the user can schedule a transmission to be sent. For example, the fax transmission can be sent immediately, held for sending later, or delayed up to 24 hours. By selecting HOLD button 239, a fax transmission will be held in the outbox indefinitely until the user schedules a transmission. When the user chooses HOLD as a send option, the SEND button changes to OK indicating that a document will not be sent but held. The AT button within SEND box 238 includes a 12 hour time window and a choice of AM or PM. In the present invention, the default setting is NOW and the HOLD and AT selections in SEND box 238 are disabled.

When all of the functions are set, the user clicks on SEND button 224. Upon activating the SEND function, the send-fax dialog box will be torn down and the resulting fax file will be placed in outbox 140 for immediate transmission, delayed transmission, or long term retention.

In the case the user has selected a coversheet, send-fax dialog box 222 will remain and coversheet dialog box 240 shown in FIG. 19F will be overlayed on send-fax dialog box 222.

As discussed previously, attach-coversheet toggle button 223 in send-fax dialog box 222 is used to create a coversheet which is attached in front of the document being faxed. In the dialog box shown in FIG. 19F, the name of the fax recipient, if there is only one, will be shown in uneditable TO field 240. This indicates to the user who will be receiving the fax. If more than one recipient has been chosen, TO field 241 will contain all recipient names with commas between entries and an ellipses at the end if there are more names than can fit in the TO field.

If no recipient has been specified, TO field 241 will read "none-specified".

Coversheet dialog box 240 also includes FROM field 242 which is a text entry field. FROM field 242 is used to enter whatever text the user wishes to include on the coversheet. The user may also enter his/her telephone number in PHONE field 243. Initially, there will be no text in FROM field 242 and PHONE field 243. When a user enters text and clicks on OK to accept the cover sheet, the text in each field is retained and will be in the field by default when coversheet dialog box 240 is accesses next. On the other hand, if CANCEL is pressed, the fields will revert to their former contents.

The fax number associated with the telephone line to facsimile machine 18 set in the facsimile setup dialog box 220, is displayed in FAX field 244. NOTE field 245 is a text field for entering messages to the recipient. NOTE field 245 includes enough memory to fit one page of text in a default font an size. The text entered in NOTE field 245 will be sent to each recipient if there are more than one. Each coversheet will be addressed with unique TO field information, but if the user is sending the document to more than one recipient, they will all get the same coversheet.

When the user is finished defining the coversheet, the user clicks OK button 246 and coversheet dialog box 240 is removed and the program returns to send-fax dialog box 222. On the other hand, if CANCEL button 247 is depressed, coversheet dialog box is removed and the program returns to send fax dialog box 222 and all changes to the cover sheet will be lost. As stated previously, when the user is finished with all settings, the user clicks SEND button 223 and the document and cover sheet, if selected, will be downloaded to facsimile machine IS for transmission.

[2.4 TWAIN Scanner Driver]

As discussed previously, the user can access a scan function directly through facsimile manager 100. However, if the user is operating from a Windows application, the user can scan-in a document utilizing a TWAIN scan driver.

A description of the TWAIN scan driver 90 will now be provided. TWAIN scan driver 90 acquires commands issued by TWAIN-compatible Windows application program. The scan driver delivers image data from facsimile machine 18 which is equipped with a bi-directional parallel interface 30 to the Windows application. According to the present invention, TWAIN negotiates a suitable image format with the Windows applications program, issues a scan initiation command for initiating a scan operation, and interfaces with ACTif module 51 by sending a command via bi-directional parallel interface 30 to facsimile machine 18 for initiating scanning. TWAIN scan driver 90 polls fax memory to determine whether a scanned-in document file is present in fax memory and returns the scanned-in document via bi-directional parallel interface 30 in response to the presence of a scanned-in document image. An image buffer in TWAIN scan driver 90 temporarily stores and displays the scanned-in document retrieved by ACTif module 51. In response to an accept command, the scanned-in document is imported into the Windows application program in the TWAIN-negotiated image format.

Figure 20:
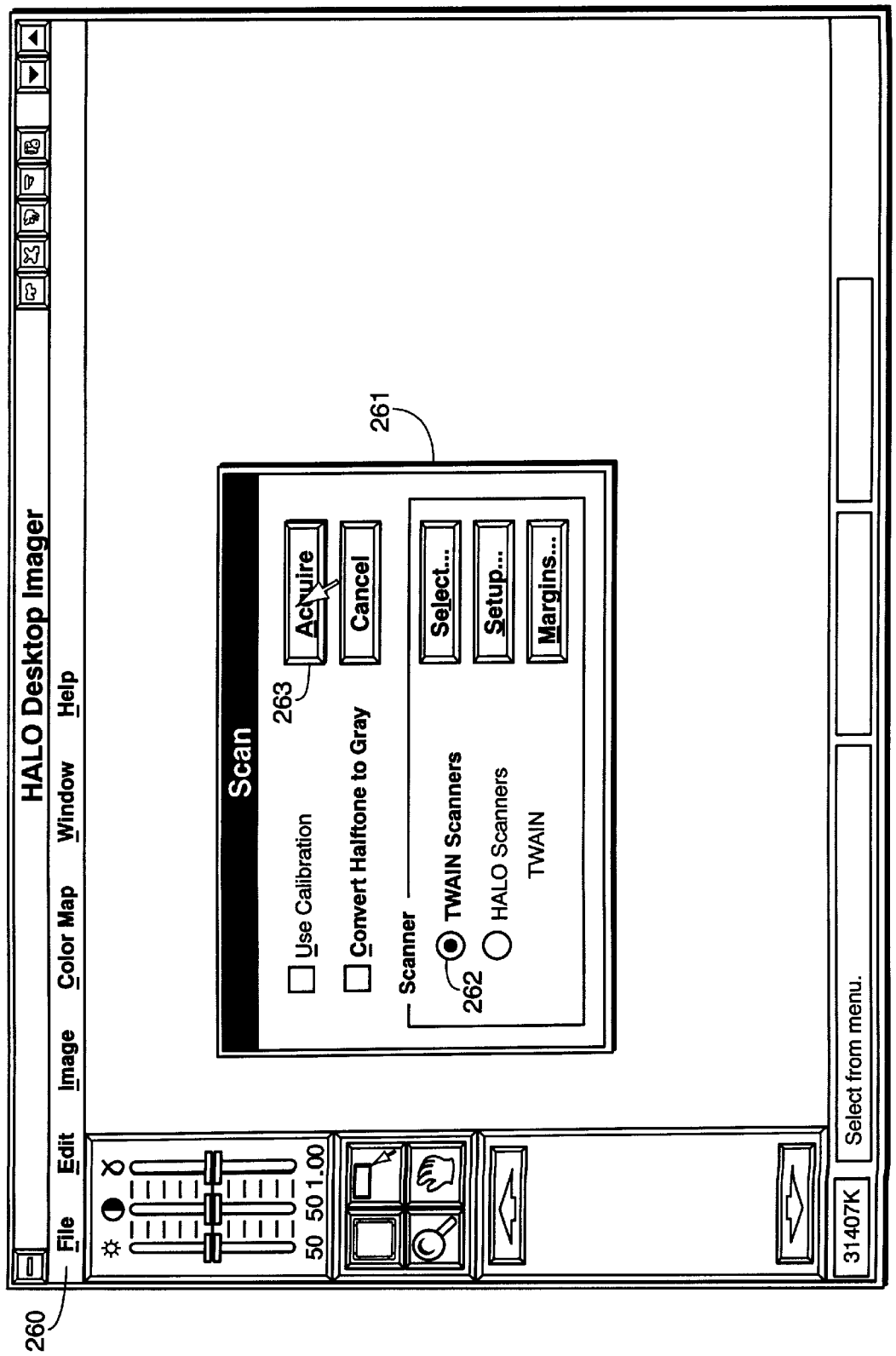
FIGS. 20 and 21A and 21B are views for explaining a TWAIN scanner driver.

In greater detail, when the user is in a Windows application program and wishes to import a scanned-in document, the user pulls down the TWAIN acquire sub-menu item from import menu item of the application file menu. For example, as shown in FIG. 20, utilizing the Windows application program HALO (as an example of a TWAIN-compatible scanning program), the user can select from file menu 260 an import function which brings up scan dialog box 261. Scan dialog box 261, which is part of HALO, permits the user to select the type of scanner as well as the options for setting up the scanner. In the present invention, TWAIN scan driver 90 is the driver which is called. Accordingly, TWAIN scan driver 90 is selected using radio button 202. Once selected, the user clicks on acquire button 263 in order to bring up TWAIN scan dialog box 265.

Figure 21A:
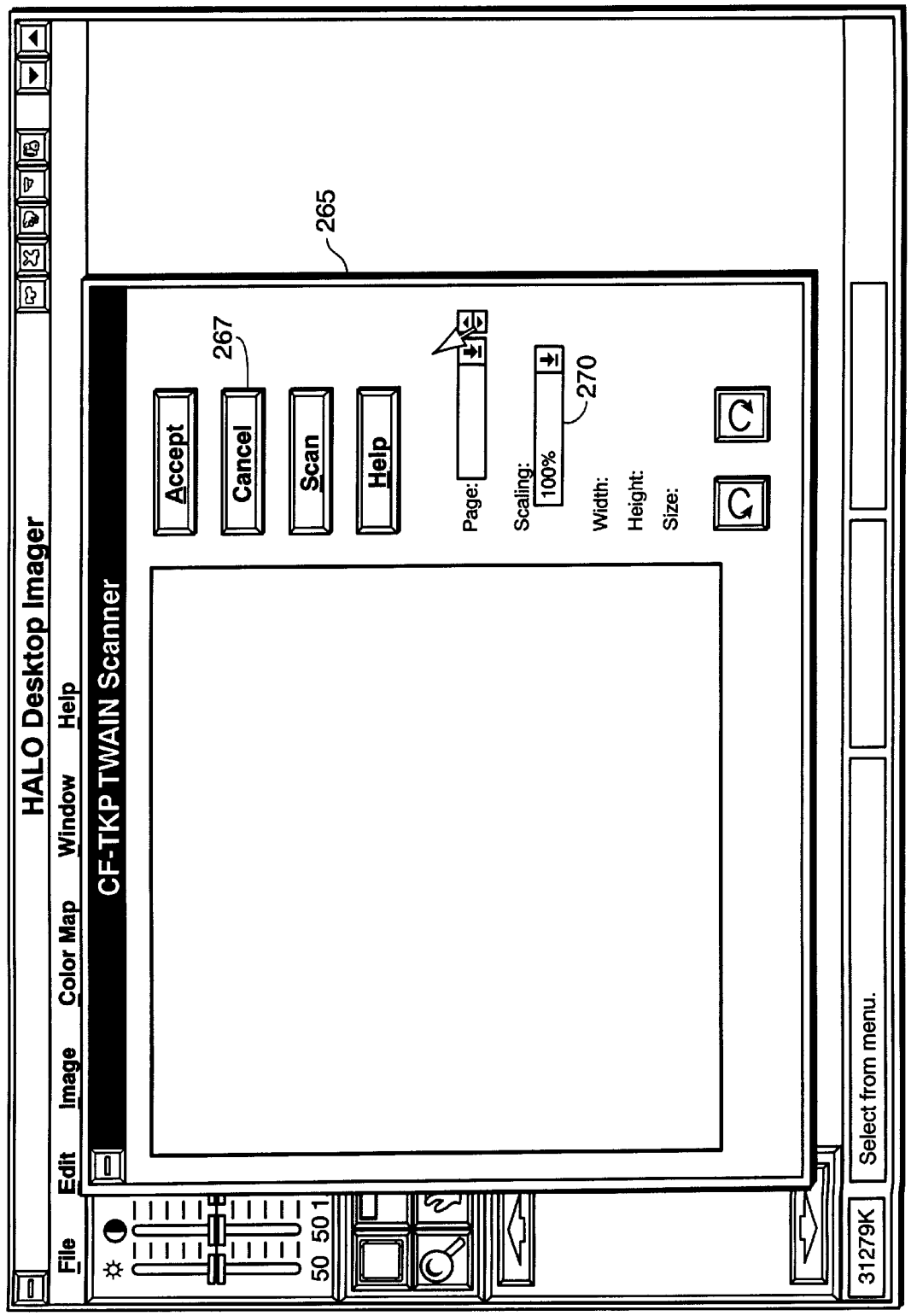
Figure 21B:
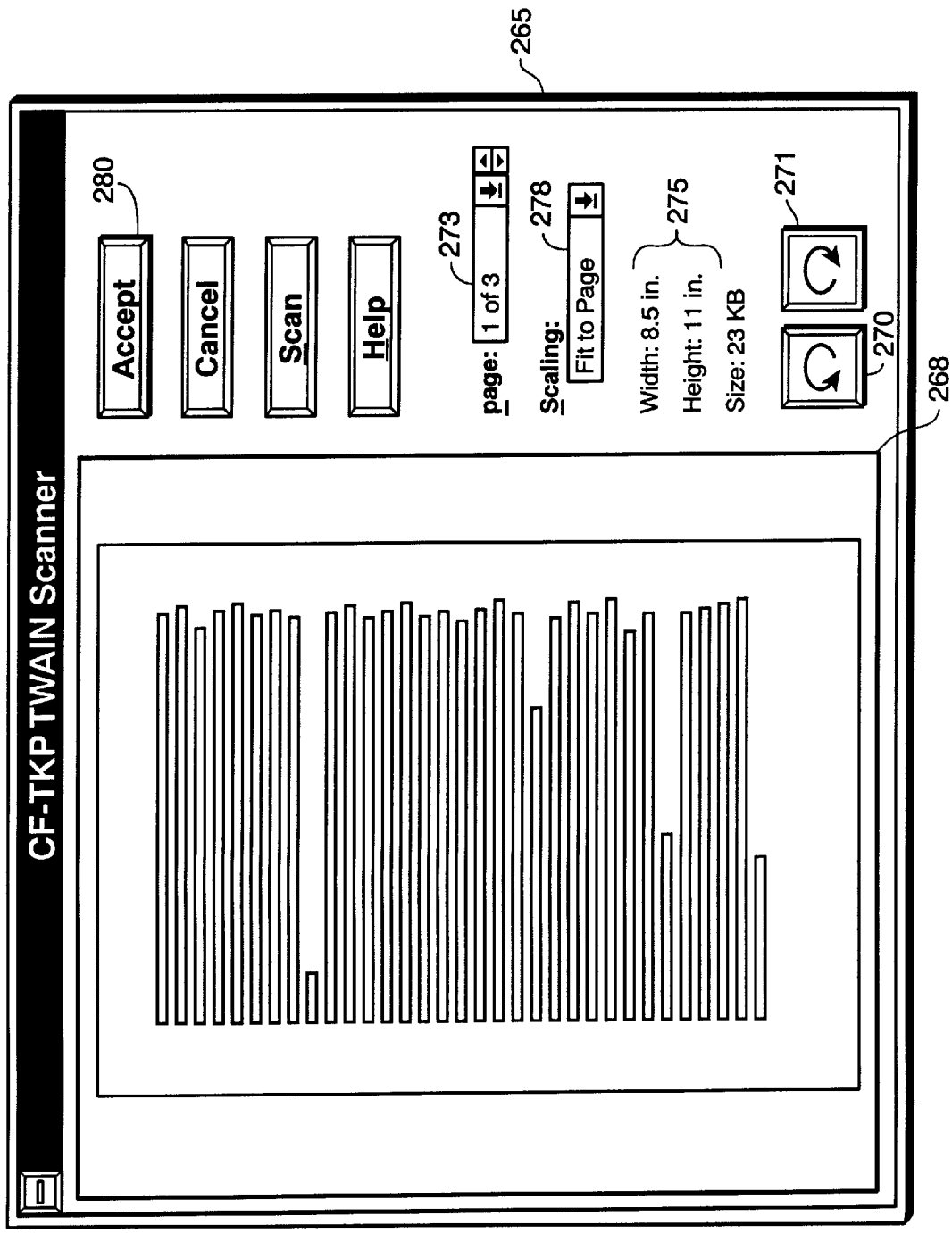

When scan dialog box 265 is brought up, the driver will initiate a scan operation automatically. A gasoline gauge or the like is displayed to indicate the progress of the scanning operation. The user can cancel the scan at any time by clicking CANCEL button 267. If multi-pages are placed on facsimile machine 18, each page will be scanned-in and a file is created. Once the first page is scanned-in, it will be displayed in display windows 268, as shown in FIG. 21B. Display window 268 is a square viewing window which accommodates any document orientation. Orientation within the viewing window is controlled by the user through clockwise and counterclockwise rotation buttons 270 and 271 which are located on the right side of scan dialog box 265.

In the case that no document is to be scanned by facsimile machine 18, a previously scanned document or documents which are in in-box 120 of facsimile manager 100, can be retrieved and displayed within window 268 of scan dialog box 265. Although not shown in FIG. 21A, scan dialog box 265 includes a NAME field which displays the name of the scanned document. Selecting the NAME field will reveal a list of all previously scanned documents in in-box 120 and by selecting a displayed name, the associated document will be retrieved and displayed.

When the user acquires a multi-page document, the entire document is brought into the current application. PAGE box 273 permits the selection between any page of a multi-page document. The user can use this box to select a different page for viewing. The user can also press NEXT PAGE or PREVIOUS PAGE spin buttons to cycle through pages of a multi-page document. Successive scans from the TWAIN scan dialog box 265 will replace each other. Accordingly, if the user needs to save the scanned-in image in particular file format, the user will handle this operation directly from the Windows application program, such as the HALO program shown in FIG. 20.

Features of the document size are shown in field 275 to the right of the document. The user can change the scaling of the document within window 268 by selecting various scaling options from scaling window 278. The TWAIN scan dialog box 265 also includes the standard CANCEL and HELP buttons. Clicking CANCEL will tear down the scan dialog box 265 and will turn the user to his or her current Windows application program and the last scan performed from within TWAIN scanner dialog box 265 Will be lost. The HELP button will retrieve Windows standard help facility.

After the entire document is scanned-in, the user can page through the document if it is a multi-page document or view the single page document to determine if the scanned operation was successful. If the scanned image is satisfactory, the user can retrieve the scanned images from the TWAIN scanner driver and input it directly into the application by clicking ACCEPT button 280. By clicking ACCEPT button 280, the document will be brought into a currently operating windows application program, which in this example is the HALO application program, in the TWAIN-negotiated format.

All scanned-in document produced by the TWAIN interface are imported directly into the Windows application program which is currently running and will not be placed in in-box 120. Only scanning done with facsimile manager 100 will become entries in in-box 120. ACCEPT button 280 is enabled when there is scanned-in images displayed in window 268. Clicking on ACCEPT button 280 will cause scan dialog box 265 to be removed and the image to be shown within the window which in the present example is the HALO Desktop Imager. Once the image has been accepted into the Windows application program, it can be printed or faxed in the same manner as discussed previously.

The invention has been described with respect to a particular illustrative embodiment. It is to be understood that the invention is not limited to the above described embodiment and that various changes and modifications may be made by those of ordinary skill in the art without departing from the spirit and scope of the appended claims.

What is claimed is:

1. A facsimile manager for permitting a user to operate printing and scanning functionality of a facsimile machine, the facsimile machine having a facsimile memory for storing image data and further having an interface for connecting to separate computing equipment on which the facsimile manager executes, the facsimile manager comprising:

a software interface with a communication module which is functionally connected to the facsimile machine via the interface, in which the communication module automatically and repeatedly polls the facsimile machine via the interface to determine whether a scanned-in image is present in facsimile memory, obtains the scanned-in image from the facsimile memory via the interface, and accepts images and send-fax images via the software interface from another application program;

a user-activatable in-box which is operable to receive an image from the communication module via the software interface, and which when activated displays a list of images provided by the communication module, such images including scanned-in images and images from the other application program, the in-box further being operable to permit user-selection of images from the list;

a user-activatable out-box which when activated displays a list of send-fax images, and which permits user-selection of images from the list;

a scanning module which interacts with the software interface so as to cause the communication module to command the facsimile machine via the interface to initiate a scanning operation, which receives a corresponding scanned-in image from the communication module via the software interface, and which stores the scanned-in image for display in the list of images in said in-box;

a fax module which interacts with the software interface so as to give send-fax images selected from the list of images in said out-box to the communication module and so as to cause the communication module to transfer the selected send-fax images via the interface to the facsimile machine for subsequent facsimile transmission by the facsimile machine; and a print module which interacts with the software interface so as to give images selected from the list of images in said in-box or said out-box to the communication module and so as to cause the communication module to transfer the selected image via the interface to the facsimile machine for subsequent print out by the facsimile machine.

2. A facsimile manager according to claim 1, further comprising a viewer module into which images can be deposited for viewing.

3. A facsimile manager according to claim 1, wherein said in-box and said out-box both include thumbnail viewers for viewing a thumbnail rendering of selected images therein.

4. A facsimile manager according to claim 3, wherein, in response to selection of the thumbnail rendering, the selected image is deposited into a viewer module for viewing.

5. A facsimile manager according to claim 1, wherein said scanning module includes an image buffer for storing and displaying scanned-in images received from the communication module.

6. A facsimile manager according to claim 5, wherein said scanner display includes image composition commands including commands to rotate, to zoom and to select other pages.

7. A facsimile manager according to claim 1, further comprising an envelope module which assembles files from said in-box and said out-box to create a sealed envelope file which is deposited in said in box.

8. A facsimile manager according to claim 1, wherein the interface is a bi-directional parallel interface.

9. A facsimile manager according to claim 1, wherein said another application program is a Windows application program.

10. A facsimile manager according to claim 1, wherein said facsimile manager is comprised by a host computer separate from said facsimile machine, and wherein said interface is an external hardware interface.

11. A facsimile manager according to claim 1, wherein said communication module, subsequent to a step of obtaining an image from facsimile memory, issues a command via the interface to the facsimile machine so as to cause the facsimile machine to delete the image from facsimile memory.

12. A facsimile manager according to claim 1, wherein polling by said communication module is regular in accordance with a timer message.

13. A facsimile manager according to claim 1, wherein said communication module polls the facsimile machine by issuing a command via the interface for the facsimile machine to return an image file identification, and determines that an image is present in facsimile memory when the image file identification returned from the facsimile machine is a valid file identification.

14. A facsimile manager according to claim 1, wherein the communication module polls the facsimile memory.

15. A facsimile manager according to claim 1, wherein the facsimile machine is connected to a computer system and runs under an operating system on the computer system, and wherein the communication module, the scanning module, the fax module and the print module run under the same operating system on the computer system as the facsimile manager.

16. A facsimile manager according to claim 15, wherein the communication module is functionally connected to the interface of the facsimile machine through a connection between the computer system and the facsimile machine, and wherein each of plural repeated polls of the facsimile machine is performed over the same connection.

17. A facsimile manager according to claim 15, wherein the facsimile machine is not running under the operating system.

18. A facsimile manager according to claim 15, wherein the communication module repeatedly polls the facsimile machine based on timer messages from the operating system.

19. A facsimile manager according to claim 1, wherein the communication module further commands the facsimile machine via the interface to delete the scanned-in image from the facsimile memory of the facsimile machine.

20. A facsimile manager for permitting a user to operate scanning functionality of a facsimile machine, the facsimile machine having a facsimile memory for storing image data and further having an interface for connecting to separate computing equipment on which the facsimile manager executes, the facsimile manager comprising:
- a software interface with a communication module which is functionally connected to the facsimile machine via the interface, in which the communication module polls automatically and repeatedly the facsimile machine via the interface to determine whether a scanned-in image is present in the facsimile memory, obtains the scanned-in image from the facsimile machine via the interface, and accepts images and send-fax images via the software interface from another application program;
- a user-activatable in-box which is operable to receive an image from the communication module via the software interface, and which when activated displays a list of images provided by the communication module, such images including scanned-in images and images from the other application program, the in-box further being operable to permit user-selection of images from the list;
- a user-activatable out-box which when activated displays a list of send-fax, and which permits user-selection of images from the list;
- a scanning module which interacts with the software interface so as to cause the communication module to command the facsimile machine via the interface to initiate a scanning operation, which receives a corresponding scanned-in image from the communication module via the software interface, and which stores the scanned-in image for display in the list of images in said in-box; and
- a fax module which interacts with the software interface so as to give send-fax images selected from the list of images in said out-box to the communication module and so as to cause the communication module to transfer the selected send-fax images via the interface to the facsimile machine for subsequent facsimile transmission by the facsimile machine.

21. A facsimile manager according to claim 20, further comprising a viewer module into which images can be deposited for viewing.

22. A facsimile manager according to claim 20, wherein said in-box and said out-box both include thumbnail viewers for viewing a thumbnail rendering of selected images therein.

23. A facsimile manager according to claim 22, wherein, in response to selection of the thumbnail rendering, the selected image is deposited into a viewer module for viewing.

24. A facsimile manager according to claim 20, wherein said scanning module includes an image buffer for storing and displaying scanned-in images received from the communication module.

25. A facsimile manager according to claim 24, wherein said scanner display includes image composition commands including commands to rotate, to zoom and to select other pages.

26. A facsimile manager according to claim 20, further comprising an envelope module which assembles files from said in-box and said out-box to create a sealed envelope file which is deposited in said in-box.

27. A facsimile manager according to claim 20, wherein the interface is a bi-directional parallel interface.

28. A facsimile manager according to claim 20, wherein said another application program is a Windows application program.

29. A facsimile manager according to claim 20, wherein said facsimile manager is comprised by a host computer separate from said facsimile machine, and wherein said interface is an external hardware interface.

30. A facsimile manager according to claim 20, wherein said communication module, subsequent to a step of obtaining an image from facsimile memory, issues a command via the interface to the facsimile machine so as to cause the facsimile machine to delete the image from facsimile memory.

31. A facsimile manager according to claim 20, wherein polling by said communication module is regular in accordance with a timer message.

32. A facsimile manager according to claim 20, wherein said communication module polls the facsimile machine by issuing a command via the interface for the facsimile machine to return an image file identification, and determines that an image is present in facsimile memory when the image file identification returned from the facsimile machine is a valid file identification.

33. A facsimile manager according to claim 20, wherein the communication module polls the facsimile memory.

34. A facsimile manager according to claim 20, wherein the facsimile machine is connected to a computer system and runs under an operating system on the computer system, and
- wherein the communication module, the scanning module and the fax module run under the same operating system on the computer system as the facsimile manager.

35. A facsimile manager according to claim 34, wherein the communication module is functionally connected to the interface of the facsimile machine through a connection between the computer system and the facsimile machine, and wherein each of plural repeated polls of the facsimile machine is performed over the same connection.

36. A facsimile manager according to claim 34 wherein the facsimile machine is not running under the operating system.

37. A facsimile manager according to claim 34, wherein the communication module repeatedly polls the facsimile machine based on timer messages from the operating system.

38. A facsimile manager according to claim 20, wherein the communication module further commands the facsimile machine via the interface to delete the scanned-in image from the facsimile memory of the facsimile machine.

39. A facsimile manager for permitting a user to operate printing functionality of a facsimile machine, the facsimile machine having a facsimile memory for storing image data and further having an interface for connecting to separate computing equipment on which the facsimile manager executes, the facsimile manager comprising:

a software interface with a communication module which is functionally connected to the facsimile machine via the interface, in which the communication module automatically and repeatedly polls the facsimile machine via the interface to determine whether a received-fax image is present in the facsimile memory, obtains the received-fax image from the facsimile memory via the interface, and accepts images and send-fax images via the software interface from another application program;

a user-activatable in-box which is operable to receive an image from the communication module via the software interface, and which when activated displays a list of images provided by the communication module, such images including the received-fax images and images from the other application program, the in-box further being operable to permit user-selection of images from the list;

a user-activatable out-box which when activated displays a list of send-fax images, and which permits user-selection of images from the list;

a fax module which interacts with the software interface so as to give send-fax images selected from the list of images in said out-box to the communication module, so as to cause the communication module to transfer the selected send-fax images via the interface to the facsimile machine for subsequent facsimile transmission by the facsimile machine, and so as to cause the communication module to command the facsimile machine via the interface to initiate a transfer operation of an image received by the facsimile machine, wherein the fax module receives a corresponding received-fax image via the software interface from the communication module, and stores the received-fax image for display in the list of images in said in-box; and a print module which interacts with the software interface so as to give images selected from the list of images in said in-box or said out-box to the communication module and so as to cause the communication module to transfer the selected image via the interface to the facsimile machine for subsequent print out by the facsimile machine.

40. A facsimile manager according to claim 39, further comprising a viewer module into which images can be deposited for viewing.

41. A facsimile manager according to claim 39, wherein said in-box and said out-box both include thumbnail viewers for viewing a thumbnail rendering of selected images therein.

42. A facsimile manager according to claim 41, wherein, in response to selection of the thumbnail rendering, the selected image is deposited into a viewer module for viewing.

43. A facsimile manager according to claim 39, further comprising an envelope module which assembles files from said in-box and said out-box to create a sealed envelope file which is deposited in said in-box.

44. A facsimile manager according to claim 39, wherein the interface is a bi-directional parallel interface.

45. A facsimile manager according to claim 39, wherein said another application program is a Windows application program.

46. A facsimile manager according to claim 39, wherein said facsimile manager is comprised by a host computer separate from said facsimile machine, and wherein said interface is an external hardware interface.

47. A facsimile manager according to claim 39, wherein said communication module, subsequent to a step of obtaining an image from facsimile memory, issues a command via the interface to the facsimile machine so as to cause the facsimile machine to delete the image from facsimile memory.

48. A facsimile manager according to claim 39, wherein polling by said communication module is regular in accordance with a timer message.

49. A facsimile manager according to claim 39, wherein said communication module polls the facsimile machine by issuing a command via the interface for the facsimile machine to return an image file identification, and determines that an image is present in facsimile memory when the image file identification returned from the facsimile machine is a valid file identification.

50. A facsimile manager according to claim 39, wherein the communication module polls the facsimile memory.

51. A facsimile manager according to claim 39, wherein the facsimile machine is connected to a computer system and runs under an operating system on the computer system, and wherein the communication module, the fax module and the print module run under the same operating system on the computer system as the facsimile manager.

52. A facsimile manager according to claim 51, wherein the communication module is functionally connected to the interface of the facsimile machine through a connection between the computer system and the facsimile machine, and wherein each of plural repeated polls of the facsimile machine is performed over the same connection.

53. A facsimile manager according to claim 51, wherein the facsimile machine is not running under the operating system.

54. A facsimile manager according to claim 51, wherein the communication module repeatedly polls the facsimile machine based on timer messages from the operating system.

55. A facsimile manager according to claim 39, wherein the communication module further commands the facsimile machine via the interface to delete the received-fax image from the facsimile memory of the facsimile machine.

56. An apparatus manager for permitting a user to operate printing and scanning functionality of an image processing apparatus having an image memory for storing image data and being equipped with an interface for connecting to separate computing equipment on which the apparatus manager executes, the apparatus manager comprising:

a software interface with a communication module which is functionally connected to the image processing apparatus via the interface, in which the communication module automatically and repeatedly polls the image processing apparatus via the interface to determine whether a scanned-in image is present in the image memory, obtains the scanned-in image from the image memory via the interface, and accepts images via the software interface from another application program;

a user-activatable in-box which is operable to receive an image from the communication module via the software interface, and which when activated displays a list of images provided by the communication module, such images including scanned-in images and images from the other application program, the in-box further being operable to permit user-selection of images from the list;

a user-activatable out-box which when activated displays a list of images, and which permits user-selection of images from the list;

a scanning module which interacts with the software interface so as to cause the communication module to command the image processing apparatus via the interface to initiate a scanning operation, which receives a corresponding scanned-in image from the communication module via the software interface, and which stores the scanned-in image for display in the list of images in said in-box; and a print module which interacts with the software interface so as to give images selected from the list of images in said in-box or said out-box to the communication module and so as to cause the communication module to transfer the selected image via the interface to the image processing apparatus for subsequent print out by the image processing apparatus.

57. An apparatus manager according to claim 56, further comprising a viewer module into which images can be deposited for viewing.

58. An apparatus manager according to claim 56, wherein said in-box and said out-box both include thumbnail viewers for viewing a thumbnail rendering of selected images therein.

59. An apparatus manager according to claim 58, wherein, in response to selection of the thumbnail rendering, the selected image is deposited into a viewer module for viewing.

60. An apparatus manager according to claim 56, wherein said scanning module includes an image buffer for storing and displaying scanned-in images received from the communication module.

61. An apparatus manager according to claim 60, wherein said scanner display includes image composition commands including commands to rotate, to zoom and to select other pages.

62. An apparatus manager according to claim 56, further comprising an envelope module which assembles files from said in-box and said out-box to create a sealed envelope file which is deposited in said in-box.

63. An apparatus manager according to claim 56, wherein the interface is a bi-directional parallel interface.

64. An apparatus manager according to claim 56, wherein said another application program is a Windows application program.

65. An apparatus manager according to claim 56, wherein said facsimile manager is comprised by a host computer separate from said facsimile machine, and wherein said interface is an external hardware interface.

66. An apparatus manager according to claim 56, wherein said communication module, subsequent to a step of obtaining an image from facsimile memory, issues a command via the interface to the facsimile machine so as to cause the facsimile machine to delete the image from facsimile memory.

67. An apparatus manager according to claim 56, wherein polling by said communication module is regular in accordance with a timer message.

68. An apparatus manager according to claim 56, wherein said communication module polls the facsimile machine by issuing a command via the interface for the facsimile machine to return an image file identification, and determines that an image is present in facsimile memory when the image file identification returned from the facsimile machine is a valid file identification.

69. An apparatus manager according to claim 56, wherein the communication module polls the image memory.

70. An apparatus manager according to claim 56, wherein the image processing apparatus is connected to a computer system and runs under an operating system on the computer system, and wherein the communication module, the scanning module and the print module run under the same operating system on the computer system as the facsimile manager.

71. An apparatus manager according to claim 70, wherein the communication module is functionally connected to the interface of the image processing apparatus through a connection between the computer system and the image processing apparatus, and wherein each of plural repeated polls of the image processing apparatus is performed over the same connection.

72. An apparatus manager according to claim 70, wherein the image processing apparatus is not running under the operating system.

73. An apparatus manager according to claim 70, wherein the communication module repeatedly polls the image processing apparatus based on timer messages from the operating system.

74. An apparatus manager according to claim 56, wherein the communication module further commands the facsimile machine via the interface to delete the scanned-in image from the image memory of the image processing apparatus.

75. A facsimile manager for permitting a user to operate scanning functionality of a facsimile machine having a facsimile memory for storing image data and being equipped with an interface for connecting to separate computing equipment on which the facsimile manager executes, the facsimile manager comprising:

a software interface with a communication module which is functionally connected to the facsimile machine via the interface, in which the communication module automatically and repeatedly polls the facsimile machine via the interface to determine whether a scanned-in image is present in the facsimile memory, obtains the scanned-in image from the facsimile memory via the interface, and accepts images from another application program via the software interface;

a user-activatable in-box which is operable to receive an image from the communication module via the software interface, and which when activated displays a list of images provided by the communication module, such images including scanned-in images and images from the other application program, the in-box further being operable to permit user-selection of images from the list; and a scanning module which interacts with the software interface so as to cause the communication module to command the facsimile machine via the interface to initiate a scanning operation, which receives a corresponding scanned-in image from the communication module via the software interface, and which stores the scanned-in image for display in the list of images in said in-box.

76. A facsimile manager according to claim 75, further comprising a viewer module into which images can be deposited for viewing.

77. A facsimile manager according to claim 75, wherein said in-box includes a thumbnail viewer for viewing a thumbnail rendering of selected images therein.

78. A facsimile manager according to claim 77, wherein, in response to selection of the thumbnail rendering, the selected image is deposited into a viewer module for viewing.

79. A facsimile manager according to claim 75, wherein said scanning module includes an image buffer for storing and displaying scanned-in images received from the communication module.

80. A facsimile manager according to claim 79, wherein said scanner display includes image composition commands including commands to rotate, to zoom and to select other pages.

81. A facsimile manager according to claim 75, further comprising an envelope module which assembles files from said in-box to create a sealed envelope file which is deposited in said in-box.

82. A facsimile manager according to claim 75, wherein the interface is a bi-directional parallel interface.

83. A facsimile manager according to claim 75, wherein said another application program is a Windows application program.

84. A facsimile manager according to claim 75, wherein said facsimile manager is comprised by a host computer separate from said facsimile machine, and wherein said interface is an external hardware interface.

85. A facsimile manager according to claim 75, wherein said communication module, subsequent to a step of obtaining an image from facsimile memory, issues a command via the interface to the facsimile machine so as to cause the facsimile machine to delete the image from facsimile memory.

86. A facsimile manager according to claim 75, wherein polling by said communication module is regular in accordance with a timer message.

87. A facsimile manager according to claim 75, wherein said communication module polls the facsimile machine by issuing a command via the interface for the facsimile machine to return an image file identification, and determines that an image is present in facsimile memory when the image file identification returned from the facsimile machine is a valid file identification.

88. A facsimile manager according to claim 75, wherein the communication module polls the facsimile memory.

89. A facsimile manager according to claim 75, wherein the facsimile machine is connected to a computer system and runs under an operating system on the computer system, and wherein the communication module and the scanning module run under the same operating system on the computer system as the facsimile manager.

90. A facsimile manager according to claim 89, wherein the communication module is functionally connected to the interface of the facsimile machine through a connection between the computer system and the facsimile machine, and wherein each of plural repeated polls of the facsimile machine is performed over the same connection.

91. A facsimile manager according to claim 89 wherein the facsimile machine is not running under the operating system.

92. A facsimile manager according to claim 89, wherein the communication module repeatedly polls the facsimile machine based on timer messages from the operating system.

93. A facsimile manager according to claim 75, wherein the communication module further commands the facsimile machine via the interface to delete the scanned-in image from the facsimile memory of the facsimile machine.

94. A facsimile manager for permitting a user to operate printing and scanning functionality of a facsimile machine, having a facsimile memory for storing images and being equipped with an interface for connecting to separate computing equipment on which the facsimile manager executes, the facsimile manager comprising:

a software interface with a communication module which is functionally connected to the facsimile machine via the interface, in which the communication module polls the facsimile machine via the interface to determine whether a scanned-in image is present in facsimile memory, obtains the scanned-in image from the facsimile memory via the interface, and accepts images via the software interface from another application program;

a user-activatable in-box which is operable to receive an image from the communication module via the software interface, and which when activated displays a list of images provided by the communication module such images including scanned-in images and images from other application programs, the list including information which indicates each source of the images, the in-box further being operable to permit user-selection of images from the list;

a user-activatable out-box which when activated displays a list of images, and which permits user-selection of images from the list, the list including information which indicates each source of the images;

a scanning module which interacts with the software interface so a to cause the communication module to command the facsimile machine via the interface to initiate a scanning operation, which receives a corresponding scanned-in image from the communication module via the software interface, and which stores the scanned-in image for display in the list of images in said in-box;

a fax module which interacts with the software interface so as to give images selected from the list of images in said out-box to the communication module and so as to cause the communication module to transfer the selected images via the interface to the facsimile machine for subsequent facsimile transmission by the facsimile machine; and a print module which interacts with the software interface so as to give images selected from the list of images in said in-box or said out-box to the communication module and so as to cause the communication module to transfer the selected image via the interface to the facsimile machine for subsequent print out by the facsimile machine.

95. A facsimile manager according to claim 94, wherein the information which indicates each source of the images is an icon.

96. A facsimile manager according to claim 94, wherein the communication module polls the facsimile memory.

97. A facsimile manager according to claim 94, wherein the facsimile machine is connected to a computer system and runs under an operating system on the computer system, and wherein the communication module, the scanning module, the fax module and the print module run under the same operating system on the computer system as the facsimile manager.

98. A facsimile manager according to claim 97, wherein the communication module is functionally connected to the interface of the facsimile machine through a connection between the computer system and the facsimile machine, and wherein each of plural repeated polls of the facsimile machine is performed over the same connection.

99. A facsimile manager according to claim 97, wherein the facsimile machine is not running under the operating system.

100. A facsimile manager according to claim 97, wherein the communication module repeatedly polls the facsimile machine based on timer messages from the operating system.

101. A facsimile manager according to claim 94, wherein the communication module further commands the facsimile machine via the interface to delete the scanned-in image from the facsimile memory of the facsimile machine.

102. A facsimile manager for permitting a user to operate scanning functionality of a facsimile machine, having a facsimile memory for storing images and being equipped with an interface for connecting to separate computing equipment on which the facsimile manager executes, the facsimile manager comprising:

- a software interface with a communication module which is functionally connected to the facsimile machine via the interface, in which the communication module polls the facsimile machine via the interface to determine whether a scanned-in image is present in the facsimile memory, obtains the scanned-in image from the facsimile memory via the interface, and accepts images via the software interface from another application program;
- a user-activatable in-box which is operable to receive an image from the communication module via the software interface, and which when activated displays a list of images provided by the communication module, such images including scanned-in images and images from other application programs, the list including information which indicates each source of the images, the in-box further being operable to permit user-selection of images from the list;
- a user-activatable out-box which when activated displays a list of images, and which permits user-selection of images from the list, the list including information which indicates each source of the images;
- a scanning module which interacts with the software interface so as to cause the communication module to command the facsimile machine via the interface to initiate a scanning operation, which receives a corresponding scanned-in image from the communication module via the software interface, and which stores the scanned-in image for display in the list of images in said in-box; and
- a fax module which interacts with the software interface so as to give images selected from the list of images in said out-box to the communication module so as to cause the communication module to transfer the selected images via the interface to the facsimile machine for subsequent facsimile transmission by the facsimile machine.

103. A facsimile manager according to claim 102, wherein the information which indicates each source of the images is an icon.

104. A facsimile manager according to claim 102, wherein the communication module polls the facsimile memory.

105. A facsimile manager according to claim 102, wherein the facsimile machine is connected to a computer system and runs under an operating system on the computer system, and wherein the communication module, the scanning module and the fax module run under the same operating system on the computer system as the facsimile manager.

106. A facsimile manager according to claim 105, wherein the communication module is functionally connected to the interface of the facsimile machine through a connection between the computer system and the facsimile machine, and wherein each of plural repeated polls of the facsimile machine is performed over the same connection.

107. A facsimile manager according to claim 105, wherein the facsimile machine is not running under the operating system.

108. A facsimile manager according to claim 105, wherein the communication module repeatedly polls the facsimile machine based on timer messages from the operating system.

109. A facsimile manager according to claim 52, wherein the communication module further commands the facsimile machine via the interface to delete the scanned-in image from the facsimile memory of the facsimile machine.

110. A facsimile manager for permitting a user to operate printing functionality of a facsimile machine, having a facsimile memory for storing images and being equipped with an interface for connecting to separate computing equipment on which the facsimile manager executes, the facsimile manager comprising:

- a software interface with a communication module which is functionally connected to the facsimile machine via the interface, in which the communication module polls the facsimile machine via the interface to determine whether an image is present in the facsimile memory, obtains the image from the facsimile memory via the interface, and accepts images via the software interface from another application program;
- a user-activatable in-box which is operable to receive an image from the communication module via the software interface, and which when activated displays a list of images provided by the communication module, such images including received images from the facsimile machine and images from other application programs, the list including information which indicates each source of the images, the in-box further being operable to permit user-selection of images from the list;
- a user-activatable out-box which when activated displays a list of images, and which permits user-selection of images from the list, the list including information which indicates each source of the images;
- a fax module which interacts with the software interface so as to give images selected from the list of images in said out-box to the communication module, so as to cause the communication module to transfer the selected images via the interface to the facsimile machine for subsequent facsimile transmission by the facsimile machine, and so as to cause the communication module to command the facsimile machine via the interface to initiate a transfer operation of an image received by the facsimile machine, wherein the fax module receives a corresponding received-fax image via the software interface from the communication module, and stores the received-fax image for display in the list of images in said in-box; and
- a print module which interacts with the software interface so as to give images selected from the list of images in said in-box or said out-box to the communication module and so as to cause the communication module to transfer the selected image via the interface to the facsimile machine for subsequent print out by the facsimile machine.

111. A facsimile manager according to claim 110, wherein the information which indicates each source of the images is an icon.

112. A facsimile manager according to claim 110, wherein the communication module polls the facsimile memory.

113. A facsimile manager according to claim 110, wherein the facsimile machine is connected to a computer system and runs under an operating system on the computer system, and wherein the communication module, the fax module and the print module run under the same operating system on the computer system as the facsimile manager.

114. A facsimile manager according to claim 113, wherein the communication module is functionally connected to the interface of the facsimile machine through a connection between the computer system and the facsimile machine, and wherein each of plural repeated polls of the facsimile machine is performed over the same connection.

115. A facsimile manager according to claim 113, wherein the facsimile machine is not running under the operating system.

116. A facsimile manager according to claim 113, wherein the communication module repeatedly polls the facsimile machine based on timer messages from the operating system.

117. A facsimile manager according to claim 110, wherein the communication module further commands the facsimile machine via the interface to delete the image from the facsimile memory of the facsimile machine.

118. An apparatus manager for permitting a user to operate printing and scanning functionality of an image processing apparatus, having an image memory for storing images and being equipped with an interface for connecting to separate computing equipment on which the apparatus manager executes, the apparatus manager comprising:

a software interface with a communication module which is functionally connected to the image processing apparatus via the interface, in which the communication module polls the image processing apparatus via the interface to determine whether a scanned-in image is present in the image memory, obtains the scanned-in image from the image memory via the interface, and accepts images via the software interface from another application program;

a user-activatable in-box which is operable to receive an image from the communication module via the software interface, and which when activated displays a list of images provided by the communication module, such images including scanned-in images and images from other application programs, the list including information which indicates each source of the images, the in-box further being operable to permit user-selection of images from the list;

a user-activatable out-box which when activated displays a list of image, and which permits user-selection of images from the list, the list including information which indicates each source of the images;

a scanning module which interacts with the software interface so as to cause the communication module to command the image processing apparatus via the interface to initiate a scanning operation, which receive a corresponding scanned-in image from the communication module via the software interface, and which stores the scanned-in image for display in the list of images in said in-box; and a print module which interacts with the software interface so as to give images selected from the list of images in said in-box or said out-box to the communication module and so as to cause the communication module to transfer the selected image via the interface to the image processing apparatus for subsequent printout by the image processing apparatus.

119. An apparatus manager according to claim 118, wherein the information which indicates each source of the images is an icon.

120. An apparatus manager according to claim 118, wherein the communication module polls the image memory.

121. An apparatus manager according to claim 118, wherein the image processing apparatus is connected to a computer system and runs under an operating system on the computer system, and wherein the communication module, the scanning module and the print module run under the same operating system on the computer system as the facsimile manager.

122. An apparatus manager according to claim 121, wherein the communication module is functionally connected to the interface of the image processing apparatus through a connection between the computer system and the image processing apparatus, and wherein each of plural repeated polls of the image processing apparatus is performed over the same connection.

123. An apparatus manager according to claim 121, wherein the image processing apparatus is not running under the operating system.

124. An apparatus manager according to claim 121, wherein the communication module repeatedly polls the image processing apparatus based on timer messages from the operating system.

125. An apparatus manager according to claim 118, wherein the communication module further commands the facsimile machine via the interface to delete the scanned-in image from the image memory of the image processing apparatus.

126. An apparatus manager for permitting a user to operate scanning functionality of an image processing apparatus, having an image memory for storing images and being equipped with an interface for connecting to separate computing equipment on which the apparatus manager executes, the apparatus manager comprising:

a software interface with a communication module which is functionally connected to the image processing apparatus via the interface, in which the communication module polls the image processing apparatus via the interface to determine whether a scanned-in image is present in the image memory, obtains the scanned-in image from the image memory via the interface, and accepts images via the software interface from another application program;

a user-activatable in-box which is operable to receive an image from the communication module via the software interface, and which when activated displays a list of images provided by the communication module, such images including scanned-in images and images from other application programs, the list including information which indicates each source of the images, the in-box further being operable to permit user-selection of images from the list; and a scanning module which interacts with the software interface so as to cause the communication module to command the image processing apparatus via the interface to initiate a scanning operation, which receives a corresponding scanned-in image from the communication module via the software interface, and which stores the scanned-in image for display in the list of images in said in-box.

127. An apparatus manager according to claim 126, wherein the information which indicates each source of the images is an icon.

128. An apparatus manager according to claim 126, wherein the communication module polls the image memory.

129. An apparatus manager according to claim 126, wherein the image processing apparatus is connected to a computer system and runs under an operating system on the computer system, and wherein the communication module and the scanning module run under the same operating system on the computer system as the facsimile manager.

130. An apparatus manager according to claim 129, wherein the communication module is functionally connected to the interface of the image processing apparatus through a connection between the computer system and the image processing apparatus, and wherein each of plural repeated polls of the image processing apparatus is performed over the same connection.

131. An apparatus manager according to claim 129, wherein the image processing apparatus is not running under the operating system.

132. An apparatus manager according to claim 129, wherein the communication module repeatedly polls the image processing apparatus based on timer messages from the operating system.

133. An apparatus manager according to claim 126, wherein the communication module further commands the facsimile machine via the interface to delete the scanned-in image from the image memory of the image processing apparatus.

134. A facsimile manager for permitting a user to operate output functionality of a facsimile machine, having a facsimile memory for storing images and being equipped with an interface for connecting to separate computing equipment on which the facsimile manager executes, the facsimile manager comprising:

a software interface with a communication module which is functionally connected to the facsimile machine via the interface, in which the communication module polls the facsimile machine via the interface, and accepts images via the software interface from the facsimile memory of the facsimile machine and from another application program;

a user-activatable out-box which when activated displays a list of images, and which permits user-selection of images from the list, the list including information which indicates each source of the images;

a fax module which interacts with the software interface so as to give images selected from the list of images in said out-box to the communication module and so as to cause the communication module to transfer the selected images via the interface to the facsimile machine for subsequent facsimile transmission by the facsimile machine; and a print module which interacts with the software interface so as to give images selected from the list of images in said out-box to the communication module and so as to cause the communication module to transfer the selected image via the interface to the facsimile machine for subsequent printout by the facsimile machine.

135. A facsimile manager according to claim 134, wherein the information which indicates each source of the images is an icon.

136. A facsimile manager according to claim 134, wherein the communication module polls the facsimile memory.

137. A facsimile manager according to claim 134, wherein the facsimile machine is connected to a computer system and runs under an operating system on the computer system, and wherein the communication module, the fax module and the print module run under the same operating system on the computer system as the facsimile manager.

138. A facsimile manager according to claim 137, wherein the communication module is functionally connected to the interface of the facsimile machine through a connection between the computer system and the facsimile machine, and wherein each of plural repeated polls of the facsimile machine is performed over the same connection.

139. A facsimile manager according to claim 137, wherein the facsimile machine is not running under the operating system.

140. A facsimile manager according to claim 137, wherein the communication module repeatedly polls the facsimile machine based on timer messages from the operating system.

141. A facsimile manager according to claim 134, wherein the communication module further commands the facsimile machine via the interface to delete images from the facsimile memory of the facsimile machine.

* * * * *

UNITED STATES PATENT AND TRADEMARK OFFICE
CERTIFICATE OF CORRECTION

PATENT NO.   : 6,134,017
DATED        : October 17, 2000
INVENTOR(S)  : Avraham Ron Schlank, et al.

It is certified that error appears in the above-identified patent and that said Letters Patent is hereby corrected as shown below:

Column 5,
Line 63, "is." should read -- 18. --.

Column 11,
Line 20, "manger" should read -- manager --.

Column 12,
Line 45, "our" should read -- out --.

Column 13,
Line 7, "image" should -- images --.
Line 36, "time"." should read -- time", --.
Line 38, "322" should read -- 122 --.

Column 17,
Line 2, "a" (first occurrence) should be deleted.
Line 30, "the" (second occurrence) should read -- to the --.

Column 18,
Line 17, ""File" should read -- "File" --.

Column 19,
Line 4, "a" should read -- as --.
Line 24, "canned-in" should read -- scanned-in --.
Line 30, "lose" should read -- 105e --.

Column 20,
Line 25, "15(B)" should read -- 18(B) --.

Column 23,
Line 25, "accesses" should read -- accessed --.
Line 33, "an" should read -- and --.
Line 47, "IS" should read -- 18 --.
Line 56, "program." should read -- programs. --.
Line 61, "applications" should read -- application --.

UNITED STATES PATENT AND TRADEMARK OFFICE
CERTIFICATE OF CORRECTION

PATENT NO. : 6,134,017
DATED : October 17, 2000
INVENTOR(S) : Avraham Ron Schlank, et al.

It is certified that error appears in the above-identified patent and that said Letters Patent is hereby corrected as shown below:

Column 25,
Line 1, "Will" should read -- will --.
Line 14, "document" should read -- documents --.

Column 34,
Line 25, "so a" should read -- so as --.

Column 36,
Line 11, "claim 52," should read -- claim 102, --.

Column 37,
Line 52, "image," should read -- images, --.

Signed and Sealed this

Thirteenth Day of November, 2001

Attest:

NICHOLAS P. GODICI
*Attesting Officer*  *Acting Director of the United States Patent and Trademark Office*